(12) United States Patent
Lowery et al.

(10) Patent No.: US 12,521,378 B2
(45) Date of Patent: *Jan. 13, 2026

(54) ADMINISTRATION OF R-BETA-HYDROXYBUTYRATE SALT BLEND AND RELATED COMPOUNDS IN HUMANS

(71) Applicant: AXCESS GLOBAL SCIENCES, LLC, Salt Lake City, UT (US)

(72) Inventors: Ryan P. Lowery, Tampa, FL (US); Jacob Wilson, Tampa, FL (US)

(73) Assignee: AXCESS GLOBAL SCIENCES, LLC, Washington, UT (US)

(*) Notice: Subject to any disclaimer, the term of this patent is extended or adjusted under 35 U.S.C. 154(b) by 853 days.

This patent is subject to a terminal disclaimer.

(21) Appl. No.: 17/732,453

(22) Filed: Apr. 28, 2022

(65) Prior Publication Data

US 2022/0339142 A1 Oct. 27, 2022

Related U.S. Application Data

(63) Continuation-in-part of application No. 17/367,206, filed on Jul. 2, 2021, now Pat. No. 12,109,182, which is a continuation-in-part of application No. 15/491,924, filed on Apr. 19, 2017, now Pat. No. 11,173,138, application No. 17/732,453, filed on Apr. 28, 2022 is a continuation-in-part of application No. 17/519,127, filed on Nov. 4, 2021, which is a continuation of application No. 16/403,992, filed on May 6, 2019, now Pat. No. 11,026,929, which is a continuation-in-part of application No. 15/491,933, filed on Apr. 19, 2017, now Pat. No. 10,278,961, application No. 17/732,453, filed on Apr. 28, 2022 is a continuation-in-part of application No. 17/341,312, filed on Jun. 7, 2021, now Pat. No. 11,969,411.

(60) Provisional application No. 62/324,798, filed on Apr. 19, 2016, provisional application No. 62/324,794, filed on Apr. 19, 2016, provisional application No. 63/336,259, filed on Apr. 28, 2022.

(51) Int. Cl.

| | | |
|---|---|---|
| *A61K 31/4355* | (2006.01) | |
| *A61K 9/00* | (2006.01) | |
| *A61K 9/107* | (2006.01) | |
| *A61K 31/00* | (2006.01) | |
| *A61K 31/19* | (2006.01) | |
| *A61K 31/4745* | (2006.01) | |
| *A61K 36/889* | (2006.01) | |
| *A61K 45/06* | (2006.01) | |
| *A61K 47/44* | (2017.01) | |
| *A61K 47/69* | (2017.01) | |
| *A61P 3/08* | (2006.01) | |

(52) U.S. Cl.
CPC ........ *A61K 31/4355* (2013.01); *A61K 9/1075* (2013.01); *A61K 31/00* (2013.01); *A61K 31/19* (2013.01); *A61K 31/4745* (2013.01); *A61K 36/889* (2013.01); *A61K 45/06* (2013.01); *A61K 47/44* (2013.01); *A61K 47/6911* (2017.08); *A61P 3/08* (2018.01); *A61K 9/0053* (2013.01)

(58) Field of Classification Search
CPC .. A61K 31/4355; A61K 36/889; A61K 45/06; A61K 31/19; A61K 31/4745; A61K 47/44; A61K 9/1075; A61K 31/00; A61K 47/6911; A61K 9/0053; A61P 3/08
See application file for complete search history.

(56) References Cited

U.S. PATENT DOCUMENTS

| | | |
|---|---|---|
| 2,238,149 A | 4/1941 | Aeckerle |
| 2,976,073 A | 3/1961 | Russell et al. |
| 4,139,761 A | 2/1979 | Obrowski |
| 4,224,503 A | 9/1980 | Gijzel et al. |
| 4,292,499 A | 9/1981 | Kleinschmidt et al. |
| 4,627,808 A | 12/1986 | Hughes |
| 4,771,074 A | 9/1988 | Lammerant et al. |
| 4,969,393 A | 11/1990 | Mahlich et al. |
| 4,997,976 A | 3/1991 | Brunengraber et al. |
| 5,093,044 A | 3/1992 | Wretlind et al. |
| 5,100,677 A | 3/1992 | Veech |
| 5,116,868 A | 5/1992 | Chen et al. |
| 5,288,512 A | 2/1994 | Seiden |
| 5,292,774 A | 3/1994 | Hiraide et al. |
| 5,654,266 A | 8/1997 | Chen et al. |
| 5,700,670 A | 12/1997 | Yamagishi et al. |
| 6,031,000 A | 2/2000 | Nissen et al. |
| 6,207,856 B1 † | 3/2001 | Veech |
| 6,217,915 B1 | 4/2001 | Luchansky et al. |
| 6,232,345 B1 | 5/2001 | Hiraide et al. |
| 6,316,038 B1 | 11/2001 | Veech |
| 6,323,237 B1 | 11/2001 | Veech |
| 6,380,244 B2 | 4/2002 | Martin et al. |

(Continued)

FOREIGN PATENT DOCUMENTS

| | | |
|---|---|---|
| CA | 2990927 A1 | 7/2018 |
| CN | 86108978 A | 11/1987 |

(Continued)

OTHER PUBLICATIONS

Kackley et al., "A Pre-Workout Supplement of Ketone Salts, Caffeine, and Amino Acids Improves High-Intensity Exercise Performance in Keto-Naïve and Keto-Adapted Individuals", Journal of the American College of Nutrition, Apr. 24, 2020, vol. 39, No. 4, pp. 290-300.

(Continued)

*Primary Examiner* — Shirley V Gembeh
(74) *Attorney, Agent, or Firm* — Workman Nydegger

(57) ABSTRACT

In various implementations, a composition comprising R-beta-hydroxybutyrate, related compounds, and/or one or more other compounds may be administered to an individual to cause weight loss, weight maintenance, elevate blood ketone levels, maintain blood ketone levels, reduce blood glucose levels, maintain blood glucose levels, improve energy, focus, mood, cognitive function, or aide with neurological or inflammatory disorders and/or combinations thereof. The composition may include sodium R-beta-hydroxybutyrate salts; potassium R-beta-hydroxybutyrate; and one or more other salts of R-beta-hydroxybutyrate.

18 Claims, 18 Drawing Sheets

(56) References Cited

U.S. PATENT DOCUMENTS

| | | |
|---|---|---|
| 6,613,356 B1 | 9/2003 | Vlahakos |
| 6,706,756 B1 | 3/2004 | Fitzpatrick et al. |
| 6,835,750 B1 | 12/2004 | Henderson |
| 7,351,736 B2 | 4/2008 | Veech |
| 7,807,718 B2 † | 10/2010 | Hashim |
| 7,891,287 B2 | 2/2011 | Miller |
| 8,071,641 B2 | 12/2011 | Weiss et al. |
| 8,101,653 B2 | 1/2012 | Veech |
| 8,124,589 B2 | 2/2012 | Henderson |
| 8,344,896 B2 | 1/2013 | Ozanne |
| 8,426,468 B2 | 4/2013 | Henderson |
| 8,642,654 B2 | 2/2014 | Clarke et al. |
| 8,748,400 B2 | 6/2014 | Henderson |
| 9,138,420 B2 | 9/2015 | D'Agostino et al. |
| 9,186,340 B2 | 11/2015 | Andrews et al. |
| 9,211,275 B2 | 12/2015 | Clarke et al. |
| 9,435,566 B2 | 9/2016 | Hill et al. |
| 9,675,577 B2 | 6/2017 | D'Agostino et al. |
| 9,717,767 B2 | 8/2017 | Carpenter et al. |
| 9,795,580 B2 | 10/2017 | Weeber et al. |
| 9,808,481 B2 | 11/2017 | Ritter et al. |
| 9,925,164 B1 | 3/2018 | Hashim |
| 9,957,246 B2 | 5/2018 | Stinchcomb et al. |
| 10,022,409 B2 | 7/2018 | Carpenter et al. |
| 10,051,880 B2 | 8/2018 | Clarke et al. |
| 10,088,197 B2 | 10/2018 | Hamagami et al. |
| 10,245,242 B1 | 4/2019 | Millet |
| 10,245,243 B1 | 4/2019 | Millet |
| 10,278,961 B2 | 5/2019 | Lowery et al. |
| 10,292,592 B2 | 5/2019 | Marshall et al. |
| 10,292,952 B2 | 5/2019 | Millet |
| 10,407,331 B2 | 9/2019 | Kamito et al. |
| 10,512,615 B1 | 12/2019 | Millet |
| 10,588,876 B2 | 3/2020 | Millet |
| 10,588,877 B2 | 3/2020 | Arnold |
| 10,596,128 B2 | 3/2020 | Millet |
| 10,596,129 B2 | 3/2020 | Millet |
| 10,596,130 B2 | 3/2020 | Millet |
| 10,596,131 B2 | 3/2020 | Millet |
| 10,660,958 B2 | 5/2020 | Clarke |
| 10,736,861 B2 | 8/2020 | Millet |
| 10,792,269 B2 | 10/2020 | Hashim |
| 10,925,843 B2 | 2/2021 | Millet |
| 10,973,786 B2 | 4/2021 | Millet |
| 10,980,764 B1 | 4/2021 | D'Agostino et al. |
| 10,980,772 B2 | 4/2021 | Millet |
| 11,020,362 B2 | 6/2021 | Millet |
| 11,026,929 B2 | 6/2021 | Lowery et al. |
| 11,033,553 B2 | 6/2021 | Millet |
| 11,103,470 B2 | 8/2021 | Millet |
| 11,129,802 B2 | 9/2021 | Millet |
| 11,173,138 B2 | 11/2021 | Lowery et al. |
| 11,185,518 B2 | 11/2021 | Millet |
| 11,202,769 B2 | 12/2021 | Millet |
| 11,241,403 B2 | 2/2022 | Millet |
| 11,690,817 B2 | 7/2023 | Millet |
| 11,793,778 B2 | 10/2023 | Millet |
| 11,806,324 B2 | 11/2023 | Millet |
| 11,944,598 B2 | 4/2024 | Millet |
| 11,950,616 B2 | 4/2024 | Millet |
| 12,186,297 B2 | 1/2025 | Millet |
| 2001/0014696 A1 | 8/2001 | Veech |
| 2001/0018866 A1 | 9/2001 | Fischer |
| 2001/0041736 A1 | 11/2001 | Veech |
| 2002/0124370 A1 | 9/2002 | Deckert et al. |
| 2003/0022937 A1 | 1/2003 | Veech |
| 2004/0138293 A1 | 7/2004 | Werner et al. |
| 2004/0266872 A1 | 12/2004 | Veech |
| 2005/0129783 A1 | 6/2005 | Mccleary et al. |
| 2005/0169968 A1 | 8/2005 | Elmaleh et al. |
| 2006/0165777 A1 | 7/2006 | Solomon et al. |
| 2006/0275253 A1 | 12/2006 | Ushida et al. |
| 2007/0029913 A1 | 2/2007 | Chen |
| 2007/0135376 A1 | 6/2007 | Henderson |
| 2007/0179197 A1 | 8/2007 | Henderson |
| 2008/0058416 A1 | 3/2008 | Greenwood et al. |
| 2008/0287372 A1 | 11/2008 | Henderson |
| 2009/0131475 A1 | 5/2009 | Uesugi et al. |
| 2009/0253781 A1 | 10/2009 | Veech |
| 2009/0306221 A1 | 12/2009 | Guy et al. |
| 2009/0325984 A1 | 12/2009 | Costentin et al. |
| 2010/0041751 A1 | 2/2010 | Henderson |
| 2010/0056631 A1 | 3/2010 | Hisamura et al. |
| 2010/0113494 A1 | 5/2010 | Hu et al. |
| 2010/0197758 A1 | 8/2010 | Andrews et al. |
| 2010/0210726 A1 | 8/2010 | Kuriyama |
| 2010/0298294 A1 | 11/2010 | Clarke et al. |
| 2011/0237666 A1 | 9/2011 | Clarke et al. |
| 2011/0287114 A1 | 11/2011 | Johnson |
| 2012/0053240 A1 | 3/2012 | Rathmacher et al. |
| 2012/0071548 A1 | 3/2012 | Veech |
| 2012/0171165 A1 | 7/2012 | Buck et al. |
| 2012/0202891 A1 | 8/2012 | Stinchcomb et al. |
| 2013/0079406 A1 | 3/2013 | Veech |
| 2013/0337116 A1 | 12/2013 | Petralia |
| 2014/0256808 A1 | 9/2014 | Henderson |
| 2014/0329893 A1 | 11/2014 | Veech |
| 2014/0350105 A1 | 11/2014 | DAgostino et al. |
| 2014/0352728 A1 | 12/2014 | Svensson |
| 2015/0018415 A1 | 1/2015 | Veech |
| 2015/0063140 A1 | 3/2015 | Yi et al. |
| 2015/0065571 A1 | 3/2015 | Clarke |
| 2015/0132280 A1 | 5/2015 | Lopez et al. |
| 2015/0144074 A1 | 5/2015 | Fujimoto et al. |
| 2015/0320809 A1 | 11/2015 | Carpenter et al. |
| 2015/0363750 A1 | 12/2015 | Svensson et al. |
| 2016/0193173 A1 | 7/2016 | Clarke et al. |
| 2016/0256411 A1 | 9/2016 | Aung-Din |
| 2016/0263071 A1 | 9/2016 | Borges et al. |
| 2017/0020844 A1 | 1/2017 | Galinski |
| 2017/0029650 A1 | 2/2017 | Veling et al. |
| 2017/0172969 A1 | 6/2017 | D'Agostino et al. |
| 2017/0258745 A1 | 9/2017 | Millet |
| 2017/0266148 A1 | 9/2017 | D'Agostino et al. |
| 2017/0290792 A1 | 10/2017 | Cavaleri |
| 2017/0296501 A1 | 10/2017 | Lowery et al. |
| 2017/0296520 A1 | 10/2017 | Lowery et al. |
| 2017/0298339 A1 | 10/2017 | Hanson et al. |
| 2017/0304564 A1 | 10/2017 | Dehaan et al. |
| 2018/0020699 A1 | 1/2018 | Steup |
| 2018/0021274 A1 | 1/2018 | Arnold |
| 2018/0021281 A1 | 1/2018 | Berger |
| 2018/0055797 A1 | 3/2018 | Llosa et al. |
| 2018/0057846 A1 | 3/2018 | Llosa et al. |
| 2018/0195096 A1 | 7/2018 | Veech et al. |
| 2018/0214399 A1 | 8/2018 | Spector et al. |
| 2018/0238586 A1 | 8/2018 | Sugatani et al. |
| 2019/0099394 A1 | 4/2019 | Ari et al. |
| 2019/0151267 A1 | 5/2019 | Millet |
| 2019/0167613 A1 | 6/2019 | Millet |
| 2019/0167614 A1 | 6/2019 | Millet |
| 2019/0177673 A1 | 6/2019 | Llosa et al. |
| 2019/0183220 A1 | 6/2019 | Takada |
| 2019/0183820 A1 | 6/2019 | Millet |
| 2019/0183821 A1 | 6/2019 | Millet |
| 2019/0191755 A1 | 6/2019 | Garvey et al. |
| 2019/0209501 A1 | 7/2019 | Tinsley, M et al. |
| 2019/0255028 A1 | 8/2019 | Lowery et al. |
| 2019/0262293 A1 | 8/2019 | Millet |
| 2019/0313682 A1 | 10/2019 | Nagel |
| 2019/0321309 A1 | 10/2019 | Millet |
| 2020/0030266 A1 | 1/2020 | Bradley et al. |
| 2020/0061004 A1 | 2/2020 | Millet |
| 2020/0078973 A1 | 3/2020 | Valeze et al. |
| 2020/0129463 A1 | 4/2020 | Lowery et al. |
| 2020/0140371 A1 | 5/2020 | Verdin et al. |
| 2020/0170982 A1 | 6/2020 | Millet |
| 2020/0253909 A1 | 8/2020 | Millet |
| 2020/0268701 A1 | 8/2020 | D'Agostino et al. |
| 2021/0095867 A1 | 4/2021 | Gururaja et al. |
| 2021/0106168 A1 | 4/2021 | Cingolani et al. |
| 2021/0205241 A1 | 7/2021 | Millet |
| 2022/0133673 A1 | 5/2022 | Millet |
| 2023/0072854 A1 | 3/2023 | Purpura et al. |

(56) References Cited

U.S. PATENT DOCUMENTS

| | | |
|---|---|---|
| 2023/0115966 A1 | 4/2023 | Wells et al. |
| 2023/0201145 A1 | 6/2023 | Millet |
| 2023/0346721 A1 | 11/2023 | Millet |
| 2024/0024265 A1 | 1/2024 | Millet |
| 2024/0197668 A1 | 6/2024 | Millet |
| 2025/0025434 A1 | 1/2025 | Millet |

FOREIGN PATENT DOCUMENTS

| | | |
|---|---|---|
| CN | 1256629 A | 6/2000 |
| CN | 1347319 A | 5/2002 |
| CN | 1104978 C | 4/2003 |
| CN | 1184978 C | 1/2005 |
| CN | 1972698 A | 5/2007 |
| CN | 101674730 A | 3/2010 |
| CN | 101678043 A | 3/2010 |
| CN | 101969769 A | 2/2011 |
| CN | 102164884 A | 8/2011 |
| CN | 104224823 A | 12/2014 |
| CN | 105050594 A | 11/2015 |
| CN | 106038532 A | 10/2016 |
| CN | 106459646 A | 2/2017 |
| CN | 106858066 A | 6/2017 |
| CN | 108253621 A | 7/2018 |
| CN | 109480284 A | 3/2019 |
| CN | 111867576 A | 10/2020 |
| CN | 112262936 A | 1/2021 |
| DE | 102017210992 A1 | 1/2019 |
| EP | 0008700 A1 | 3/1980 |
| EP | 1112711 A1 | 7/2001 |
| EP | 1178748 A1 | 2/2002 |
| EP | 1827412 A1 | 9/2007 |
| EP | 1915144 A2 | 4/2008 |
| EP | 2283834 A2 | 2/2011 |
| EP | 1755743 | 4/2013 |
| EP | 2976073 A1 | 1/2016 |
| EP | 3094321 A1 | 11/2016 |
| EP | 3366173 A2 | 8/2018 |
| EP | 3446045 A1 | 2/2019 |
| FR | 2997302 A1 | 5/2014 |
| GB | 2391493 A | 2/2004 |
| ID | 201701176 | 2/2017 |
| JP | 11-060434 A | 3/1999 |
| JP | 2002-521330 A | 7/2002 |
| JP | 2004-035417 A | 2/2004 |
| JP | 2008-127369 A | 6/2008 |
| JP | 5030553 B2 | 9/2012 |
| JP | 2015-042644 A | 3/2015 |
| JP | 5690261 B2 | 3/2015 |
| JP | 2015-514104 A | 5/2015 |
| JP | 2015-102323 A | 6/2015 |
| JP | 2016-514725 A | 5/2016 |
| JP | 2016-121128 A | 7/2016 |
| JP | 2017-046688 A | 3/2017 |
| JP | 2018-158897 A | 10/2018 |
| JP | 2018-158898 A | 10/2018 |
| JP | 2018-158899 A | 10/2018 |
| JP | 2019-533010 A | 11/2019 |
| JP | 2020-502652 A | 1/2020 |
| JP | 2020-527583 A | 9/2020 |
| JP | 2021-504476 A | 2/2021 |
| JP | 2021-506294 A | 2/2021 |
| JP | 2021-127322 A | 9/2021 |
| JP | 2021-193945 A | 12/2021 |
| RU | 2345546 C2 | 2/2009 |
| WO | 87/03808 A1 | 7/1987 |
| WO | 98/41200 A1 | 9/1998 |
| WO | 2000/004895 | 2/2000 |
| WO | 2000/15216 | 3/2000 |
| WO | 00/69315 A1 | 11/2000 |
| WO | 03/70823 A2 | 8/2003 |
| WO | 2005/077348 A1 | 8/2005 |
| WO | 2005/107724 A1 | 11/2005 |
| WO | 2006/029577 | 3/2006 |
| WO | 2006/061624 A1 | 6/2006 |
| WO | 2007/115282 A2 | 10/2007 |
| WO | 2007/138322 A1 | 12/2007 |
| WO | 2008/005818 A1 | 1/2008 |
| WO | 2008/021394 A2 | 2/2008 |
| WO | 2008/024408 A2 | 2/2008 |
| WO | 2009/089144 A1 | 7/2009 |
| WO | 2010/021766 | 2/2010 |
| WO | 2010/104595 | 9/2010 |
| WO | 2011/101171 A1 | 8/2011 |
| WO | 2012/019295 A1 | 2/2012 |
| WO | 2012/024611 A1 | 2/2012 |
| WO | 2013/057506 A1 | 4/2013 |
| WO | 2013/150153 A1 | 10/2013 |
| WO | 2014/153416 | 9/2014 |
| WO | 2014153415 † | 9/2014 |
| WO | 2015/063140 A1 | 5/2015 |
| WO | 2015/071811 A1 | 5/2015 |
| WO | 2015/156865 A1 | 10/2015 |
| WO | 2016/123229 A1 | 8/2016 |
| WO | 2016/149687 A1 | 9/2016 |
| WO | 2017/156446 A1 | 9/2017 |
| WO | 2017/165443 A1 | 9/2017 |
| WO | 2017/165445 A1 | 9/2017 |
| WO | 2017/182664 A1 | 10/2017 |
| WO | 2017/184788 A1 | 10/2017 |
| WO | 2017/208217 A2 | 12/2017 |
| WO | 2018/055388 A1 | 3/2018 |
| WO | 2018/089863 A1 | 5/2018 |
| WO | 2018/114309 A1 | 6/2018 |
| WO | 2018/132189 | 7/2018 |
| WO | 2018/175879 A1 | 9/2018 |
| WO | 2018/187324 A1 | 10/2018 |
| WO | 2018/187852 A1 | 10/2018 |
| WO | 2019/018683 A1 | 1/2019 |
| WO | 2019/104082 A1 | 5/2019 |
| WO | 2019/108683 A1 | 6/2019 |
| WO | 2019/118624 A1 | 6/2019 |
| WO | 2019/200132 A1 | 10/2019 |
| WO | 2019/204148 A1 | 10/2019 |
| WO | 2019/237152 A1 | 12/2019 |
| WO | 2019/237185 A1 | 12/2019 |
| WO | 2020/041871 A1 | 3/2020 |
| WO | 2020/092451 A1 | 5/2020 |
| WO | 2020/257055 A1 | 12/2020 |
| WO | 2021/178547 A1 | 9/2021 |
| WO | 2022/040644 A2 | 2/2022 |

OTHER PUBLICATIONS

Allendorfer et al., "Neuroimaging studies towards understanding the central effects of pharmacological cannabis products on patients with epilepsy", Epilepsy Behav, May 2017, vol. 70, pp. 349-354.
EnergyTimes—Herbal keto support Jan. 15, 2008.
European Search Report received for EP Patent Application No. 19880284.5, mailed on Jul. 12, 2022, 11 pages.
International Preliminary Report on Patentability received for PCT Patent Application No. PCT/US17/28465, mailed on Nov. 1, 2018, 7 pages.
International Preliminary Report on Patentability received for PCT Patent Application No. PCT/US17/28466, mailed on Nov. 1, 2018, 8 pages.
International Preliminary Report on Patentability received for PCT Patent Application No. PCT/US19/58676, mailed on May 14, 2021, 6 pages.
International Search Report and Written Opinion received for PCT Patent Application No. PCT/US19/58676, mailed on Jan. 16, 2020, 6 pages.
International Search Report and Written Opinion received for PCT Patent Application No. PCT/US2023/020407, mailed on Jul. 26, 2023, 10 pages.
International Search Report and Written Opinion received for PCT Patent Application No. PCT/US2023/020417, mailed on Jul. 21, 2023, 11 pages.
International Search Report and Written Opinion received for PCT Patent Application No. PCT/US22/36030, mailed on Oct. 7, 2022, 7 pages.

(56) References Cited

OTHER PUBLICATIONS

International Search Report and Written Opinion received for PCT Patent Application No. PCT/US17/28465, mailed on Jul. 5, 2017, 7 pages.
Lannotti et al., "Effects of non-euphoric plant cannabinoids on muscle quality and performance of dystrophic mdx mice", Br J Pharmacol, May 2019, vol. 176, No. 10, pp. 1568-1584.
Office Action received for European Patent Application No. 17786592. 0, mailed on Jun. 17, 2022, 7 pages.
Office Action received for European Patent Application No. 17786592. 0, mailed on Sep. 25, 2020, 7 pages.
Stefan et al., "The Effects of Exogenous Beta-Hydroxybutyrate Supplementation on Metrics of Safety and Health", International Journal of Nutrition and Food Sciences, vol. 9, No. 6, Nov. 2020, pp. 154-162.
Supplementary European Search Report received for EP Patent Application No. 17786592.0, mailed on Nov. 25, 2019, 10 pages.
International Preliminary Report on Patentability received for PCT Patent Application No. PCT/US2023/020407, mailed on Nov. 7, 2024, 7 pages.
International Preliminary Report on Patentability received for PCT Patent Application No. PCT/US2023/020417, mailed on Nov. 7, 2024, 8 pages.
Williams et al., "The Chemistry of the Ketogenic Diet: Updates and Opportunities in Organic Synthesis", Int J Mol Sci., May 15, 2021, vol. 22, No. 10, 5230, pp. 1-18.
Decision to grant received for European Patent Application No. 17786592.0, mailed on Nov. 3, 2023, 2 pages.
Dedkova et al. "Role of B-hydroxybutyrate, its polymer poly-b-hydroxybutyrate and inorganic polyphosphate in mammalian health and disease", Frontiers in Physiology, Jul. 17, 2014, pp. 1-22.
Intention to grant received for European Patent Application No. 17786592.0, mailed on Jun. 27, 2023, 7 pages.
Newman et al. "B-Hydroxybutyrate: A Signaling Metabolite", Annu Rev Nutr., Aug. 21, 2017, pp. 1-30.
Newman et al., "B-hydroxybutyrate: Much more than a metabolite", Diabetes Res Clin Pract., Nov. 2014.
Office Action received for European Patent Application No. 19880284. 5, mailed on Nov. 9, 2023, 5 pages.
International Search Report and Written Opinion for PCT/US17/2846 dated Jul. 5, 2017 (9 pages).
International Preliminary Report on Patentability received for PCT Patent Application No. PCT/US2020/017555, mailed on Aug. 26, 2021, 7 pages.
International Preliminary Report on Patentability received for PCT Patent Application No. PCT/US2020/017556, mailed on Aug. 26, 2021, 7 pages.
International Preliminary Report on Patentability received for PCT Patent Application No. PCT/US2020/033159, mailed on Nov. 25, 2021, 6 pages.
International Preliminary Report on Patentability received for PCT Patent Application No. PCT/US2021/017078, mailed on Aug. 18, 2022, 7 pages.
International Preliminary Report on Patentability received for PCT Patent Application No. PCT/US2021/045186, mailed on Mar. 9, 2023, 7 pages.
International Preliminary Report on Patentability received for PCT Patent Application No. PCT/US2021/050302, mailed on Mar. 2, 2023, 8 pages.
International Preliminary Report on Patentability received for PCT Patent Application No. PCT/US2021/063559, mailed on Jul. 6, 2023, 6 pages.
International Search Report and Written Opinion issued in PCT/US19/48364 dated Nov. 15, 2019.
International Search Report and Written Opinion received for PCT Patent Application No. PCT/US2018/062093, mailed on Feb. 1, 2019, 7 pages.
International Search Report and Written Opinion received for PCT Patent Application No. PCT/US20/017555, mailed on May 4, 2020, 8 pages.
International Search Report and Written Opinion received for PCT Patent Application No. PCT/US20/37289, mailed on Sep. 30, 2020, 8 pages.
International Search Report and Written Opinion received for PCT Patent Application No. PCT/US2014/031237, mailed on Jul. 15, 2014, 11 pages.
International Search Report and Written Opinion received for PCT Patent Application No. PCT/US2017/021886, mailed on Jun. 1, 2017, 15 pages.
International Search Report and Written Opinion received for PCT Patent Application No. PCT/US2018/062096, mailed on Feb. 11, 2019, 13 pages.
International Search Report and Written Opinion received for PCT Patent Application No. PCT/US2019/027214, mailed on Jun. 25, 2019, 14 pages.
International Search Report and Written Opinion received for PCT Patent Application No. PCT/US2019/048357, mailed on Nov. 18, 2019, 13 pages.
International Search Report and Written Opinion received for PCT Patent Application No. PCT/US2020/016952, mailed on Apr. 22, 2020, 9 pages.
International Search Report and Written Opinion received for PCT Patent Application No. PCT/US2020/017552, mailed on May 4, 2020, 9 pages.
International Search Report and Written Opinion received for PCT Patent Application No. PCT/US2020/017556, mailed on May 4, 2020, 12 pages.
International Search Report and Written Opinion received for PCT Patent Application No. PCT/US2020/033159, mailed on Aug. 12, 2020, 9 pages.
International Search Report and Written Opinion received for PCT Patent Application No. PCT/US2021/063559, mailed on Mar. 18, 2022, 9 pages.
International Search Report and Written Opinion received for PCT Patent Application No. PCT/US21/045186, mailed on Nov. 22, 2021, 10 pages.
International Search Report and Written Opinion received for PCT Patent Application No. PCT/US21/17078, mailed on Apr. 23, 2021, 9 pages.
International Search Report cited in PCT/US18/62093 dated Feb. 1, 2019.
Invitation to Respond to Written Opinion issued by the Intellectual Property Office of Singapore dated Dec. 28, 2016 for corresponding Singapore Patent Application No. 11201506780R.
It Really is in Your Blood: Glucose to Ketone Ratios. Greymadder, Sep. 15, 2014. Downloaded Apr. 1, 2015. http://greymadder.net/2014/09/15/it-really-is-in-your-blood-glucose-to-ketone-ratios/.
James, "Optical Purity and Enantiomeric Excess" at https://www.master organicchemistry.com/2017/02/24/optical-purity-and-enantiomeric-excess/. (Retrieved from the internet Nov. 6, 2018) (Year: 2018).
John C Newman et al: "beta-Hydroxybutyrate: A Signaling Metabolite", Annual Review of Nutrition, vol. 37, Aug. 21, 2017 (Aug. 21, 2017), pp. 51-76, XP055771586,.
Karppanen et al, J. Human Hypertension (2005), vol. 19, pp. S10-S19. (Year: 2005).
Karppanen, H., et al, "Why and how to implement sodium, potassium, calcium, and magnesium changes in food items and diets?" J. Human Hypertension (2005), vol. 19, pp. S10-S19.
Kaster M.P. et al, "Caffeine acts through neuronal adenosine A2A receptors to prevent mood and memory dysfunction triggered by chronic stress", Proceedings of the National Academy of Sciences, vol. 112, No. 25, Jun. 8, 2015, pp. 7833-7838.
Kesl, et al., "Effects of exogenous ketone supplementation on blood ketone, glucose, triglyceride, and lipoprotein levels in Sprague-Dawley rats", Nutrition & Metabolism (2016).
Kim Do Young et al., "Ketone bodies are protective against oxidative stress in neocortical neurons," Journal of Neurochemistry, vol. 101, Issue 5, Jun. 1, 2007, pp. 1316-1326.
Kirsch, Jr. et al. "Butanediol Induced Ketosis Increases Tolerance to Hypoxia in the Mouse." Stroke. 1980, vol. 11, No. 3, pp. 506-513.

(56) References Cited

OTHER PUBLICATIONS

Kossoff, Eric H. et al. "Optimal Clinical Management of Children Receiving the Ketogenic Diet: Recommendations of the International Ketogenic Diet Study Group." Epilepsia, Feb. 2009;50(2):304-17. Epub Sep. 23, 2008.

Krotkiewski, "Value of VLCD Supplementation with Medium Chain Triglycerides", Int J Obes Relat Metab Disord, Sep. 2001, 25(9), pp. 1393-1400.

Lang Chaochun, "Healthy fitness and exercise prescription", Nov. 30, 2013, p. 201.

Lile et al. Drug Alcohol Depend. 2012, 122 (1-2), 61-69.

Lonza, Duocap Capsules, Feb. 16, 2018, https ://web .archive .org/web/20180216001656/https://www.capsugel.com/consumer-health-nutrition-products/duocap-capsules (Year: 2018).

Luis Villasenor, "Supplements and Ketogenic Diets—Facts and Myths", Retrieved from https://www.ketogains.com/2015/09/supplements-and-ketogenic-diets-facts-and-myths/, Sep. 18, 2015, p. 15.

Lytra. G. et al., "Distribution and Organoleptic Impact of Ethyl 3-Hydroxybutanoate Enantiomers in Wine," J. Agric. Food Chem, vol. 63, Issue 48, 2015, pp. 10484-10491.

Maalouf M et al., "Ketones inhibit mitochondrial production of reactive oxygen species production following glutamate excitotoxicity by increasing NADH oxidation," Neuroscience, New York, NY, US, vol. 145, Issue 1, Mar. 2, 2007, pp. 256-264.

Maalouf M et al., "The neuroprotective properties of calorie restriction, the ketogenic diet, and ketone bodies," Brain Research Reviews, Elsevier, NL, vol. 59, No. 2, Mar. 1, 2009, pp. 293-315.

Maguire et al., "Gut dysbiosis, leaky gut, and intestinal epithelial proliferation in neurological disorders: towards the development of a new therapeutic using amino acids, prebiotics, probiotics, and postbiotics", Rev Neurosci . Jan. 28, 2019, vol. 30, No. 2, pp. 179-201.

Malo, M. S. et al., Intestinal alkaline phosphatase preserves the normal homeostasis of gut microbiota, 2010, Gut, 59, 1476-1484 (Year: 2010).

Mangels D.R. et al., "Catechins as Potential Mediators of Cardiovascular Health", Translational Sciences, vol. 37, No. 5, May 1, 2017, pp. 757-763.

Murray, Andrew J., et al. "Novel ketone diet enhances physical and cognitive performance", The FASEB Journal, No. Dec. 30, 2016.

National Center for Biotechnology Information. PubChem Compound Summary for CID 441, 3-Hydroxybutyric acid, https://pubchem.ncbi.nlm.nih.gov/compound/3-Hydroxybutyric-acid. (Year: 2005).

Non-Final Rejection Mailed on Sep. 9, 2020 for U.S. Appl. No. 16/783,956.

Nova Max Plus Glucose and Ketone Testing with One Monitor. Downloaded Apr. 1, 2015. http://www.novacares.com/nova-max-plus/.

International Search Report and Written Opinion received for PCT Patent Application No. PCT/US22/49036, mailed on Mar. 8, 2023, 9 pages.

O'Mailey et al, Appl. Physiol. Nutr. Metab. 42: 1031-1035 (2017) Published at www.NRCRESEARCHPRESS.com/ APNM on Jul. 27, 2017.

O'Meara, Cyndi, Changing Habits, Ketosis—Can we achieve it in a pill?, https://changinghabits. com.au/ketosis-can-we-achieve-it-in-a-pill/, 12 pages, (Jan. 13, 2017).

Office Action received for European Patent Application No. 19788264.0, mailed on Mar. 13, 2024, 5 pages.

Office Action received for European Patent Application No. 20805593.9, mailed on Dec. 22, 2023, 7 pages.

Paraxanthine-Pubchem—2023 (Year: 2023).

Parker, Steve, "Ketogenic Mediterraanean Diet: Version 2.3," Nov. 23, 2010, pp. 1-3. (Year: 2010).

Partial supplementary European search report (EPO Form 1507US) issued by the European Patent Office on Sep. 21, 2016 for corresponding European Application No. 14770025.6.

PCT International Search Report and Written Opinion issued by the International Searching Authority on Jul. 15, 2014 or International Patent Application No. PCT/US2014/031237.

Pete J Cox et al., "Acute nutritional ketosis: implications for exercise performance and metabolism," Extreme Physiology & Medicine, vol. 3, Issue 1, Dec. 1, 2014, pp. 1-9.

Precision Xtra vs. NovaMax Plus: Ketone Meter Evaluation. Jimmy Moore's Livin' La Vida Low Carb Blog. Downloaded Apr. 1, 2015. http://livinlavidalowcarb.com/blog/precision-xtra-vs-novamax-plus-ketone -meter-evaluation/15918.

Pubchem, "Acetoacetic acid" Electronic Resource: https://pubchem. ncbi.nim.nih.gov/compound/Acetoacetic-acid, Retrieved on Sep. 3, 2019.

Rho et al. "Acetoacetate, Acetone, and Dibenzylamine (A Contaminant in L-(+)-Beta-Hydroxybutyrate) Exhibit Direct Anticonvulsant Actions in Vivo", Epilepsia, Raven Press Ltd, New York, US, vol. 43, No. 4, Apr. 1, 2002 (Apr. 1, 2002), pp. 358-361.

Rich A.J., "Ketone Bodies as Substrates," Proceedings of the Nutrition Society (1990), vol. 49, 361-373.

Robson et al. Expert Opin. Drug Saf. (2011), vol. 10, pp. 675-685 (Year: 2011).

Roeder, Lois M., et al. The Effects of Ketone Bodies, Bicarbonate, and Calcium on Hepatic Mitochondrial Ketogenesis. Archives of Biochemistry and Biophysics, vol. 217, No. 2, Sep. pp. 460-467, 1982.

Sajewicz et al. In Journal of Liquid Chromatography & Related Technologies, 33:1047-1057 (2010) (Year: 2010).

Sanchez, J. I. et al. Arabinoxylan-oligosaccharides (AXOS) affect the protein/carbohydrate fermentation balance and microbial population dynamics of the Simulator of Human Intestinal Microbial Ecosystem, 2009, Microbial Biotechnology, 2(1): 101-113 (Year: 2009).

Sara, How do you know which product is right for you? How to choose exogenous ketones, https://ketosupplements.co.uk/how-to-choose-exogenous-ketones/, 10 pages, (Sep. 25, 2017).

Search Report and Written Opinion issued by the Intellectual Property Office of Singapore on Apr. 18, 2016 for corresponding Singapore Application No. 11201506780R.

Serum Ketones Test. MedlinePlus Medical Encyclopedia. Downloaded Apr. 1, 2015. http://www.nlm.nih.gov/medlineplus/ency/article/003498.htm.

Shigeno et al. in Biosci. Biotech. Biochem., 56(2), 320-323 (1992) (Year: 1992).

Short, Jay, Effects of A Ketone/Caffeine Supplement On Cycling and Cognitive Performance, Master's thesis, Ohio State University, 61 pages, (Jan. 1, 2017).

Slavin, J. Fiber and Prebiotics: Mechanisms and Health Benefits, 2013, Nutrients, 5: 1417-1425 (Year: 2013).

Sorensen et al. ("Simultaneous determination of f,l,-hydroxybutyrate and f,l,-hydroxy-f,l,-methylbutyrate in human whole blood using hydrophilic interaction liquid chromatography electrospray tandem mass spectrometry", Clinical Biochemistry, 2013, vol. 46, pp. 1877-1883) (Year: 2013).

Stubbs et al., "On the Metabolism of Exogenous Ketones in Humans", frontiers in Physiology, vol. 8, 2017, 13 pages.

Tanaka, J., et al., "Significance of Blood Ketone Body Ration as an indicator of Hepatic Cellular Energy Status in Jaundiced Rabbits", Gastroenterology, 1979, vol. 76, No. 4, pp. 691-696.

The Medical Republic, 2018, Sustained Release Sodium Butyrate Supplement Now Available to Support Management of GI Disorders, https://medicalrepublic.com.au/ sustained-release-sodium-butyrate-supplement-now-available-support-management-gi-disorders/15791; newly cited (Year: 2018).

Tisdale, "Reduction of weight loss and tumour size in a cachexia model by a high fat diet", British Journal of Cancer, Jul. 1987, vol. 56, p. 39-43.

Tsai et al., "Stereoselective effects of 3-hydroxybutyrate on glucose utilization of rat cardiomyocytes" life Sciences 78 (2006) pp. 1385-1391.

U.S. Appl. No. 62/324,798, filed Apr. 19, 2016, Lowery, priority document to U.S. Pat. No. 11,173,138.

(56) References Cited

OTHER PUBLICATIONS

Vandenberghe et al. in Can. J. Physiol. Pharmacol. 95:455-458 (2017) (Published at www.nrcresearchpress com/cjpp on Nov. 25, 2016). (Year: 2016).
Veech, "The Therapeutic Implications of Ketone Bodies: The Effects of Ketone Bodies in Pathological Conditions: Ketosis, Ketogenic Diet, Redox States, Insulin Resistance, and Mitochondrial Metabolism", Prostaglandins Leukot Essent Fatty Acids, Mar. 2004, 70(3), pp. 309-319.
Veech, et al., "Ketone Bodies Mimic the Life Span Extending Properties of Caloric Restriction", IUBMB Life Feb. 8, 2017.
Vorgerd, M. And J. Zange. Treatment of glycogenosys type V (McArdle disease) with creatine and ketogenic diet with clinical scores and with 31P-MRS on working leg muscle. Acta Myologica, 2007; XXVI; pp. 61-63.
Walton, G. et al. A randomised, double-blind, placebo controlled cross-over study to determine the gastrointestinal effects of consumption of arabinoxylan-oligosaccharides enriched bread in healthy volunteers, 2012, Nutrition Journal, 11(36): 1-11 (Year: 2012).
WO2009045481, Pan et al. Published Apr. 9, 2009 Listed in this section as citation type "foreign" does not allow for any appropriate country code for "WO" documents.
Written Opinion cited in PCT/US19/27214 dated Jun. 25, 2019.
Wu et al., "Medium-Chain Triglycerides in Infant Formulas and Their Relation to Plasma Ketone Body Concentrations," Pediatric Research, vol. 20, No. 4, (1986), pp. 338-341.
Yang Y. et al., Role of Adherent-Invasive *Escherichia coli* in Inflammatory Bowel Disease, Letters in Biotechnology, No. 06, Nov. 30, 2016.
Yang Yue et al., Research on sarcopemc obesity, Chinese Journal of Modern Medicine, vol. 20, No. 3, Mar. 25, 2018, pp. 98-101.
Yang Zeyi, "Biochemistry of sports nutrition scientific research progress", Mar. 31, 2004, vol. 23, No. 2, pp. 158-165.
Zaleski, A. et al., Butyric acid in irritable bowel syndrome, 2013, Prz Gastroenterol, 8(6), 350-353 (Year: 2013).
Zeng Jing et al., "B-hydroxy-3-methyl—The clinical effects and mechanism", vol. 2, No. 2, Jun. 9, 2015, pp. 57-62.
A New Toy Measuring Blood Ketones. Diet Doctor, Aug. 21, 2012. Dowloaded Apr. 1, 2015. http://www.dietdoctor.com/a-new-toy-measuring-blood-ketoones.
Amazon, "Perfect Keto Perform Pre Workout Powder—Bum Fat for Fuel Energy Supplement Drink Mix for Men and Women—Keto Friendly with Ketone Salts, BCAA, Nitric Oxide & MCT", Sep. 25, 2017 entire document especially p. 1 Retrieved from https://www.amazon.com/Perfect-Keto-Perform-PreworkoutSupplement/dp/B0751379Q9/ref=sr_1_9?dchild=1&keywords=ketone+pre+workout&qid=1597938465&sr=8-9.
Anonymous: "Strawberry Pineapple Flavour Pre-Exertion Performance Optimizer", Mintel, Database accession No. 5661617, 2018, p. 4.
Arendash et al. "Caffeine and Coffee as Therapeutics Against Alzheimer's Disease", Journal of Alzheimer's Disease 20, 2010, S117-S126.
Arnold, Instant Ketosis?, (2013), Aug. 4, 2013 (retrieved on Apr. 21, 2017), p. 1-3. Retrieved from the internet; URL: <http://patrickarnoldblog.com/instant-ketosis/. (Year: 2013).
Bala et al. Drug Invention Today. Jun. 1, 2018;10(6), 929-931.
Bastin et al., "Salt Slection and Optimisation Procedures for Pharmaceutical New Chemical Entities", American Chemical Society and the Royal Society of Chemistry, vol. 4, No. 5, 2000, pp. 427-435.
Blazquez et al. Journal of Neurochemistry, 1999, vol. 72 No. 4, pp. 1759-1768. (Year: 1999).
Budin. N. et al., "Efficient synthesis of the ketone body ester (R)-3-hydroxybutyryl-(R)-3-hydroxybutyrate and its (S, S) enantiomer," Bioorganic Chemistry, vol. 80, Oct. 2018, pp. 560-564.
Clarke, et al., Kinetics, safety and tolerability of (R)-3-hydroxybutyl (R)-3-hydroxybutyrate in healthy adult subjects. Regul Toxicol Pharmacol. Aug. 2012; 63(3):401-8.

Craciun, S. et al. Microbial conversion of choline to trimethylamine requires a glycyl radical enzyme, 2012, PNAS, 109 (52): 21307-21312 (Year: 2012).
Cresci, G. et al., Lactobacillus GG and Tributyrin Supplementation Reduce Antibiotic-Induced Intestinal Injury, 2013, Journal of Parenteral and Enteral Nutrition, 37(6), 1-20 (Year: 2013).
Daniells, Stephen, 'This is caffeine-evolved': Ingenious Ingredients co-founder talks up potential of paraxanthine, Nov. 3, 2021, 2 pages, retrieved from https://www.nutraingredients-usa.com/Article/2021/11/03/This-is-caffeine-evolved-Ingenious-Ingredients-co-founder-talks-up-potential-of-paraxanthine accessed Feb. 7, 2023.
Database GNPD Mintel, Sep. 29, 2016, anonymous, "Blue Lemon Ice Advanced Formula", XP093048090, Database accession No. 4315637, p. 3.
Dietary Guidelines Recommendations at https://health.gov/our-work/food-nutrition/2015-2020-dietary-guidelines/guidelines/ appendix-7/ (2010) (retrieved from the internet Oct. 20, 2020) (Year: 2010).
Dolson, Laura. How to Test Your Blood for Ketones. Downloaded Apr. 1, 2015. http://lowcarbdiets.about.com/od/KetogenicDiets/a/How-to-Test-Blood-For-Ketones.htm.
English translation of WO2013057506 accessed form patentscope.wipo.com Jul. 14, 2021.
Enhancing Human Performance: Ketones. Blue Sky Fact Finding Meeting, Oct. 24, 2012.
European Search Report received for EP Patent Application No. 20755289.4, mailed on Oct. 11, 2022, 7 pages.
European Search Report received for EP Patent Application No. 20755994.9, mailed on Sep. 21, 2022, 6 pages.
European Search Report received for EP Patent Application No. 20805593.9, mailed on Dec. 16, 2022, 9 pages.
European Search Report received for EP Patent Application No. 21750261.6, mailed on Feb. 2, 2024, 10 pages.
European Search Report received for EP Patent Application No. 21862356.9, mailed on Jul. 1, 2024, 10 pages.
Extended European Search Report issued in PCT/US2017021886 dated Oct. 17, 2019.
Extended European Search Report pursuant to Rule 62 Epc (Epo Form 1507S) issued on Jan. 24, 2017 for corresponding European Patent Application No. 14770025.6.
Extended European Search Report received for EP Patent Application No. 19788264.0, mailed on Dec. 20, 2021, 11 pages.
Extended European Search Report received for EP Patent Application No. 20755770.3, mailed on Sep. 1, 2022, 7 pages.
First Examination Report for New Zealand Patent Application No. 711433 issued by the New Zealand Intellectual Property Office dated Mar. 10, 2016.
First Office Action issued by the Chinese State Intellectual Property Office on Nov. 4, 2016 for corresponding Chinese Patent Application No. 201480016818.0.
Grootaert, C. Comparison of prebiotic effects of arabinoxylan oligosaccharides and inulin in a simulator of the human intestinal microbial ecosystem, 2009, FEMS Microbiology Ecology, 69: 231-242 (Year: 2009).
Haces M L et al: "Antioxidant capacity contributes to protection of ketone bodies against oxidative damage induced during hypoglycemic conditions", Experimental Neurology, Elsevier, Amsterdam, NL, vol. 211, No. 1, May 1, 2008 (May 1, 2008), pp. 85-96.
Hashim, Sarni A, et al., "Ketone body therapy: from the ketogenic diet to the oral administration of ketone ester", Journal of Lipid Research, vol. 55, 2014.
Haywood A, Glass BO. Pharmaceutical excipients—where do we begin? Australian Prescriber. 2011; 34: 112-114.
Henderson, Samuel T. "Ketone Bodies as a Therapeutic for Alzheimer's Disease." Neurotherapeutics. Jul. 2008; 5 (3):470-80.
Holscher, H. Dietary fiber and prebiotics and the gastrointestinal microbiota, 2017, Gut Microbes, 8(2): 172-184 (Year: 2017).
Holtzman et al., "Role of adenosine receptors in caffeine tolerance", J. Pharmacol. Exp. Ther., 1991 ;256(1 ):62-68.
Huang Dexiang et al., "Clinical Intravenous Nutrition", Shanghai Medical University Press Jan. 31, 1994, pp. 121-124.
Huang Dexiang, "Clinical Intravenous Nutrition", Shanghai Medical University Press, Apr. 17, 2023, pp. 1-5.

(56) References Cited

OTHER PUBLICATIONS

Ichim, T. et al., Experimental support for the effects of a probiotic/digestive enzyme supplement on serum cholesterol concentrations and the intestinal microbiome, 2016, Journal of Translational Medicine, 14(184), 1-9 (Year 2016).

International Preliminary Report on Patentability received for PCT Patent Application No. PCT/US2020/016952, mailed on Aug. 26, 2021, 7 pages.

International Preliminary Report on Patentability received for PCT Patent Application No. PCT/US20/37289, mailed on Dec. 30, 2021, 6 pages.

International Preliminary Report on Patentability received for PCT Patent Application No. PCT/US2014/031237, mailed on Oct. 1, 2015, 8 pages.

International Preliminary Report on Patentability received for PCT Patent Application No. PCT/US2017/021886, mailed on Sep. 20, 2018, 9 pages.

International Preliminary Report on Patentability received for PCT Patent Application No. PCT/US2018/062093, mailed on Jun. 4, 2020, 6 pages.

International Preliminary Report on Patentability received for PCT Patent Application No. PCT/US2018/062096, mailed on Jul. 2, 2020, 8 pages.

International Preliminary Report on Patentability received for PCT Patent Application No. PCT/US2019/027214, mailed on Oct. 29, 2020, 09 pages.

International Preliminary Report on Patentability received for PCT Patent Application No. PCT/US2019/048357, mailed on Mar. 11, 2021, 08 pages.

International Preliminary Report on Patentability received for PCT Patent Application No. PCT/US2019/048364, mailed on Mar. 11, 2021, 7 pages.

International Preliminary Report on Patentability received for PCT Patent Application No. PCT/US2020/017552, mailed on Aug. 26, 2021, 7 pages.

† cited by third party

|  | Subject 1 | Subject 2 |  | Subject 3 |  | Subject 4 |  | Subject 5 |  |
|---|---|---|---|---|---|---|---|---|---|
| 1 | 500 mg DHBB | 1 | 250 mg DHBB | 1 | 250 mg DHBB | 1 | 500 mg DHBB | 1 | 500 mg DHBB |
| 2 | 250 mg DHBB | 2 | 500 mg DHBB | 2 | 500 mg DHBB | 2 | 250 mg DHBB | 2 | 500 mg BB HCL |
| 3 | 500 mg BB HCL | 3 | 500 mg BB HCL | 3 | 500 mg BB HCL | 3 | 500 mg BB HCL | 3 | 250 mg DHBB |

| Subject | Condition | Baseline | 30 minutes | 60 minutes | 90 minutes | 120 minutes | 180 minutes |
|---|---|---|---|---|---|---|---|
| A | 10g DL-BHB | 0.2 | 0.7 | 0.5 | 0.3 | 0.2 | 0.2 |
| B | 10g DL-BHB | 0.1 | 0.9 | 0.6 | 0.3 | 0.2 | 0.2 |
| C | 10g DL-BHB | 0.1 | 0.5 | 0.2 | 0.1 | 0.1 | 0.1 |
| D | 10g DL-BHB | 0.2 | 0.8 | 0.6 | 0.3 | 0.2 | 0.1 |
| Average | | 0.15 | 0.725 | 0.475 | 0.25 | 0.175 | 0.15 |
| A | 10g R-BHB | 0.2 | 1.8 | 0.7 | 0.4 | 0.3 | 0.2 |
| B | 10g R-BHB | 0.2 | 1.5 | 0.7 | 0.3 | 0.2 | 0.2 |
| C | 10g R-BHB | 0.1 | 0.7 | 0.3 | 0.2 | 0.2 | 0.1 |
| D | 10g R-BHB | 0.1 | 1.5 | 1.2 | 0.8 | 0.2 | 0.2 |
| Average | | 0.15 | 1.375 | 0.725 | 0.375 | 0.225 | 0.175 |
| A | 5g R-BHB | 0.3 | 0.6 | 0.3 | 0.4 | 0.3 | 0.4 |
| B | 5g R-BHB | 0.1 | 0.8 | 0.7 | 0.2 | 0.2 | 0.2 |
| C | 5g R-BHB | 0.1 | 0.4 | 0.2 | 0.2 | 0.1 | 0.1 |
| D | 5g R-BHB | 0.1 | 0.7 | 0.3 | 0.2 | 0.1 | 0.1 |
| Average | | 0.15 | 0.625 | 0.375 | 0.25 | 0.2 | 0.2 |

# ADMINISTRATION OF R-BETA-HYDROXYBUTYRATE SALT BLEND AND RELATED COMPOUNDS IN HUMANS

CROSS-REFERENCE TO RELATED APPLICATIONS

This application is a continuation in part of U.S. patent application Ser. No. 17/367,206, entitled "ADMINISTRATION OF R-BETA-HYDROXYBUTYRATE AND RELATED COMPOUNDS IN HUMANS", filed on Jul. 2, 2021, which is a continuation in part of U.S. patent application Ser. No. 15/491,924, entitled "ADMINISTRATION OF BUTYRATE, BETA-HYDROXYBUTYRATE, AND RELATED COMPOUNDS IN HUMANS", filed on Apr. 19, 2017, which claims the benefit of U.S. Provisional Patent Application No. 62/324,798, entitled "ADMINISTRATION OF BUTYRATE, BETA-HYDROXYBUTYRATE, AND RELATED COMPOUNDS IN HUMANS", filed on Apr. 19, 2016, all of which is incorporated by reference for all purposes.

This application is also a continuation in part of U.S. patent application Ser. No. 17/519,127 entitled "ADMINISTRATION OF BERBERINE METABOLITES", filed on Nov. 4, 2021, which is a continuation of U.S. patent application Ser. No. 16/403,992, entitled "ADMINISTRATION OF BERBERINE METABOLITES", filed on May 6, 2019 and issued as U.S. Pat. No. 11,026,929, which is a continuation in part of U.S. patent application Ser. No. 15/491,933, entitled "ADMINISTRATION OF BERBERINE METABOLITES", filed on Apr. 19, 2017 and issued as U.S. Pat. No. 10,278,961, which claims the benefit of U.S. Provisional Patent Application No. 62/324,794, entitled "ADMINISTRATION OF DIHYDROBERBERINE", filed on Apr. 19, 2016, all of which are incorporated by reference for all purposes.

This application is also a continuation in part of U.S. patent application Ser. No. 17/341,312 entitled "ADMINISTRATION OF BERBERINE MEATBOLITES", filed on Jun. 7, 2021, which is a continuation of U.S. patent application Ser. No. 16/403,992, entitled "ADMINISTRATION OF BERBERINE METABOLITES", filed on May 6, 2019 and issued as U.S. Pat. No. 11,026,929, which is a continuation in part of U.S. patent application Ser. No. 15/491,933, entitled "ADMINISTRATION OF BERBERINE METABOLITES", filed on Apr. 19, 2017 and issued as U.S. Pat. No. 10,278,961, which claims the benefit of U.S. Provisional Patent Application No. 62/324,794, entitled "ADMINISTRATION OF DIHYDROBERBERINE", filed on Apr. 19, 2016, all of which are incorporated by reference for all purposes.

This application also claims the benefit of priority to U.S. Provisional Patent Application No. 63/336,259 to Lowery et al., filed on Apr. 28, 2022 and entitled "ADMINISTRATION OF R-BETA-HYDROXYBUTYRATE SALT BLEND AND RELATED COMPOUNDS IN HUMANS", which is incorporated by reference for all purposes.

TECHNICAL FIELD

The present invention relates to administration of one or more beta-hydroxybutyrates to humans.

BACKGROUND

Currently, there are several forms of ketones, with ketone salts being the primary form sold in the marketplace to promote weight loss and/or ketosis. Ketone salts are comprised of beta-hydroxybutyrate bound to various minerals such as calcium, magnesium, potassium, and sodium. Of these salts, it appears that a typical formulation blend balances the ratio of each of these salts, as it is commonly believed that a balance blend is likely ideal and there is not believed to be an advantage to altering the balanced blend.

SUMMARY

In various implementations, a pharmaceutically effective amount of an R-beta-hydroxybutyrate salt blend may be administered. The R-beta-hydroxybutyrate salt blend may include butyrate, beta-hydroxybutyrate(s), related compounds, and/or one or more other compounds may be administered to an individual. For example, the pharmaceutically effective amount of the R-beta-hydroxybutyrate salt blend may be administered to cause weight loss, weight maintenance, elevate blood ketone levels, maintain blood ketone levels, reduce blood glucose levels, maintain blood glucose levels, improve focus, energy, cognitive function, traumatic brain injury, diabetes, neurological disorders, cancer, inflammatory conditions, suppressing appetite, anti-aging, anti-glycation, epilepsy, depression, performance, strength, muscle mass, fat loss, body composition, increase joint health, decrease inflammation, and/or use as a medicament etc. The pharmaceutically effective amount of the R-beta-hydroxybutyrate salt blend thereof may be administered to healthy individuals and/or not healthy individuals (e.g., with diseases and/or disorders).

In various implementations, the R-beta-hydroxybutyrate salt blend may be a composition that includes sodium R-beta-hydroxybutyrate salts; potassium R-beta-hydroxybutyrate; and one or more other salts of R-beta-hydroxybutyrate. The ratio of the weight of both sodium R-beta-hydroxybutyrate and potassium R-beta-hydroxybutyrate to the weight of other types of R-beta-hydroxybutyrate in the composition may be approximately 2.0 to approximately 5. Providing a salt blend in this formulation may provide unexpected results in, for example, increasing and/or maintaining ketosis, increasing and/or maintaining weight loss, increasing performance, increasing metal acuity, increasing cognitive ability (e.g., focus), etc.

In various implementations, oral administration of the R-beta-hydroxybutyrate salt blend composition may increase at least one of weight loss, metabolism, fat loss, fat oxidation, joint health, motor function, muscle mass, mental acuity, cognitive functioning, mood, energy, alertness, focus, and/or performance. The oral administration of the composition may maintain ketosis or induce ketosis. The oral administration of the composition may maintain weight loss.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which:

FIG. 2 illustrates a table of subject responsiveness to an example administration protocol.

FIG. 4 a table with blood ketone levels for subjects after administration of an example administration protocol.

FIG. 5 illustrates a table of blood ketone levels over time for 4 subjects for an implementation of an example administration of D,L-beta-hydroxybutyrate and R/D-beta-hydroxybutyrate.

Like reference symbols in the various drawings indicate like elements.

DETAILED DESCRIPTION

Figure 1:
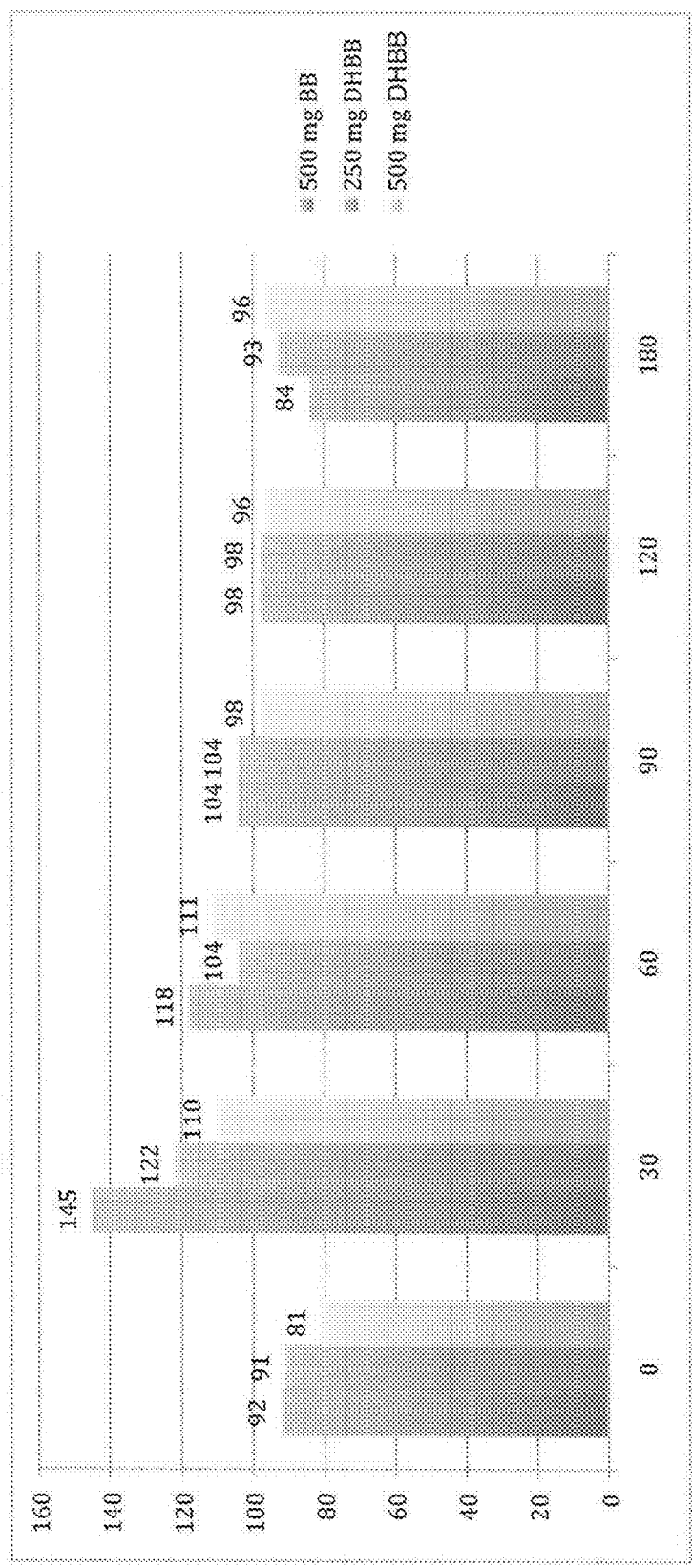
FIG. 1 illustrates table with glucose levels for subjects after administration of an example administration protocol.

In various implementations, compounds such as butyrate, beta-hydroxybutyrate and/or related compounds (e.g., derivatives, esters, polymers, etc.) can be administered alone or in combination with one or more other compounds. Administration of a pharmaceutically effective amount of these compound(s) may promote and/or maintain weight loss and/or ketosis. In some implementations, blood ketone levels and/or blood glucose levels may be reduced and/or maintained within a predetermined range when a pharmaceutically effective amount of one or more compounds are administered. In some implementations, a health of an individual (e.g., strength, symptoms of disease, mental acuity, fasting glucose levels, etc.) may be improved and/or maintained by administration of a compound that includes butyrate, beta-hydroxybutyrate and/or related compounds (e.g., derivatives, esters, polymers, etc.).

In various implementations, administration of a pharmaceutically effective amount of berberine metabolites (e.g., dihydroberberine and/or tetrahydroberberine), derivates thereof and/or salts thereof may be administered to humans to manage blood glucose levels (e.g., reduce fasting blood glucose, improve glucose tolerance, etc.). In some implementations, administration of pharmaceutically effective amount of berberine metabolite(s) may maintain and/or increase ketone levels (e.g., blood and/or urine ketone concentration). In some implementations, administration of a pharmaceutically effective amount of berberine metabolite(s) (e.g., dihydroberberine and/or tetrahydroberberine) may be therapeutic to humans with diabetes, glucose intolerance, metabolic syndrome, dyslipidemia, and/or obesity/overweight. In some implementations, administration of berberine metabolites may have ergogenic (e.g., performance enhancing) and/or body composition benefits for some individuals (e.g., generally healthy; athletic; etc.) via glucose disposal, insulin sensitivity and ketone sensitivity. In some implementations, administration of a pharmaceutically effective amount of berberine metabolite(s) may lower glycation (e.g., measured by HA1c levels) which may provide anti-aging properties. The amount of berberine metabolite (e.g., dihydroberberine) administered to achieve a predetermined effect (e.g., fasting blood glucose level) may be less than the amount of berberine that would be required to achieve the same predetermined effect. In some implementations, one or more other compounds may be administered with the pharmaceutically effective amount of berberine metabolite, such as a ketone sensitizer (e.g., a compound that is capable of reducing and/or maintaining blood ketone levels independently, such as beta-hydroxybutyrate, short chain fatty acids, medium chain fatty acids, and/or long chain fatty acids).

In various implementations, R-beta-hydroxybutyrate salt blend compositions may be administered to individuals. The R-beta-hydroxybutyrate salt blend may include R-beta-hydroxybutyrate and optionally compounds such as butyrate, L beta-hydroxybutyrate, related compounds (e.g., derivatives, esters, polymers, etc.), and/or one or more other compounds. Administration of a pharmaceutically effective amount of the R-beta-hydroxybutyrate salt blend composition may promote and/or maintain weight loss and/or ketosis. In some implementations, blood ketone levels and/or blood glucose levels may be increased and/or maintained within a predetermined range when a pharmaceutically effective amount of the R-beta-hydroxybutyrate salt blend is administered. In some implementations, a health of an individual (e.g., strength, symptoms of disease, mental acuity, fasting glucose levels, etc.) may be improved and/or maintained by administration of the R-beta-hydroxybutyrate salt blend.

In various implementations, compounds such as butyrate, beta-hydroxybutyrate and/or related compounds (e.g., derivatives, esters, polymers, etc.) can be administered alone or in combination with one or more other compounds. Administration of a pharmaceutically effective amount of these compound(s) may promote and/or maintain weight loss and/or ketosis. In some implementations, blood ketone levels and/or blood glucose levels may be reduced and/or maintained within a predetermined range when a pharmaceutically effective amount of one or more compounds are administered. In some implementations, a health of an individual (e.g., strength, symptoms of disease, mental acuity, fasting glucose levels, etc.) may be improved and/or maintained by administration of a compound that includes butyrate, beta-hydroxybutyrate and/or related compounds (e.g., derivatives, esters, polymers, etc.).

In various implementations butyrate, beta-hydroxybutyrate and/or related compounds may be administered to a human. Beta-hydroxybutyrate (e.g., R-beta-hydroxybutyrate, L-beta-hydroxybutyrate, and/or D,L-beta-hydroxybutyrate) may include beta-hydroxybutyrate salts and/or beta-hydroxybutyrate esters. In some implementations, beta-hydroxybutyrate may include beta-hydroxybutyrate bound to another compound (e.g., amino acids) and/or polymers of beta-hydroxybutyrate. For example, beta-hydroxybutyrate (e.g., R-beta-hydroxybutyrate, L-beta-hydroxybutyrate, and/or D,L-beta-hydroxybutyrate) may include beta-hydroxybutyrate salts, beta-hydroxybutyrate esters, beta-hydroxybutyrate sodium salt (e.g., sodium beta-hydroxybutyrate), beta-hydroxy butyrate potassium salt (e.g., potassium beta-hydroxybutyrate), beta-hydroxybutyrate calcium salt (e.g., calcium beta-hydroxybutyrate), beta-hydroxybutyrate magnesium salt (e.g., magnesium beta-hydroxybutyrate), beta-hydroxybutyrate lithium salt (e.g., lithium beta-hydroxybutyrate), sodium beta-hydroxybutyrate, arginine beta-hydroxybutyrate, lysine beta-hydroxybutyrate, histidine beta-hydroxybutyrate, ornithine beta-hydroxybutyrate, creatine beta-hydroxybutyrate, agmatine beta-hydroxybutyrate, or citrulline beta-hydroxybutyrate, other appropriate organic salts that include beta-hydroxybutyrate, and/or combinations thereof. In some implementations, the beta-hydroxybutyrate may include beta-hydroxybutyrate salts including (calcium, sodium, magnesium, potassium, zinc, selenium, chromium, other appropriate minerals, and/or combinations thereof. In some implementations, the beta-hydroxybutyrate may be complexed and/or coupled to another compound (e.g., amino acid and/or berberine) and a beta-hydroxybutyrate salt may include a complex (e.g., chelate) that includes a mineral (e.g., calcium, zinc, etc.) and the beta-hydroxybutyrate compound coupled to another compound. The beta-hydroxybutyrate may include single isomer beta-hydroxybutyrate and/or polymer beta-hydroxybutyrate. For example, R-beta-hydroxybutyrate may include single isomer R-beta-hydroxybutyrate and/or polymer R-beta-hydroxybutyrate. In some implementations, beta-hydroxybutyrate may be administered with 1,3-butanediol, ethyl acetoacetate, ethyl beta-hydroxybutyrate.

The beta-hydroxybutyrate may include racemic mixtures and/or individual isomers of betahydroxy-butyrate. In some implementations, one or more specific chiralities of beta-hydroxybutyrate may be utilized. For example, R-beta-hydroxybutyrate (also referred to as D-beta-hydroxybutyrate), S-beta-hydroxybutyrate (also referred to as L-beta-hydroxybutyrate), and/or mixtures (e.g., raecemic mixtures) thereof may be utilized. In some implementations, R-beta-hydroxybutyrate may be included in the composition (e.g., a more purified form of R-beta-hydroxybutyrate rather than D,L-beta-hydroxybutyrate). For example, R-beta-hydroxybutyrate may include less than approximately 10 percent, less than approximately 5 percent, or less than approximately 1 percent L-beta-hydroxybutyrate. R-beta-hydroxybutyrate may have a greater bioavailability than other chiralities of beta-hydroxybutyrate. R-beta-hydroxybutyrate may have a greater impact on a health of an individual (e.g., due to decreased side effects; increase ketone levels, weight loss, mental acuity, fat loss, etc.) than L-beta-hydroxybutyrate and/or D,L-beta-hydroxybutyrate. In some implementations, R-beta-hydroxybutyrate may cause improvements in health not capable by L-beta-hydroxybutyrate and/or D,L-beta-hydroxybutyrate. R-beta-hydroxybutyrate may have less impurities due to manufacturing, such as less crotonic acid (e.g., which can be harmful to individuals), than other forms of beta-hydroxybutyrate (e.g., L-beta-hydroxybutyrate and/or D,L-beta-hydroxybutyrate). In some implementations, R-beta-hydroxybutyrate may be more capable of binding with other compounds (e.g., purine, lysine, potassium, and/or other amino acids; dihydroberberine; etc.) to deliver the beta-hydroxybutyrate to a human. Thus, R-beta-hydroxybutyrate (e.g., greater than 90 percent purity of R-beta-hydroxybutyrate and less than 10 percent L-beta-hydroxybutyrate) and/or mixtures with R-beta-hydroxybutyrate may be administered to humans. In some implementations, unexpectedly, a smaller amount of R-beta-hydroxybutyrate may be as pharmaceutically effective (e.g., in increasing and/or maintaining weight loss; in increasing and/or maintaining elevated ketone levels, etc.) or more pharmaceutically effective as D,L-beta-hydroxybutyrate (e.g., raecemic mixture of D- and L-beta-hydroxybutyrate). For example, approximately half an amount of R-beta-hydroxybutyrate may be administered to achieve the approximately the same efficacy as D,L-beta-hydroxybutyrate and/or L-beta-hydroxybutyrate. The R-beta-hydroxybutyrate may be more bioavailable than other chiralities of beta-hydroxybutyrate and thus allow a smaller effective amount than other chiralities. Thus, by utilizing R-beta-hydroxybutyrate, the administration amount of beta-hydroxybutyrate to be reduced (e.g., when compared to the administration amount of D,L-beta-hydroxybutyrate) while providing a pharmaceutically effective amount, such as (e.g., for weight loss and/or maintenance; for elevating and/or maintaining blood ketone levels). Reducing the amount of beta-hydroxybutyrate, when the beta-hydroxybutyrate is provided in salt form, may reduce a user's intake of the cation of the salt (e.g., sodium, potassium, etc.). Since intake of some of these cations in beta-hydroxybutyrate salts, such as sodium, potassium, magnesium, and calcium, in amounts greater than a predetermined recommended amount may cause health problems (e.g., organ damage, gastrointestinal problems, etc.), reducing the amount of beta-hydroxybutyrate salt by using R-beta-hydroxybutyrate may inhibit side effects and/or health problems associated salts combined with beta-hydroxybutyrate administration in users.

In some implementations, a pharmaceutically effective amount of R-beta-hydroxybutyrate may be administered in an individual to promote and/or maintain ketosis, cause weight loss and/or manage weight, and/or increase blood ketone levels. For example, approximately 0.1 g to approximately 50 g of R-beta-hydroxybutyrate may be administered to an individual. In some implementations, approximately 0.1 g to approximately 15 g of R-beta-hydroxybutyrate may be administered to an individual. In some implementations, approximately 1 g to approximately 10 g of beta-hydroxybutyrate may be administered, for example, once a day to 5 times a day (e.g., to administer up to 50 g of beta-hydroxybutyrate). The administration may cause weight loss and/or maintenance; elevated beta-hydroxybutyrate levels in the blood; elevated, reduced, and/or maintenance of blood ketone levels; induction and/or maintenance of ketosis; and/or reduction; improve mental acuity; improve focus; improve energy; improve cognitive function; reduce traumatic brain injury; improve diabetes; improve glucose tolerance; decrease blood glucose levels; reduce neurological disorders and/or symptoms thereof; improve cancer and/or symptoms thereof; improve inflammatory conditions; suppressing appetite; improve symptoms associated with aging; provide anti-glycation affects; improve epilepsy and/or symptoms thereof; improve depression and/or symptoms thereof; improve performance; improve strength; increase muscle mass; increase fat loss; improve body composition; improve energy; improve focus; improve cognitive function; improve mood and/or well-being; and/or combinations thereof. The beta-hydroxybutyrate (e.g., R-beta-hydroxybutyrate) may be administered in healthy and not healthy individuals (e.g., individuals with diseases and/or disorders).

In some implementations, the beta-hydroxybutyrate, such as R-beta-hydroxybutyrate, may be administered with and/or coupled to a compound such as an amino acid. For example beta-hydroxybutyrate may be coupled to (e.g., chemically bonded to) amino acids, such as leucine, lysine, arginine, histidine, ornithine, creatine, agmatine, citrulline and/or combinations thereof. In some implementations, R-beta-hydroxybutyrate may be utilized rather than other chiralities since R-beta-hydroxybutyrate may be more easily bound to leucine, purine, lysine, and/or other amino acids. Administration of beta-hydroxybutyrate that is coupled to an amino acid may reduce the intake of cations associated with beta-hydroxybutyrate salts (e.g., which may inhibit side effects associated with administration) and/or allow administration of another compound that has health benefits (e.g., administration of some amino acid may promote smooth muscle growth and/or cell repair). In some implementations, approximately 0.5 g to approximately 10 g of amino acid may be administered with a beta-hydroxybutyrate. For example, less than approximately 50 g of R-beta-hydroxybutyrate and less than approximately 60 mg of an amino acid, such as leucine, may be administered daily. In some implementations, approximately 0.5 g to approximately 2 g of an amino acid, such as leucine, may be administered with a beta-hydroxybutyrate. For example, approximately the composition administered may include approximately 0.1 to approximately 7 g R-beta-hydroxybutyrate and approximately 1-3 g of leucine. The R-beta-hydroxybutyrate and the leucine may be a mixture; administered separately and proximate in timing; a complex, and/or administered in any other appropriate manner.

In some implementations, the composition may include R-beta-hydroxybutyrate salt and beta-hydroxybutyrate-amino acid complex (e.g., beta-hydroxybutyrate bound to amino acid, such as R-beta-hydroxybutyrate-leucine complex). For example, an individual may be administered a first weight amount of sodium beta-hydroxybutyrate and a second weight amount of beta-hydroxybutyrate amino-acid complex. The first amount and the second amount may be different or the same.

In some implementations, the beta-hydroxybutyrate composition may include beta-hydroxybutyrate salt and beta-hydroxybutyrate esters. For example, an individual may be administered a first weight amount of sodium beta-hydroxybutyrate and a second weight amount of beta-hydroxybutyrate ester. The first amount and the second amount may be different or the same. The beta-hydroxybutyrate salt and the beta-hydroxybutyrate ester may be a bound complex, a mixture of compounds, and/or separately administered approximately concurrently. In some implementations, the beta-hydroxybutyrate ester may be in powdered form (e.g., plated beta-hydroxybutyrate ester), liquid and/or gel form. The combination of beta-hydroxybutyrate salt and beta-hydroxybutyrate ester during administration may allow less salt to be utilized while producing a result (e.g., weight maintenance and/or loss; enhanced and/or maintained ketosis; elevated blood ketone levels; blood glucose reduction and/or maintenance; increase in energy; increase in mood; increase in performance; and/or increase in cognitive function). In some implementations, elevated ketone levels (e.g., elevated blood ketone levels) may increase energy, mood, performance, and/or cognitive function in users. For example, the administration of the first amount of beta-hydroxybutyrate salt may cause a first level of blood ketone level, which may be maintained by processing of the second amount of the beta-hydroxybutyrate ester (e.g., as the body of the individual processes the beta-hydroxybutyrate ester the level of beta-hydroxybutyrate in the blood, and thus blood ketone level, may also increase over time to enhance and/or maintain the initial elevation caused by of the administered beta-hydroxybutyrate salt.). For example, a ratio of beta-hydroxybutyrate to beta-hydroxybutyrate ester may be approximately 1 beta-hydroxybutyrate salt: approximately 1 beta-hydroxybutyrate ester to approximately 1 beta-hydroxybutyrate salt: approximately 20 beta-hydroxybutyrate ester. The ratio of beta-hydroxybutyrate to beta-hydroxybutyrate ester may be approximately 20 beta-hydroxybutyrate salt: approximately 1 beta-hydroxybutyrate ester to approximately 1 beta-hydroxybutyrate salt: approximately 20 beta-hydroxybutyrate ester. In some implementations, a ratio of beta-hydroxybutyrate to beta-hydroxybutyrate ester may be approximately 1 beta-hydroxybutyrate salt: approximately 1 beta-hydroxybutyrate ester to approximately 1 beta-hydroxybutyrate salt: approximately 5 beta-hydroxybutyrate ester.

Related compounds that may be included as beta-hydroxybutyrate in the composition may include derivatives of beta-hydroxybutyrate, include esters of (R)-3-hydroxybutyrate and oligomers of (R)-3-hydroxybutyrate. For example, beta-hydroxybutyrate esters derived from alcohols, such as altrose, arabinose, dextrose, erythrose, fructose, galactose, glucose, glycerol, gulose, idose, lactose, lyxose, mannose, ribitol, ribose, ribulose, sucrose, talose, threose, xylitol, xylose, galactosamine, glucosamine, mannosamine, N-acetylglucosamine, mannitol, sorbitol, threitol, (S)-1,2-propanediol and/or (R)-1,3-butanediol. In some implementations, a derivative of the beta-hydroxybutyrate may include structures of (R)-3-hydroxybutyric acid and an exemplary ester thereof (a glycerol monoester). The R chirality of the derivatives may be selected for inclusion in the composition in some implementations (e.g., to deliver R-beta-hydroxybutyrate with the administration of the compound).

In some implementations, butyrate, beta-hydroxybutyrate (e.g., R-beta-hydroxybutyrate), related compounds, and/or combinations thereof may be administered along with one or more additional compounds. The additional compounds may or may not be capable of independently increasing ketone levels, maintaining ketone levels, inducing ketosis, and/or maintaining ketosis. For example, additional compounds capable of independently increasing blood ketone levels may include short chain fatty acids (e.g., fatty acid with between 2 carbons than 6 carbons), short chain triglycerides (e.g., triglycerides with less than 6 carbons), medium chain fatty acids (e.g., fatty acid with 6-12 carbons), medium chain triglycerides (e.g., triglycerides with 7-12 carbons), long chain fatty acids (e.g., fatty acids with more than 12 carbons), long chain triglycerides (e.g., triglycerides with more than 12 carbons), and/or combinations thereof. In some implementations, short chain fatty acids and/or triglycerides may include acetate, propionate, and/or butyrate. Medium chain fatty acids and/or triglycerides may include lauric acid and/or coconut oil, coconut milk powder, fractionated coconut oil, isolated hexanoic acid, isolated octanoic acid, isolated decanoic acid, ethoxylated triglyceride, triglyceride derivatives thereof, aldehyde triglyceride derivatives thereof, monoglyceride derivatives thereof, diglyceride derivatives thereof, triglyceride derivatives thereof, and/or alkyl esters thereof. Long chain fatty acids and/or triglycerides may include dairy products and/or palm oil. In some implementations, a composition including R-beta-hydroxybutyrate and an additional compound that is independently capable of increasing ketone levels may increase ketone levels greater than merely the capability of each component individually (e.g., greater than an additive increase). For example, the composition may include R-beta-hydroxybutyrate and an additional compound independently capable of increasing ketone levels such as caffeine. In some implementations, the composition may include approximately 0.5 mg to approximately 50 g of R-beta-hydroxybutyrate and caffeine. In some implementations, the composition may include approximately 0.5 mg to approximately 15 g of R-beta-hydroxybutyrate and less than approximately 500 mg of caffeine. In some implementations, the composition may include approximately 0.5 mg to approximately 15 g of R-beta-hydroxybutyrate and approximately 5 mg to approximately 500 mg of caffeine. In some implementations, the composition may include approximately 0.5 mg to approximately 15 g of R-beta-hydroxybutyrate and approximately 10 mg to approximately 150 mg of caffeine. In some implementations, the composition may include approximately 0.5 mg to approximately 15 g of R-beta-hydroxybutyrate and approximately 10 mg to approximately 50 mg of caffeine. The composition with R-beta-hydroxybutyrate (e.g., R-beta-hydroxybutyrate including at least one R-beta-hydroxybutyrate salt) and caffeine may increase and or maintain ketosis, weight loss, fat loss, and/or mental acuity. In some implementations, the composition with R-beta-hydroxybutyrate (e.g., R-beta-hydroxybutyrate including at least one R-beta-hydroxybutyrate salt) and caffeine may increase mental processes (e.g., acuity including cognitive functioning, mood, energy, alertness, focus, performance, effects of aging, etc.); improve and/or maintain body composition; function as a therapeutic for one or more of the described conditions or disorders (e.g., treat neurological disorders); and/or combinations thereof. In some implementations, the composition may include R-beta-hydroxybutyrate and an additional compound independently capable of increasing ketone levels, such as 1,3,7,9-Tetramethyluric acid (commercially available as theacrine; and/or commerically available as TeaCrine® from Compound Solutions, California, USA). In some implementations, the composition may include approximately 0.5 mg to approximately 15 g of R-beta-hydroxybutyrate and less than approximately 500 mg of 1,3,7,9-Tetramethyluric acid. In some implementations, the composition may include approximately 5 mg to approximately 15 g of R-beta-hydroxybutyrate and less than approximately 500 mg of 1,3,7,9-Tetramethyluric acid.

For example, a pharmaceutically effective amount of one or more short chain fatty acids and/or one or more short chain triglycerides (e.g., butyric acid and/or butyrate) may be administered with a pharmaceutically effective amount of beta-hydroxybutyrate. In some implementations, approximately 1 g to approximately 10 g of beta-hydroxybutyrate and approximately 0.1 g to approximately 50 g of short chain fatty acid and/or triglyceride may be administered from once a day to approximately 5 times a day. In some implementations, approximately 1 g to approximately 3 g of beta-hydroxybutyrate and approximately 1 g of short chain fatty acid and/or triglyceride may be administered from once a day to approximately 5 times a day. In some implementations, the short chain fatty acid and/or triglyceride may include butyrate or derivatives of butyrate. Butyrate and/or derivatives of butyrate may be administered with and/or without beta-hydroxybutyrate to manage metabolic conditions, such as ketosis, and/or for other appropriate therapeutic purposes. Administered butyrate may be converted to beta-hydroxybutyrate in humans, and thus may increase the amount of beta-hydroxybutyrate delivered to the user. In some implementations, administration of butyrate and beta-hydroxybutyrate may promote hGH synthesis, improve basal and GHRH-induced hGH-secretion, increase muscle fiber cross-sectional area, inhibit intramuscular fat accumulation; reduce fat mass in a user; improve glucose metabolism; increase markers of mitochondrial biogenesis in skeletal muscle and/or whole-body oxygen consumption; reduced markers of oxidative stress and apoptosis and altered antioxidant enzyme activity; cause butyrate enhanced intracellular free cytosolic calcium levels (e.g., by acting through GPR41 and 43); increase beta-hydroxybutyrate levels; and/or support barrier function(s) in the gut and/or reduce inflammation associated with ulcerative colitis. Since butyrate is processed by the body to provide beta-hydroxybutyrate, the delivery of beta-hydroxybutyrate via the butyrate may supplement the directly administered beta-hydroxybutyrate to maintain a level of beta-hydroxybutyrate in the blood (e.g., to promote ketosis, weight loss and/or management, etc.).

However, butyrate and/or butyric acid may not be palatable to individuals (e.g., since the odor and taste are often compared to vomit). Thus, in some implementations, butyrate and/or beta-hydroxybutyrate (e.g., R-beta-hydroxybutyrate) may be processed to reduce organoleptic reactions. For example, the butyrate and/or beta-hydroxybutyrate (e.g., R-beta-hydroxybutyrate) may be encapsulated, microemulsion, liposomes, agglomeration, masking/flavoring technologies, and/or otherwise processed as appropriate to reduce organoleptic reactions from individuals administered the described composition(s). In some implementations, microencapsulated butyrate, beta-hydroxybutyrate, and/or butyric acid may be utilized (e.g., in combination with beta-hydroxybutyrate). Using microencapsulated butyrate, beta-hydroxybutyrate, and/or butyric acid (e.g., when compared with using unencapsulated forms) may increase individual satisfaction and/or compliance with an administration schedule since odor from the butyrate and/or butyric acid may be reduced and/or removed. The microencapsulated butyrate, beta-hydroxybutyrate, and/or butyric acid may be a free flowing granular powder; dispersible in water; stable in acidic water solution for 30 minutes; allow controlled release in stomach and/or small intestines; inhibit glucose response (e.g., to any added materials); and/or allow delivery of a high butyrate content (e.g., around 70%).

In some implementations, a pharmaceutically effective amount of butyrate may be administered via triglyceride tributyrin (e.g., glyceryl tributyrate or tributyrin). The butyrate via triglyceride tributyrin may be administered separately and/or in conjunction with one or more of the other described compounds (e.g., beta-hydroxybutyrate, fatty acids and/or esters, etc.). For example, up to approximately 200 mg/kg of the individual may be administered (e.g., up to 3 times daily). Administration of the tributyrin may allow a delayed release of butyrate to the body as the tributyrin is processed by the body of the individual. The tributyrin may be unencapsulated and/or encapsulated (e.g., microencapsulated).

In some implementations, administration of beta-hydroxybutyrate and a short chain compound (e.g., short chain fatty acid and/or short chain triglyceride) may unexpectedly increase beta-hydroxybutyrate concentrations in the blood more than the administration of similar amounts of beta-hydroxybutyrate and medium chain compounds (e.g., short chain fatty acid and/or short chain triglyceride) and/or may increase beta-hydroxybutyrate concentrations in the blood more than each component individually.

In some implementations, a pharmaceutically effective amount of beta-hydroxybutyrate may be administered with a pharmaceutically effective amount of long chain fatty acid and/or triglyceride. For example, 0.1-50 g of beta-hydroxybutyrate and 0.1 to 50 g of long chain fatty acid may be administered to an individual between 1-5 times a day. In some implementations, approximately 1 g to approximately 3 g of beta-hydroxybutyrate and approximately 1 g of long chain fatty acid and/or triglyceride may be administered from once a day to approximately 5 times a day.

In some implementations, beta-hydroxybutyrate, short chain compound(s) (e.g., fatty acids and/or triglycerides, butyrate), and/or medium chain compound(s) (e.g., fatty acids and/or triglycerides) may be administered approximately simultaneously and/or sequentially to an individual. For example, approximately 0.1 g to approximately 50 g beta-hydroxybutyrate, approximately 0.1 g to approximately 50 g short chain triglyceride, and approximately 0.1 g to approximately 50 g medium chain fatty acid such as lauric acid and/or coconut oil may be administered between 1-5 times a day. In some implementations, approximately 1 g to approximately 3 g of beta-hydroxybutyrate and approximately 1 g of short chain fatty acid and/or triglyceride and/or approximately 1 g of medium chain fatty acid and/or triglyceride may be administered from once a day to approximately 5 times a day. In some implementations, approximately 0.1 g to approximately 20 g beta-hydroxybutyrate (e.g., salts, esters, isomers, and/or other appropriate forms) may be administered in humans. In some implementations, approximately 0.1 g to approximately 20 g butyrate may be administered in humans.

In some implementations, other compounds, such as compounds capable of independently decreasing glucose levels, may be administered with beta-hydroxybutyrate, such as berberine and/or associated metabolites (e.g., dihydroberberine and/or tetrahydroberberine). U.S. patent application Ser. No. 15/491,933 entitled "ADMINISTRATION OF DIHYDROBERBERINE" to Lowery et al, filed Apr. 19, 2017 and U.S. Provisional Patent Application No. 62/324,794, entitled "ADMINISTRATION OF DIHYDROBERBERINE" to Lowery et al, filed Apr. 19, 2016, describe dihydroberberine administration with ketone sensitizers such as beta-hydroxybutyrate, and is hereby fully incorporated herein. In some implementations, one or more beta-hydroxybutyrates and/or other compounds described herein may be utilized as a ketone sensitizer with the dihydroberberine.

In some implementations, directly administering beta-hydroxybutyrate plus another compound that is processed to deliver beta-hydroxybutyrate (e.g., beta-hydroxybutyrate ester, beta-hydroxybutyrate polymer, butyrate, other appropriate compounds, and/or combinations thereof) over time may allow a first level of beta-hydroxybutyrate in the blood to be maintained over a period of time. For example, since the directly administered beta-hydroxybutyrate may elevate blood beta-hydroxybutyrate levels to a first concentration and this concentration may be approximately maintained over a period of time by providing additional beta-hydroxybutyrate via another compound administered approximately concurrently (e.g., short chain fatty acid and/or triglyceride, beta-hydroxybutyrate ester, beta-hydroxybutyrate polymer, beta-hydroxybutyrate amino acid complex, etc.).

In some implementations, one or more other compounds may be administered (e.g., included in the composition and/or separately administered) with the butyrate (e.g., microencapsulated butyrate), beta-hydroxybutyrate (e.g., R-beta-hydroxybutyrate) and/or fatty acids or esters, such as short chain fatty acids. Other compositions may include, but are not limited to amino acids, amino acid metabolites, vitamins, minerals, coconut milk powder, flavorings, colorings, binders, electrolytes, tetrahydrobiopeterin, nucleic acids, alpha-ketoglutaric acid, alpha lipoic acid, nutritional co-factors, beta-methyl-beta-hydroxybutyrate, arginine alpha-ketoglutarate, R-alpha lipoic acid, thiamine, NAD+, NADH, riboflavin, FAD+, FADH, riboflavin-5-phosphate, niacin, nicotinic acid, niacinamide, inositol hexanicotinate, pyridoxine, pyridoxal, pyridoxamine, ascorbic acid and ascorbate salts, citric acid, malic acid, sodium benzoate, Pyridoxal-5-Phosphate, methylcobalamin, cyanocobalamin, adenosylcobalamin, hydroxycobalamin, pantothenic acid, pantetheine, potassium sorbate, acesulfame K, aspartame, sucralose, stevia, monk fruit extract, allulose, prebiotic fibers, XOS, GOS, MOS, IMO, LOS, xanthan gum and other organic gums/thickeners/suspension agents, and combinations thereof.

In various implementations, administration of a composition that includes beta-hydroxybutyrate may improve the health of an individual. R-beta-hydroxybutyrate may be capable of providing a greater impact on the health of an individual than D,L-beta-hydroxybutyrate and/or L-beta-hydroxybutyrate. Although previously unknown, L-beta-hydroxybutyrate may decrease the effectiveness of R-beta-hydroxybutyrate with respect to at least a portion of the impact on health. With respect to some impacts on health, L-beta-hydroxybutyrate may have no impact on health. In some implementations, even double the amount of D,L-beta-hydroxybutyrate may not achieve some of the same results (e.g., in health improvement) as R-beta-hydroxybutyrate. Thus, unexpectedly administration of D,L-beta-hydroxybutyrate rather than R-beta-hydroxybutyrate may not have the same impact on health and/or have less of an impact on health of an individual. For example, administration of a composition that includes R-beta-hydroxybutyrate (e.g., and/or other compounds) may improve and/or maintain an individual's health.

Administration of R-beta-hydroxybutyrate as described may increase lifespan in individuals following a dietary plan (e.g., standard American low-fat, ketogenic, Paleo, Mediterranean, etc.) and/or not following a dietary plan. For example, approximately 10 g of R-beta-hydroxybutyrate to approximately 30 g R-beta-hydroxybutyrate may be administered to increase lifespan. In some implementations, other appropriate amounts of R-beta-hydroxybutyrate may be included in the composition.

In some implementations, administration of R-beta-hydroxybutyrate may treat and/or lessen the impact of symptoms of disease(s) and/or disorders, such as diseases that impact cognitive function. Administration of R-beta-hydroxybutyrate may increase motor function in individuals with Parkinson's disease. For example, approximately 5 g of R-beta-hydroxybutyrate to approximately 15 g R-beta-hydroxybutyrate may be administered to increase motor function. In some implementations, other appropriate amounts of R-beta-hydroxybutyrate may be included in the composition.

Administration of R-beta-hydroxybutyrate may increase fat loss. Unlike with conventional diets, in which weight loss often comes from decreases in water retention and/or muscle mass, administration of R-beta-hydroxybutyrate may cause decreases in fat loss (see for example, FIG. 5B). In addition, administration of R-beta-hydroxybutyrate may decrease levels of LPL in the body, and thus reduce or inhibit fat storage and/or encourage existing fat storage utilization by the body. For example, approximately 1 g of R-beta-hydroxybutyrate to approximately 20 g R-beta-hydroxybutyrate may be administered to cause fat loss and/or reduce fat storage. In some implementations, other appropriate amounts of R-beta-hydroxybutyrate may be included in the composition. Administration of R-beta-hydroxybutyrate may allow fat loss greater than 5 kg while maintaining lean mass. In some implementations, the administration of R-beta-hydroxybutyrate increases the amount of fat used as fuel.

In some implementations, administration of R-beta-hydroxybutyrate may improve and/or maintain health markers such as C-reactive protein and/or fasting glucose. Administration of R-beta-hydroxybutyrate may decrease inflammation (e.g., as shown by C-reactive protein levels). Administration of R-beta-hydroxybutyrate may decrease fasting glucose. For example, approximately 3 g of R-beta-hydroxybutyrate to approximately 20 g R-beta-hydroxybutyrate may be administered to cause a reduction in and/or maintain a low fasting glucose. In some implementations, other appropriate amounts of R-beta-hydroxybutyrate may be included in the composition. In some implementations, R-beta-hydroxybutyrate may be administered with one or more other compounds to decrease glucose levels and/or sensitivity. For example, administration of a composition of R-beta-hydroxybutyrate and a berberine, such as dihydroberberine, may cause reduce and/or maintain low fasting glucose. Administration of a composition of R-beta-hydroxybutyrate and a berberine, such as dihydroberberine, may cause reduce and/or maintain low glucose levels. In some implementations, less than approximately 15 g of R-beta-hydroxybutyrate may be administered with less than approximately 600 mg of dihydroberberine.

Administration of R-beta-hydroxybutyrate may decrease ketone levels (see e.g., FIGS. 11A and 11B). Decreasing blood ketone levels may increase weight loss, maintain weight loss, improve performance, increase mental acuity, and/or have other health improvement and health maintenance features. For example, even at levels less than 10 g (e.g., approximately 5 g), administration of R-beta-hydroxybutyrate may decrease ketone levels while L-R-beta-hydroxybutyrate does not, and D,L-beta-hydroxybutyrate does not to the same extent. R-beta-hydroxybutyrate may increase blood ketone levels 5 times as much as similar administration amounts of D,L-beta-hydroxybutyrate. By being able to decrease an amount of R-beta-hydroxybutyrate (e.g., when compared with administering D,L-beta-hydroxybutyrate) administered and achieve the same results, a decrease in an amount cation (e.g., sodium, potassium, etc.) may also be administered. Since some individuals may prefer and/or may not tolerate higher dosages of the cations of the R-beta-hydroxybutyrate salt, utilizing R-beta-hydroxybutyrate may allow administration to more people, increase user satisfaction, and/or decrease side effects (e.g., associated with additional consumption of these cations). In some implementations, approximately 0.1 g of R-beta-hydroxybutyrate to approximately 10 g R-beta-hydroxybutyrate may be administered to increase blood ketone levels. Approximately 0.5 g of R-beta-hydroxybutyrate to approximately 3 g R-beta-hydroxybutyrate may be administered to maintain blood ketone levels. In some implementations, other appropriate amounts of R-beta-hydroxybutyrate may be included in the composition.

Administration of R-beta-hydroxybutyrate may increase performance and decrease perceived exertion (e.g., as opposed to when administered D,L-beta-hydroxybutyrate). For example, approximately 3 g of R-beta-hydroxybutyrate to approximately 15 g R-beta-hydroxybutyrate may be administered to increase performance and/or decrease perceived exertion. In some implementations, other appropriate amounts of R-beta-hydroxybutyrate may be included in the composition.

In various implementations, oral administration of R-beta-hydroxybutyrate may increase muscle protein synthesis while D,L-beta-hydroxybutyrate does not increase muscle protein synthesis. For example, approximately 10 g of R-beta-hydroxybutyrate to approximately 30 g R-beta-hydroxybutyrate may be administered to increase muscle protein synthesis. In some implementations, other appropriate amounts of R-beta-hydroxybutyrate may be included in the composition.

In some implementations, the administration of R-beta-hydroxybutyrate, unlike D,L-beta-hydroxybutyrate may decrease perceived hunger and/or increase satiety) which may inhibit overeating and thus promote weight loss (see e.g., FIGS. 13A and 13B). In some implementations, the administration of R-beta-hydroxybutyrate, unlike D,L-beta-hydroxybutyrate may increased perceived energy (see e.g., FIG. 13C).

In some implementations, administration of R-beta-hydroxybutyrate increased mental acuity. For example, approximately 0.1 g of R-beta-hydroxybutyrate to approximately 10 g R-beta-hydroxybutyrate may be administered to increase mental acuity. In some implementations, other appropriate amounts of R-beta-hydroxybutyrate may be included in the composition.

In some implementations, the administration of R-beta-hydroxybutyrate may be supplemented with other forms of beta-hydroxybutyrate, butyric acid, and/or butyrate.

In some implementations, the composition administered may include R-beta-hydroxybutyrate. The amount of R-beta-hydroxybutyrate included in the composition may be selected to obtain a result (e.g., induce ketosis; maintain ketosis; increase ketone levels, mental acuity, strength, etc.) upon administration (e.g., a pharmaceutically effective amount may be administered at a dosage and/or over a predetermined time period). In some implementations, the dosage and/or frequency of dosage may vary over time (e.g., initial vs a lower dosage for maintenance, vary based on time of day, vary based on whether taken with or without a meal, etc.).

The R-beta-hydroxybutyrate in the composition may include any appropriate and/or appropriate number of forms, such as salts, derivatives (e.g., esters), polymers, and/or complexes with other compounds. For example, the composition may include R-beta-hydroxybutyrate salt (e.g., sodium R-beta-hydroxybutyrate, magnesium R-beta-hydroxybutyrate, and/or potassium R-beta-hydroxybutyrate) and/or another form of R-beta-hydroxybutyrate (e.g., ester, polymer, complex, etc.). In some implementations, the composition may include an ester of R-beta-hydroxybutyrate. The composition may include an amino acid (e.g., separate and/or complexed with R-beta-hydroxybutyrate), such as leucine. The use of non-salt base R-beta-hydroxybutyrate may increase user satisfaction (e.g., by reducing the cation, such as sodium and/or potassium, load due to ingestion of the composition; by decreasing side effects; etc.), increase the applicability of the administration (e.g., since users sensitive to the cations of the R-beta-hydroxybutyrate salts may be less sensitive to the non-salt and/or lower salt plus non-salt forms of the composition). The administration of the composition may increase blood ketone levels, induce ketosis, maintain blood ketone levels, maintain ketosis, increase health, increase strength, increase mental acuity, etc. In some implementations, a first composition that includes R-beta-hydroxybutyrate salt may be administered to cause a first impact (e.g., induce ketosis, quickly increase mental acuity, quickly increase strength, etc.) and a second composition that includes non-salts R-beta-hydroxybutyrate (e.g., esters, polymers, complexes, etc.) and/or lower levels of R-beta-hydroxybutyrate salt may be utilized to cause a second impact (e.g., maintain ketosis, maintain mental acuity, maintain increased strength, etc.).

In some implementations, the form(s) of R-beta-hydroxybutyrate included in the may be selected based on the delivery form. For example, in some forms of food products the composition may include R-beta-hydroxybutyrate polymer (e.g., due to taste since increased cations like sodium may decrease palatability; due to nutrition since increased cations such as sodium may decrease nutrition; due to mixability, etc.). As another example, the composition may include R-beta-hydroxybutyrate salts or other forms (e.g., microencapsulated) to provide quick dissolve powders.

In various implementations, a composition may include R-beta-hydroxybutyrate. The R-beta-hydroxybutyrate may be in any appropriate form (e.g., salt, ester, polymer, complex, derivatives thereof, and/or combinations thereof). The composition may include one or more additional compositions. Additional composition(s) may be capable of independently increasing blood ketone levels (e.g., fatty acids or esters, berberine or berberine metabolites such as dihydroberberine, etc.). Additional composition(s) may be capable of independently decreasing blood glucose levels (e.g., berberine or berberine metabolites such as dihydroberberine). In some implementations, additional compounds may not be capable of independently increasing blood ketone levels and/or decreasing blood glucose levels (e.g., additives, flavorings, colorings, minerals, vitamins, binders, anti-caking agents, etc.). The composition may be administered in an effective amount to cause a predetermined health impact (e.g., predetermined level of ketosis, blood ketone level, mental acuity, strength increase, perceived energy, fat loss, weight loss, etc.). The composition may be administered to an individual in a predetermined amount and/or different amounts over an administration schedule. In some implementations, once a first criteria is satisfied (e.g., period of time, number of doses, predetermined health impact), the dosage amount may be altered. For example, first dose(s) of the composition may be administered to cause a predetermined health impact and additional lower dose(s) of the composition may be administered to maintain the predetermined health impact (e.g., caused in part by the first doses).

The composition may be administered in any appropriate delivery form (e.g., tablet; capsule; food products such as powdered products that can be mixed into food, mixed into beverages, and/or consumed directly; beverage product; etc.). The composition may be administered according to any appropriate schedule (e.g., periodic dosages, dosages as user desires, etc.). The administration schedule may inhibit administration that elevates blood ketone levels too high, decreases blood glucose levels too low, and/or causes an individual to consume a dosage that substantially elevates the risk of adverse and/or side effects, in some implementations.

In some implementations, the composition may include a long acting component and/or be long-acting. For example, since the body digests polymers and/or esters of beta-hydroxybutyrate (e.g., R-beta-hydroxybutyrate), the delivery of R-beta-hydroxybutyrate may be slower than a digestion of a beta-hydroxybutyrate salt (e.g., R-beta-hydroxybutyrate salt). In some implementations, the composition may include a R-beta-hydroxybutyrate and a long acting R-beta-hydroxybutyrate form (e.g., polymer, ester, coated and/or processed form to provide slow release). In some implementations, a first dose(s) may include at least one non-long acting form of beta-hydroxybutyrate and a second dose(s) may include at least one long-acting form of beta-hydroxybutyrate. The first dose(s) may be administered to cause a predetermined health impact and the second dose(s) may be administered to maintain the caused predetermined health impact. In some implementations, users may select the appropriate dose based on user preference and/or properties (e.g., a user on a ketogenic diet may chose the second dose since the user may already be in ketosis).

In various implementations, the R-beta-hydroxybutyrate salt blend may include a first mixture of R-beta-hydroxybutyrate and one or more other second R-beta-hydroxybutyrate salts (e.g., non-sodium R-beta-hydroxybutyrate salt and non-potassium R-beta-hydroxybutyrate salt). The ratio of the weight of the first mixture to the total weight of the beta-hydroxybutyrate compounds in the composition may be approximately 2 to approximately 5. The ratio of the weight of the first mixture to weight of other types of beta-hydroxybutyrate in the composition (e.g., non-sodium and/or non-potassium R-beta-hydroxybutyrate salts, etc.) may be approximately 2.5 to approximately 5.

This specified R-beta-hydroxybutyrate salt blend may provide greater efficacy when compared with other delivery methods of R-beta-hydroxybutyrate, such as delivery via a single salt of R-beta-hydroxybutyrate salt and/or a balanced blend of R-beta-hydroxybutyrate salt (e.g., R-beta-hydroxybutyrate provided in approximately equal amounts of each salt in the R-beta-hydroxybutyrate salt blend composition). For example, a smaller amount of R-beta-hydroxybutyrate may be utilized in the R-beta-hydroxybutyrate salt blend to provide similar effects to a single salt of R-beta-hydroxybutyrate salt blend and/or a balanced blend of R-beta-hydroxybutyrate salt. Thus, less cations associated with the salts may be administered, which may increase tolerance by some individuals). In some implementations, an approximately equal weight of the described R-beta-hydroxybutyrate salt blend may provide greater efficacy as a balanced blend of R-beta-hydroxybutyrate. As another non-limiting example, the administration of the R-beta-hydroxybutyrate salt blend may allow easier induction of ketosis, weight loss, maintenance of ketosis, maintenance of weight loss, etc., when compared with efficacy of a single salt of R-beta-hydroxybutyrate salt and/or a balanced blend of R-beta-hydroxybutyrate salt. The R-beta-hydroxybutyrate salt blend may increase blood ketone levels in the body rapidly (e.g., when compared with single salt R-beta-hydroxybutyrate and/or balanced blend R-beta-hydroxybutyrate) such that ketosis is more easily induced in an individual.

In various implementations, the first mixture of R-beta-hydroxybutyrate in the R-beta-hydroxybutyrate salt blend includes sodium R-beta-hydroxybutyrate and potassium R-beta-hydroxybutyrate. The sodium R-beta-hydroxybutyrate may be provided as sodium R-beta-hydroxybutyrate or any other appropriate R-beta-hydroxybutyrate sodium salt. The potassium R-beta-hydroxybutyrate may be provided as potassium R-beta-hydroxybutyrate or any other appropriate beta-hydroxybutyrate potassium salt. The amount of sodium R-beta-hydroxybutyrate to potassium R-beta-hydroxybutyrate in the first composition may be the same or different. The R-beta-hydroxybutyrate salt blend may include approximately 0.5 to 20 g of the first mixture. In some implementations, the R-beta-hydroxybutyrate salt blend may include approximately 0.5 to approximately 12 g of the first mixture. The first mixture may include approximately 5 to approximately 8 g R-beta-hydroxybutyrate. The first mixture may include approximately 0.5 to approximately 1.5 g R-beta-hydroxybutyrate.

The one or more second R-beta-hydroxybutyrate salts may include any other appropriate salt (e.g., not sodium R-beta-hydroxybutyrate, not potassium R-beta-hydroxybutyrate). For example, the one or more second R-beta-hydroxybutyrate salts may include beta-hydroxybutyrate calcium salt (e.g., calcium beta-hydroxybutyrate), beta-hydroxybutyrate magnesium salt (e.g., magnesium beta-hydroxybutyrate), beta-hydroxybutyrate lithium salt (e.g., lithium beta-hydroxybutyrate), sodium beta-hydroxybutyrate, arginine beta-hydroxybutyrate, lysine beta-hydroxybutyrate, histidine beta-hydroxybutyrate, ornithine beta-hydroxybutyrate, creatine beta-hydroxybutyrate, agmatine beta-hydroxybutyrate, or citrulline beta-hydroxybutyrate, other appropriate organic salts that include beta-hydroxybutyrate, and/or combinations thereof. In some implementations, the second R-beta-hydroxybutyrate may include beta-hydroxybutyrate salts including calcium, magnesium, zinc, selenium, chromium, other appropriate minerals, and/or combinations thereof.

The R-beta-hydroxybutyrate salt blend may include sodium R-beta-hydroxybutyrate, potassium R-beta-hydroxybutyrate, and calcium R-beta-hydroxybutyrate. Other forms of R-beta-hydroxybutyrate may or may not be included. In some implementations, the R-beta-hydroxybutyrate may include sodium R-beta-hydroxybutyrate, potassium R-beta-hydroxybutyrate, calcium R-beta-hydroxybutyrate, and one or more other forms of R-beta-hydroxybutyrates.

In some implementations, the R-beta-hydroxybutyrate included in the composition may be a more purified form of R-beta-hydroxybutyrate (e.g., rather than D, L-beta-hydroxybutyrate). For example, R-beta-hydroxybutyrate may include less than approximately 10 percent, less than approximately 5 percent, or less than approximately 1 percent L-beta-hydroxybutyrate. As another non-limiting example, R-beta-hydroxybutyrate may include less than approximately 1 g of L-beta-hydroxybutyrate. R-beta-hydroxybutyrate may have a greater bioavailability than other chiralities of beta-hydroxybutyrate. R-beta-hydroxybutyrate may have a greater impact on a health of an individual (e.g., due to decreased side effects; increase ketone levels, weight loss, mental acuity, fat loss, joint heath, decrease inflammation, etc.) than L-beta-hydroxybutyrate and/or D, L-beta-hydroxybutyrate. In some implementations, R-beta-hydroxybutyrate may cause improvements in health not capable by L-beta-hydroxybutyrate and/or D, L-beta-hydroxybutyrate. R-beta-hydroxybutyrate may have less impurities due to manufacturing, such as less crotonic acid (e.g., which can be harmful to individuals), than other forms of beta-hydroxybutyrate (e.g., L-beta-hydroxybutyrate and/or D, L-beta-hydroxybutyrate). In some implementations, R-beta-hydroxybutyrate may be more capable of binding with other compounds (e.g., purine, lysine, potassium, and/or other amino acids; dihydroberberine; etc.) to deliver the beta-hydroxybutyrate to a human. Thus, R-beta-hydroxybutyrate (e.g., greater than 90 percent purity of R-beta-hydroxybutyrate and less than 10 percent L-beta-hydroxybutyrate) and/or mixtures with R-beta-hydroxybutyrate may be administered to humans. In some implementations, unexpectedly, a smaller amount of R-beta-hydroxybutyrate may be as pharmaceutically effective (e.g., in increasing and/or maintaining weight loss; in increasing and/or maintaining elevated ketone levels, etc.) or more pharmaceutically effective as D, L-beta-hydroxybutyrate (e.g., racemic mixture of D- and L-beta-hydroxybutyrate). For example, approximately half an amount of R-beta-hydroxybutyrate may be administered to achieve the approximately the same efficacy as D, L-beta-hydroxybutyrate and/or L-beta-hydroxybutyrate. The R-beta-hydroxybutyrate may be more bioavailable than other chiralities of beta-hydroxybutyrate and thus allow a smaller effective amount than other chiralities. Thus, by utilizing R-beta-hydroxybutyrate, the administration amount of beta-hydroxybutyrate to be reduced (e.g., when compared to the administration amount of D, L-beta-hydroxybutyrate) while providing a pharmaceutically effective amount, such as (e.g., for weight loss and/or maintenance; for elevating and/or maintaining blood ketone levels). Thus, the greater efficacy of R-beta-hydroxybutyrate is further increased by the use of the described specific ratio of sodium R-beta-hydroxybutyrate and potassium R-beta-hydroxybutyrate to other types of R-beta-hydroxybutyrate salts.

Reducing the amount of beta-hydroxybutyrate, when the beta-hydroxybutyrate is provided in R-beta-hydroxybutyrate blended salt, may reduce a user's intake of the cation of the salt (e.g., sodium, potassium, etc.). Since intake of some of these cations in beta-hydroxybutyrate salts, such as sodium, potassium, magnesium, and calcium, in amounts greater than a predetermined recommended amount may cause health problems (e.g., organ damage, gastrointestinal problems, etc.), reducing the amount cations by using the R-beta-hydroxybutyrate salt blend (e.g., since it has greater efficacy when compared to single salt R-beta-hydroxybutyrate and/or balanced blends of R-beta-hydroxybutyrate) may inhibit side effects and/or health problems associated salts combined with beta-hydroxybutyrate administration in users.

In some implementations, a pharmaceutically effective amount of the R-beta-hydroxybutyrate salt blend may be administered in an individual to promote and/or maintain ketosis, cause weight loss and/or manage weight, and/or increase blood ketone levels. The administration may cause weight loss and/or maintenance; elevated beta-hydroxybutyrate levels in the blood; elevated, reduced, and/or maintenance of blood ketone levels; induction and/or maintenance of ketosis; and/or reduction; improve mental acuity; improve focus; improve energy; improve cognitive function; reduce traumatic brain injury; improve diabetes; improve glucose tolerance; decrease blood glucose levels; reduce neurological disorders and/or symptoms thereof; improve cancer and/or symptoms thereof; improve inflammatory conditions; suppressing appetite; improve symptoms associated with aging; provide anti-glycation affects; improve epilepsy and/or symptoms thereof; improve depression and/or symptoms thereof; improve performance; improve strength; increase muscle mass; increase fat loss; increase joint health; decrease inflammation; improve body composition; improve energy; improve focus; improve cognitive function; improve mood and/or well-being; and/or combinations thereof. The beta-hydroxybutyrate (e.g., R-beta-hydroxybutyrate) may be administered in healthy and not healthy individuals (e.g., individuals with diseases and/or disorders).

In some implementations, the R-beta-hydroxybutyrate salt blend composition may include one or more additional components.

In some implementations, the R-beta-hydroxybutyrate salt blend may include butyrate, other forms of beta-hydroxybutyrate (e.g., other than those provided in the first R-beta-hydroxybutyrate mixture and one or more second R-beta-hydroxybutyrate salts) and/or related compounds. The other forms of beta-hydroxybutyrate may include D, L-beta-hydroxybutyrate salts and/or beta-hydroxybutyrate esters. In some implementations, beta-hydroxybutyrate may include beta-hydroxybutyrate bound to another compound (e.g., amino acids) and/or polymers of beta-hydroxybutyrate. In some implementations, the beta-hydroxybutyrate may be complexed and/or coupled to another compound (e.g., amino acid and/or berberine) and a beta-hydroxybutyrate salt may include a complex (e.g., chelate) that includes a mineral (e.g., calcium, zinc, etc.) and the beta-hydroxybutyrate compound coupled to another compound. The beta-hydroxybutyrate may include single isomer beta-hydroxybutyrate and/or polymer beta-hydroxybutyrate (e.g., D, L-beta-hydroxybutyrate, R-beta-hydroxybutyrate, and/or L-beta-hydroxybutyrate). For example, the beta-hydroxybutyrate may include polymer R-beta-hydroxybutyrate. In some implementations, beta-hydroxybutyrate may be administered with 1,3-butanediol, ethyl acetoacetate, ethyl beta-hydroxybutyrate.

In some implementations, the R-beta-hydroxybutyrate salt blend composition may include one or more amino acids. The amino acid may be included in the composition and/or coupled to (e.g., chemically bonded to) a beta-hydroxybutyrate. Amino acids included in the R-beta-hydroxybutyrate salt blend may include for example, leucine, lysine, taurine, arginine, histidine, ornithine, creatine, agmatine, citrulline and/or combinations thereof. In some implementations, the R-beta-hydroxybutyrate salt blend may include an R-beta-hydroxybutyrate amino acid complex. For example, R-beta-hydroxybutyrate may be bound to leucine, taurine, purine, lysine, and/or other amino acids. The amino acid may increase efficacy of the R-beta-hydroxybutyrate salt blend. Administration of beta-hydroxybutyrate that is coupled to an amino acid in the salt blend and/or of administration of an amino acid in and/or with the R-beta-hydroxybutyrate salt blend may reduce the intake of cations associated with beta-hydroxybutyrate salts (e.g., which may inhibit side effects associated with administration) and/or allow administration of another compound that has health benefits (e.g., administration of some amino acid may promote smooth muscle growth and/or cell repair).

In some implementations, approximately 0.5 g to approximately 10 g of one or more amino acids may be administered with and/or in the R-beta-hydroxybutyrate salt blend. For example, the compound may include approximately 0.5 g to approximately 20 g of the R-beta-hydroxybutyrate compositions (e.g., sodium, potassium and/or other R-beta-hydroxybutyrates) and approximately 0.5 g to approximately 60 mg of one or more amino acids, such as leucine and/or taurine. The compound may be administered one or more times daily.

In some implementations, approximately 0.5 g to approximately 2 g of an amino acid, such as leucine, may be administered with and/or in the R-beta-hydroxybutyrate salt blend. For example, approximately the R-beta-hydroxybutyrate salt blend composition administered may include approximately 0.1 to approximately 10 g R-beta-hydroxybutyrate compositions (e.g., sodium, potassium and/or other R-beta-hydroxybutyrates) and approximately 0.5 to approximately 3 g of leucine. The R-beta-hydroxybutyrate and the leucine may be a mixture; administered separately and proximate in timing; a complex, and/or administered in any other appropriate manner.

In some implementations, approximately 0.5 g to approximately 2 g of an amino acid, such as taurine, may be administered with and/or in the R-beta-hydroxybutyrate salt blend. For example, approximately the R-beta-hydroxybutyrate salt blend composition administered may include approximately 0.1 to approximately 10 g R-beta-hydroxybutyrate compounds (e.g., sodium, potassium and/or other R-beta-hydroxybutyrates) and approximately 0.5 to approximately 3 g of taurine. The R-beta-hydroxybutyrate and the taurine may be a mixture; administered separately and proximate in timing; a complex, and/or administered in any other appropriate manner.

In some implementations, approximately 0.5 g to approximately 6 g of one or more amino acids may be administered with and/or in the R-beta-hydroxybutyrate salt blend. For example, approximately the R-beta-hydroxybutyrate salt blend composition administered may include approximately 0.1 to approximately 10 g R-beta-hydroxybutyrate compositions (e.g., sodium, potassium and/or other R-beta-hydroxybutyrates), approximately 0.5 to approximately 3 g of leucine, and approximately 0.5 to approximately 3 g of taurine. The R-beta-hydroxybutyrate, leucine, and taurine may be a mixture; administered separately and proximate in timing; a complex, and/or administered in any other appropriate manner.

In some implementations, the R-beta-hydroxybutyrate salt blend composition may include R-beta-hydroxybutyrate salt and beta-hydroxybutyrate-amino acid complex (e.g., beta-hydroxybutyrate bound to amino acid, such as R-beta-hydroxybutyrate-leucine complex). For example, the R-beta-hydroxybutyrate salt blend may include sodium R-beta-hydroxybutyrate, potassium R-beta-hydroxybutyrate, one or more other types of R-beta-hydroxybutyrate, and an amount of beta-hydroxybutyrate amino-acid complex.

In some implementations, the R-beta-hydroxybutyrate salt blend (e.g., first mixture and/or other types of R-beta-hydroxybutyrate) may include beta-hydroxybutyrate esters. In some implementations, a portion of the beta-hydroxybutyrate salt (e.g., R-beta-hydroxybutyrate or other forms of beta-hydroxybutyrate) of the R-beta-hydroxybutyrate salt blend and the beta-hydroxybutyrate ester may be a bound complex, a mixture of compounds, and/or separately administered approximately concurrently. In some implementations, the beta-hydroxybutyrate ester may be in powdered form (e.g., plated beta-hydroxybutyrate ester), liquid and/or gel form. The combination of the R-beta-hydroxybutyrate from the R-beta-hydroxybutyrate salt blend and the beta-hydroxybutyrate ester of the R-beta-hydroxybutyrate salt blend during administration may allow less salt to be utilized while producing a result (e.g., weight maintenance and/or loss; enhanced and/or maintained ketosis; elevated blood ketone levels; blood glucose reduction and/or maintenance; increase in energy; increase in mood; increase in performance; and/or increase in cognitive function). In some implementations, elevated ketone levels (e.g., elevated blood ketone levels) may increase energy, mood, performance, and/or cognitive function in users. For example, the administration of the beta-hydroxybutyrate salt in the R-beta-hydroxybutyrate salt blend may cause a first level of blood ketone level, which may be maintained by processing of the second amount of the beta-hydroxybutyrate ester (e.g., as the body of the individual processes the beta-hydroxybutyrate ester the level of beta-hydroxybutyrate in the blood, and thus blood ketone level, may also increase over time to enhance and/or maintain the initial elevation caused by of the administered beta-hydroxybutyrate salt.). For example, a ratio of beta-hydroxybutyrate salt in the R-beta-hydroxybutyrate salt blend to beta-hydroxybutyrate ester may be approximately 1 beta-hydroxybutyrate salt: approximately 1 beta-hydroxybutyrate ester to approximately 1 beta-hydroxybutyrate salt: approximately 20 beta-hydroxybutyrate ester. The ratio of beta-hydroxybutyrate in the R-beta-hydroxybutyrate salt blend to beta-hydroxybutyrate ester may be approximately 20 beta-hydroxybutyrate salt: approximately 1 beta-hydroxybutyrate ester to approximately 1 beta-hydroxybutyrate salt: approximately 20 beta-hydroxybutyrate ester. In some implementations, a ratio of beta-hydroxybutyrate in the R-beta-hydroxybutyrate salt blend to beta-hydroxybutyrate ester may be approximately 1 beta-hydroxybutyrate salt: approximately 1 beta-hydroxybutyrate ester to approximately 1 beta-hydroxybutyrate salt: approximately 5 beta-hydroxybutyrate ester.

In some implementations, the R-beta-hydroxybutyrate salt blend may include derivatives of beta-hydroxybutyrate, include esters of (R)-3-hydroxybutyrate and oligomers of (R)-3-hydroxybutyrate. For example, beta-hydroxybutyrate esters derived from alcohols, such as altrose, arabinose, dextrose, erythrose, fructose, galactose, glucose, glycerol, gulose, idose, lactose, lyxose, mannose, ribitol, ribose, ribulose, sucrose, talose, threose, xylitol, xylose, galactosamine, glucosamine, mannosamine, N-acetylglucosamine, mannitol, sorbitol, threitol, (S)-1,2-propanediol and/or (R)-1,3-butanediol. In some implementations, a derivative of the beta-hydroxybutyrate may include structures of (R)-3-hydroxybutyric acid and an exemplary ester thereof (a glycerol monoester). The R chirality of the derivatives may be selected for inclusion in the composition in some implementations (e.g., to deliver R-beta-hydroxybutyrate with the administration of the compound).

In some implementations, the salt blend may include additional compounds that may or may not be capable of independently increasing ketone levels, maintaining ketone levels, inducing ketosis, and/or maintaining ketosis.

For example, additional compounds capable of independently increasing blood ketone levels may include short chain fatty acids (e.g., fatty acid with between 2 carbons than 6 carbons), short chain triglycerides (e.g., triglycerides with less than 6 carbons), medium chain fatty acids (e.g., fatty acid with 6-12 carbons), medium chain triglycerides (e.g., triglycerides with 7-12 carbons), long chain fatty acids (e.g., fatty acids with more than 12 carbons), long chain triglycerides (e.g., triglycerides with more than 12 carbons), and/or combinations thereof. In some implementations, short chain fatty acids and/or triglycerides may include acetate, propionate, and/or butyrate. Medium chain fatty acids and/or triglycerides may include lauric acid and/or coconut oil, coconut milk powder, fractionated coconut oil, isolated hexanoic acid, isolated octanoic acid, isolated decanoic acid, ethoxylated triglyceride, triglyceride derivatives thereof, aldehyde triglyceride derivatives thereof, monoglyceride derivatives thereof, diglyceride derivatives thereof, triglyceride derivatives thereof, and/or alkyl esters thereof. Long chain fatty acids and/or triglycerides may include dairy products and/or palm oil. In some implementations, a composition including R-beta-hydroxybutyrate and an additional compound that is independently capable of increasing ketone levels may increase ketone levels greater than merely the capability of each component individually (e.g., greater than an additive increase).

For example, a pharmaceutically effective amount of one or more short chain fatty acids and/or one or more short chain triglycerides (e.g., butyric acid and/or butyrate) may be administered with a pharmaceutically effective amount of beta-hydroxybutyrate in the R-beta-hydroxybutyrate salt blend. In some implementations, approximately 1 g to approximately 10 g of R-beta-hydroxybutyrate compounds (e.g., sodium, potassium and/or other R-beta-hydroxybutyrates) and approximately 0.1 g to approximately 50 g of short chain fatty acid and/or triglyceride may be administered in the R-beta-hydroxybutyrate salt blend from once a day to approximately 5 times a day. In some implementations, approximately 1 g to approximately 3 g of R-beta-hydroxybutyrate compounds (e.g., sodium, potassium and/or other R-beta-hydroxybutyrates) and approximately 1 g of short chain fatty acid and/or triglyceride may be administered via the R-beta-hydroxybutyrate salt blend from once a day to approximately 5 times a day.

In some implementations, the short chain fatty acid and/or triglyceride may include butyrate or derivatives of butyrate. Butyrate and/or derivatives of butyrate may be administered with and/or without beta-hydroxybutyrate to manage metabolic conditions, such as ketosis, and/or for other appropriate therapeutic purposes. Administered butyrate may be converted to beta-hydroxybutyrate in humans, and thus may increase the amount of beta-hydroxybutyrate delivered to the user. In some implementations, administration of butyrate and beta-hydroxybutyrate may promote hGH synthesis, improve basal and GHRH-induced hGH-secretion, increase muscle fiber cross-sectional area, inhibit intramuscular fat accumulation; reduce fat mass in a user; improve glucose metabolism; increase markers of mitochondrial biogenesis in skeletal muscle and/or whole-body oxygen consumption; reduced markers of oxidative stress and apoptosis and altered antioxidant enzyme activity; cause butyrate enhanced intracellular free cytosolic calcium levels (e.g., by acting through GPR41 and 43); increase beta-hydroxybutyrate levels; and/or support barrier function(s) in the gut and/or reduce inflammation associated with ulcerative colitis. Since butyrate is processed by the body to provide beta-hydroxybutyrate, the delivery of beta-hydroxybutyrate via the butyrate may supplement the directly administered beta-hydroxybutyrate via the R-beta-hydroxybutyrate salt blend to maintain a level of beta-hydroxybutyrate in the blood (e.g., to promote ketosis, weight loss and/or management, etc.). However, butyrate and/or butyric acid may not be palatable to individuals (e.g., since the odor and taste are often compared to vomit). Thus, in some implementations, butyrate and/or beta-hydroxybutyrate (e.g., R-beta-hydroxybutyrate) may be processed to reduce organoleptic reactions. For example, the butyrate and/or beta-hydroxybutyrate (e.g., R-beta-hydroxybutyrate) may be encapsulated, microemulsion, liposomes, agglomeration, masking/flavoring technologies, and/or otherwise processed as appropriate to reduce organoleptic reactions from individuals administered the described composition(s). In some implementations, microencapsulated butyrate, beta-hydroxybutyrate, and/or butyric acid may be utilized (e.g., in combination with beta-hydroxybutyrate). Using microencapsulated butyrate, beta-hydroxybutyrate, and/or butyric acid (e.g., when compared with using unencapsulated forms) may increase individual satisfaction and/or compliance with an administration schedule since odor from the butyrate and/or butyric acid may be reduced and/or removed. The microencapsulated butyrate, beta-hydroxybutyrate, and/or butyric acid may be a free flowing granular powder; dispersible in water; stable in acidic water solution for 30 minutes; allow controlled release in stomach and/or small intestines; inhibit glucose response (e.g., to any added materials); and/or allow delivery of a high butyrate content (e.g., around 70%).

In some implementations, the R-beta-hydroxybutyrate salt blend composition may an additional compound independently capable of increasing ketone levels, such as caffeine. In some implementations, the R-beta-hydroxybutyrate salt blend composition may include approximately 0.5 mg to approximately 50 g of R-beta-hydroxybutyrate compounds (e.g., provided through the first mixture, one or more second R-beta-hydroxybutyrate salts, and other components of the R-beta-hydroxybutyrate salt blend) and caffeine. In some implementations, the composition may include approximately 0.5 mg to approximately 15 g of R-beta-hydroxybutyrate compounds (e.g., sodium, potassium and/or other R-beta-hydroxybutyrates) and less than approximately 500 mg of caffeine. In some implementations, the R-beta-hydroxybutyrate salt blend composition may include approximately 0.5 mg to approximately 15 g of R-beta-hydroxybutyrate compounds (e.g., sodium, potassium and/or other R-beta-hydroxybutyrates) and approximately 5 mg to approximately 500 mg of caffeine. In some implementations, the R-beta-hydroxybutyrate salt blend composition may include approximately 0.5 mg to approximately 15 g of R-beta-hydroxybutyrate compounds (e.g., sodium, potassium and/or other R-beta-hydroxybutyrates) and approximately 10 mg to approximately 150 mg of caffeine. In some implementations, the R-beta-hydroxybutyrate salt blend composition may include approximately 0.5 mg to approximately 15 g of R-beta-hydroxybutyrate (e.g., sodium, potassium and/or other R-beta-hydroxybutyrates) and approximately 10 mg to approximately 50 mg of caffeine. The R-beta-hydroxybutyrate salt blend composition with caffeine may increase and or maintain ketosis, weight loss, fat loss, and/or mental acuity. In some implementations, the R-beta-hydroxybutyrate salt blend composition with caffeine may increase mental processes (e.g., acuity including cognitive functioning, mood, energy, alertness, focus, performance, effects of aging, etc.); improve and/or maintain body composition; function as a therapeutic for one or more of the described conditions or disorders (e.g., treat neurological disorders); and/or combinations thereof.

In some implementations, the R-beta-hydroxybutyrate salt blend composition may include an additional compound independently capable of increasing ketone levels, such as 1,3,7,9-Tetramethyluric acid (commercially available as theacrine; and/or commercially available as TeaCrine® from Compound Solutions, California, USA). In some implementations, the R-beta-hydroxybutyrate salt blend composition may include approximately 0.5 mg to approximately 15 g of R-beta-hydroxybutyrate and less than approximately 500 mg of 1,3,7,9-Tetramethyluric acid. In some implementations, the R-beta-hydroxybutyrate salt blend composition may include approximately 5 mg to approximately 15 g of R-beta-hydroxybutyrate and less than approximately 500 mg of 1,3,7,9-Tetramethyluric acid.

In some implementations, the R-beta-hydroxybutyrate salt blend composition may include an additional compound such as an herb or an extract of an herb. For example, an extract of the herb *Uncaria tomentosa* (cat's claw) may be included in the R-beta-hydroxybutyrate salt blend. The extract of the herb *Uncaria tomentosa*, may be provided via commercially available products such as C-MED 100 and/or AC-11.

In some implementations, the R-betahydroxybutyrate composition and/or R-beta-hydroxybutyrate composition may include cannabidiol (CBD). As described in U.S. patent application Ser. Nos. 16/667,851 and 17/771,561 entitled "Administration of Butyrate, Beta-hydroxybutyrate, cannabidiol, and related compounds in humans", which is incorporated by reference for all purposes to the extent the teachings do not conflict with the teachings herein.

In some implementations, the R-beta-hydroxybutyrate salt blend may include a pharmaceutically effective amount of butyrate, administered via triglyceride tributyrin (e.g., glyceryl tributyrate or tributyrin). For example, up to approximately 200 mg/kg of triglyceride tributyrin may be administered (e.g., up to 3 times daily). Administration of the tributyrin may allow a delayed release of butyrate to the body as the tributyrin is processed by the body of the individual. The tributyrin may be unencapsulated and/or encapsulated (e.g., microencapsulated).

In some implementations, administration R-beta-hydroxybutyrate salt blend that includes a short chain compound (e.g., short chain fatty acid and/or short chain triglyceride) may unexpectedly increase beta-hydroxybutyrate concentrations in the blood more than the administration of similar amounts of beta-hydroxybutyrate and medium chain compounds (e.g., short chain fatty acid and/or short chain triglyceride) and/or may increase beta-hydroxybutyrate concentrations in the blood more than each component individually.

In some implementations, the R-beta-hydroxybutyrate salt blend may include a pharmaceutically effective amount of long chain fatty acid and/or triglyceride. For example, the R-beta-hydroxybutyrate salt blend may include 0.1-50 g of beta-hydroxybutyrate (e.g., R-beta-hydroxybutyrate and/or L-beta-hydroxybutyrate provided via sodium, potassium and/or other beta-hydroxybutyrates) and 0.1 to 50 g of long chain fatty acid. This may be administered to an individual between 1-5 times a day. In some implementations, the R-beta-hydroxybutyrate salt blend composition may include approximately 1 g to approximately 3 g of beta-hydroxybutyrate and approximately 1 g of long chain fatty acid and/or triglyceride. This composition may be administered from once a day to approximately 5 times a day.

In some implementations, beta-hydroxybutyrate, short chain compound(s) (e.g., fatty acids and/or triglycerides, butyrate), and/or medium chain compound(s) (e.g., fatty acids and/or triglycerides) may be administered approximately simultaneously and/or sequentially to an individual. For example, the beta-hydroxybutyrate of the R-beta-hydroxybutyrate salt blend may be administered with and/or include approximately 0.1 g to approximately 50 g short chain triglyceride and/or approximately 0.1 g to approximately 50 g medium chain fatty acid (e.g., lauric acid and/or coconut oil). This may be administered between 1-5 times a day. In some implementations, approximately 1 g to approximately 3 g of beta-hydroxybutyrate (e.g., via the R-beta-hydroxybutyrate salt blend) and approximately 1 g of short chain fatty acid and/or triglyceride and/or approximately 1 g of medium chain fatty acid and/or triglyceride may be administered from once a day to approximately 5 times a day.

In some implementations, other compounds, such as compounds capable of independently decreasing glucose levels, may be administered with or in the R-beta-hydroxybutyrate salt blend, such as berberine and/or associated metabolites (e.g., dihydroberberine and/or tetrahydroberberine). U.S. patent application Ser. No. 15/491,933 entitled "ADMINISTRATION OF DIHYDROBERBERINE" to Lowery et al, filed Apr. 19, 2017, and U.S. Provisional Patent Application No. 62/324,794, entitled "ADMINISTRATION OF DIHYDROBERBERINE" to Lowery et al, filed Apr. 19, 2016, describe dihydroberberine administration with ketone sensitizers such as beta-hydroxybutyrate, and is hereby fully incorporated herein. U.S. patent application Ser. No. 17/341,312 entitled "ADMINISTRATION OF BERBERINE METABOLITES" to Lowery et al, filed Jun. 7, 2021 to Lowery et al, describe dihydroberberine administration with ketone sensitizers such as beta-hydroxybutyrate, and is hereby fully incorporated herein. In some implementations, one or more beta-hydroxybutyrates and/or other compounds described herein may be utilized as a ketone sensitizer with the dihydroberberine.

In some implementations, directly administering beta-hydroxybutyrate plus another compound that is processed to deliver beta-hydroxybutyrate (e.g., beta-hydroxybutyrate ester, beta-hydroxybutyrate polymer, butyrate, other appropriate compounds, and/or combinations thereof) over time may allow a first level of beta-hydroxybutyrate in the blood to be maintained over a period of time. For example, since the directly administered beta-hydroxybutyrate may elevate blood beta-hydroxybutyrate levels to a first concentration and this concentration may be approximately maintained over a period of time by providing additional beta-hydroxybutyrate via another compound administered approximately concurrently (e.g., short chain fatty acid and/or triglyceride, beta-hydroxybutyrate ester, beta-hydroxybutyrate polymer, beta-hydroxybutyrate amino acid complex, etc.).

In some implementations, the R-beta-hydroxybutyrate salt blend may include or be administered with one or more other compounds such as, but not limited to, amino acids, amino acid metabolites, proteins (e.g., dairy proteins such as whey and/or casein; vegan proteins such as pea protein and/or pumpkin protein; egg protein; meat derived proteins; any other appropriate protein; and/or combinations thereof), vitamins, minerals, herbs and/or extracts of herbs, coconut milk (e.g., powder), flavorings, colorings, binders, electrolytes, tetrahydrobiopeterin, nucleic acids, alpha-ketoglutaric acid, alpha lipoic acid, nutritional co-factors, beta-methyl-beta-hydroxybutyrate, arginine alpha-ketoglutarate, R-alpha lipoic acid, thiamine, NAD+, NADH, riboflavin, FAD+, FADH, riboflavin-5-phosphate, niacin, nicotinic acid, niacinamide, inositol hexanicotinate, pyridoxine, pyridoxal, pyridoxamine, ascorbic acid and ascorbate salts, citric acid, malic acid, sodium benzoate, Pyridoxal-5-Phosphate, methylcobalamin, cyanocobalamin, adenosylcobalamin, hydroxycobalamin, pantothenic acid, pantetheine, potassium sorbate, acesulfame K, aspartame, sucralose, stevia, monk fruit extract, allulose, prebiotic fibers, XOS, GOS, MOS, IMO, LOS, xanthan gum and other organic gums/thickeners/suspension agents, and combinations thereof. In some implementations, the R-beta-hydroxybutyrate salt blend may include collagen peptides and/or hyaluronic acid.

In some implementations, the R-beta-hydroxybutyrate salt blend may include and/or be administered in a bone broth (e.g., powdered and/or in fluid form). The inclusion of bone broth may increase satiety and/or palatability. The bone broth and R-beta-hydroxybutyrate via the salt R-beta-hydroxybutyrate salt blend may increase and/or facilitate maintenance of ketosis. For example, R-beta-hydroxybutyrate salt blend may include approximately 0.5 to approximately 20 g of R-beta-hydroxybutyrate compounds (e.g., first mixture and/or other types of R-beta-hydroxybutyrate, such as calcium and/or magnesium R-beta-hydroxybutyrate) and approximately 1 g to approximately 50 g of bone broth. As another non-limiting example, R-beta-hydroxybutyrate salt blend may include approximately 0.5 to approximately 20 g of R-beta-hydroxybutyrate compounds (e.g., first mixture and/or other types of R-beta-hydroxybutyrate, such as calcium and/or magnesium R-beta-hydroxybutyrate) and approximately 1 g to approximately 30 g of bone broth. As another non-limiting example, R-beta-hydroxybutyrate salt blend may include approximately 0.5 to approximately 20 g of R-beta-hydroxybutyrate compounds (e.g., first mixture and/or other types of R-beta-hydroxybutyrate, such as calcium and/or magnesium R-beta-hydroxybutyrate) and approximately 1 g to approximately 10 g of bone broth. The R-beta-hydroxybutyrate salt blend that includes bone broth may include additional compounds such as caffeine, vitamins, collagen peptides, etc. The R-beta-hydroxybutyrate salt blend that includes bone broth may cause greater user satisfaction when compared with conventional bone broths (e.g., due to the pleasant saltiness provided by the R-beta-hydroxybutyrate salts, ability to increase ketone delivery without increasing fat intake, etc.). Since bone broth may be provided as a low-fat bone broth, the R-beta-hydroxybutyrate salt blend bone broth may provide users that are unable to tolerate a high fat diet, benefits of the R-beta-hydroxybutyrate salt blend and satiety without a high fat intake. The R-beta-hydroxybutyrate salt blend that includes bone broth may be provided in a packet (powdered and/or fluid) and water may be added to the contents of the packet prior to consumption by the individual. The inclusion of bone broth may increase satiety, maintain ketosis, and/or increase mood and thus may increase compliance with an administration schedule and user satisfaction.

In various implementations, administration of the R-beta-hydroxybutyrate salt blend may improve the health of an individual. R-beta-hydroxybutyrate may be capable of providing a greater impact on the health of an individual than D, L-beta-hydroxybutyrate and/or L-beta-hydroxybutyrate, as described in U.S. Ser. No. 15/491,924, which is incorporated to the extent its teachings do not conflict with the teachings herein. Administration of the R-beta-hydroxybutyrate salt blend as described may increase lifespan in individuals following a dietary plan (e.g., standard American low-fat, ketogenic, Paleo, Mediterranean, etc.) and/or not following a dietary plan. For example, administration of at least 0.5 to 12 g of the first mixture of R-beta-hydroxybutyrate and 0.1 g to approximately 4.8 g of one or more other R-beta-hydroxybutyrate salts (e.g., in a weight ratio of approximately 2.5 to approximately 5 of weight of the first mixture to the weight of the other R-beta-hydroxybutyrate compounds) may increase life span. In some implementations, other appropriate amounts of R-beta-hydroxybutyrate may be included in the composition.

In some implementations, administration of R-beta-hydroxybutyrate salt blend may treat and/or lessen the impact of symptoms of disease(s) and/or disorders, such as diseases that impact cognitive function. Administration of R-beta-hydroxybutyrate salt blend may increase motor function in individuals with Parkinson's disease. For example, administration of at least 0.5 to 12 g of the first mixture of R-beta-hydroxybutyrate and 0.1 g to approximately 4.8 g of one or more other R-beta-hydroxybutyrate salts (e.g., in a ratio of approximately 2.5 to approximately 5 of weight of the first mixture to weight of the other beta-hydroxybutyrate compounds) may increase motor function. In some implementations, other appropriate amounts of R-beta-hydroxybutyrate may be included in the composition.

Administration of R-beta-hydroxybutyrate salt blend may increase fat loss. Unlike with conventional diets, in which weight loss often comes from decreases in water retention and/or muscle mass, administration of R-beta-hydroxybutyrate may cause decreases in fat loss. In addition, administration of R-beta-hydroxybutyrate may decrease levels of LPL in the body, and thus reduce or inhibit fat storage and/or encourage existing fat storage utilization by the body. For example, administration of at least 0.5 to 12 g of the first mixture of R-beta-hydroxybutyrate and 0.1 g to approximately 4.8 g of one or more other R-beta-hydroxybutyrate salts (e.g., in a ratio of approximately 2.5 to approximately 5 of the weight first mixture to weight of other beta-hydroxybutyrate compounds) may cause fat loss and/or reduce fat storage. In some implementations, other appropriate amounts of R-beta-hydroxybutyrate may be included in the composition. Administration of the R-beta-hydroxybutyrate salt blend may allow fat loss greater than 5 kg while maintaining lean mass. In some implementations, the administration of R-beta-hydroxybutyrate salt blend may increase the amount of fat used as fuel.

Administration of R-beta-hydroxybutyrate salt blend may increase joint health. For example, administration of at least 0.5 to 12 g of the first mixture of R-beta-hydroxybutyrate and 0.1 g to approximately 4.8 g of one or more other R-beta-hydroxybutyrate salts (e.g., in a ratio of approximately 2.5 to approximately 5 of the weight of the first mixture to the weight of other beta-hydroxybutyrate compounds) may increase joint health. The R-beta-hydroxybutyrate salt blend with bone broth may further increase joint health. In some implementations, other appropriate amounts of R-beta-hydroxybutyrate may be included in the composition.

Administration of R-beta-hydroxybutyrate salt blend may decrease inflammation. For example, administration of at least 0.5 to 12 g of the first mixture of R-beta-hydroxybutyrate and 0.1 g to approximately 4.8 g of one or more other R-beta-hydroxybutyrate salts (e.g., in a ratio of approximately 2.5 to approximately 5 of the weight of the first mixture to the weight of other beta-hydroxybutyrate compounds) may decrease inflammation. The R-beta-hydroxybutyrate salt blend with bone broth may further decrease inflammation. In some implementations, other appropriate amounts of R-beta-hydroxybutyrate may be included in the composition.

In some implementations, administration of the R-beta-hydroxybutyrate salt blend may improve and/or maintain health markers such as C-reactive protein and/or fasting glucose. Administration of the R-beta-hydroxybutyrate salt blend may decrease inflammation (e.g., as shown by C-reactive protein levels). Administration of R-beta-hydroxybutyrate salt blend may decrease fasting glucose. For example, administration of at least 0.5 to 12 g of the first mixture of R-beta-hydroxybutyrate and 0.1 g to approximately 4.8 g of one or more other R-beta-hydroxybutyrate salts (e.g., in a ratio of approximately 2.5 to approximately 5 of the weight of the first mixture to the weight of the other R-beta-hydroxybutyrate compounds) may cause a reduction in and/or maintain a low fasting glucose. In some implementations, other appropriate amounts of R-beta-hydroxybutyrate may be included in the composition. In some implementations, the R-beta-hydroxybutyrate salt blend may include and/or be administered with one or more other compounds to decrease glucose levels and/or sensitivity. For example, a berberine, such as dihydroberberine, may cause reduce and/or maintain low fasting glucose. Administration of the R-beta-hydroxybutyrate salt blend with a berberine, such as dihydroberberine, may cause reduce and/or maintain low glucose levels. In some implementations, less than approximately 15 g of R-beta-hydroxybutyrate via the R-beta-hydroxybutyrate salt blend may be administered with less than approximately 600 mg of dihydroberberine.

Figures 23A, 23B:
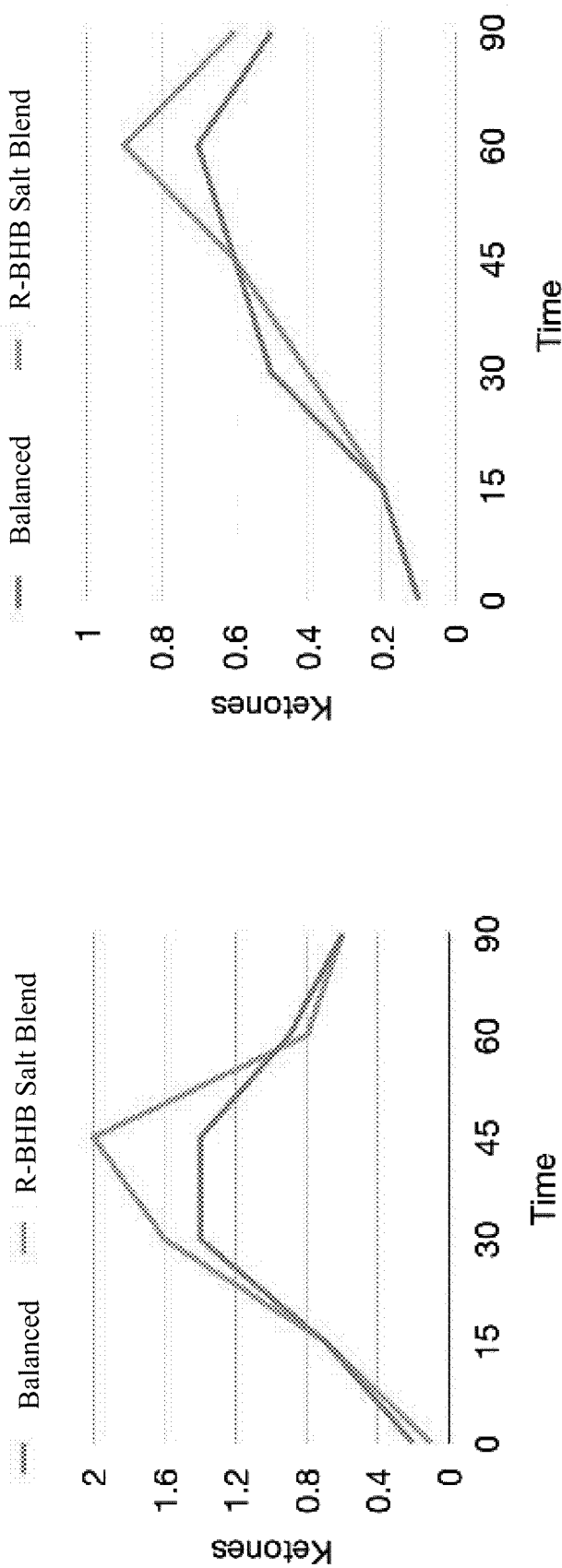
FIG. 23A illustrates a table of blood ketone levels over time for a subject for an implementation of an example administration of a balanced blend of R-beta-hydroxybutyrate and an implementation of the R-beta-hydroxybutyrate salt blend composition.
FIG. 23B illustrates a table of blood ketone levels over time for a subject for an implementation of an example administration of a balanced blend of R-beta-hydroxybutyrate and an implementation of the R-beta-hydroxybutyrate salt blend composition.

Administration of R-beta-hydroxybutyrate salt blend may increase blood ketone levels (see e.g., FIGS. 23A and 23B). Increasing blood ketone levels may increase weight loss, maintain weight loss, improve performance, increase mental acuity, and/or have other health improvement and health maintenance features. For example, even at levels less than 10 g (e.g., approximately 6 g) of R-beta-hydroxybutyrate via the R-beta-hydroxybutyrate salt blend may decrease ketone levels while L-beta-hydroxybutyrate does not, and D, L-beta-hydroxybutyrate does not to the same extent. R-beta-hydroxybutyrate may increase blood ketone levels 5 times as much as similar administration amounts of D, L-beta-hydroxybutyrate. By being able to decrease an amount of R-beta-hydroxybutyrate administered by using the R-beta-hydroxybutyrate salt blend (e.g., when compared with administering D, L-beta-hydroxybutyrate) and being able to achieve the same results, may allow a decrease in an amount cation administered (e.g., sodium, potassium, etc.). Since some individuals may prefer and/or may not tolerate higher dosages of the cations of beta-hydroxybutyrate salt, thus utilizing R-beta-hydroxybutyrate salt blend may allow administration to more people, increase user satisfaction, and/or decrease side effects (e.g., associated with additional consumption of these cations). In some implementations, approximately 0.1 g of R-beta-hydroxybutyrate to approximately 20 g R-beta-hydroxybutyrate salt blend may be administered via the R-beta-hydroxybutyrate salt blend to increase blood ketone levels. Approximately 0.5 g of R-beta-hydroxybutyrate to approximately 2 g R-beta-hydroxybutyrate via the R-beta-hydroxybutyrate salt blend may be administered to maintain blood ketone levels. In some implementations, other appropriate amounts of R-beta-hydroxybutyrate may be included in the composition.

Administration of R-beta-hydroxybutyrate salt blend may increase performance and decrease perceived exertion (e.g., as opposed to when administered D, L-beta-hydroxybutyrate). For example, administration of at least 0.5 to 12 g of the first mixture of R-beta-hydroxybutyrate and 0.1 g to approximately 4.8 g of one or more other R-beta-hydroxybutyrate salts (e.g., in a ratio of approximately 2.5 to approximately 5 of the weight of the first mixture to the weight of the other R-beta-hydroxybutyrate compounds) may increase performance and/or decrease perceived exertion. In some implementations, other appropriate amounts of R-beta-hydroxybutyrate may be included in the composition.

In various implementations, oral administration of the R-beta-hydroxybutyrate salt blend may increase muscle protein synthesis while D, L-beta-hydroxybutyrate does not increase muscle protein synthesis. For example, administration of at least 0.5 to 12 g of the first mixture of R-beta-hydroxybutyrate and 0.1 g to approximately 4.8 g of one or more other R-beta-hydroxybutyrate salts (e.g., in a ratio of approximately 2.5 to approximately 5 of the weight of the first mixture to the weight of the other R-beta-hydroxybutyrate compounds) may increase muscle protein synthesis. In some implementations, other appropriate amounts of R-beta-hydroxybutyrate may be included in the composition.

In some implementations, the administration of R-beta-hydroxybutyrate via the salt blend, unlike D, L-beta-hydroxybutyrate may decrease perceived hunger and/or increase satiety) which may inhibit overeating and thus promote weight loss. For example, administration of at least 0.5 to 12 g of the first mixture of R-beta-hydroxybutyrate and 0.1 g to approximately 4.8 g of one or more other R-beta-hydroxybutyrate salts (e.g., in a ratio of approximately 2.5 to approximately 5 of the weight of the first mixture to the weight of the other R-beta-hydroxybutyrate compounds) may decrease perceived hunger and/or increase satiety. The use of bone broth with the salt blend may further increase the efficacy beyond that provided individually by bone broth and the salt blend. In some implementations, the administration of R-beta-hydroxybutyrate, unlike D, L-beta-hydroxybutyrate may increase perceived energy. For example, administration of at least 0.5 to 12 g of the first mixture of R-beta-hydroxybutyrate and 0.1 g to approximately 4.8 g of one or more other R-beta-hydroxybutyrate salts (e.g., in a ratio of approximately 2.5 to approximately 5 of the weight of the first mixture to the weight of the other R-beta-hydroxybutyrate compounds) may increase perceived energy.

In some implementations, administration of R-beta-hydroxybutyrate salt blend may increase mental acuity. For example, administration of at least 0.5 to 12 g of the first mixture of R-beta-hydroxybutyrate and 0.1 g to approximately 4.8 g of one or more other R-beta-hydroxybutyrate salts (e.g., in a ratio of approximately 2.5 to approximately 5 of the weight of the first mixture to the weight of the R-beta-hydroxybutyrate) may increase mental acuity. In some implementations, other appropriate amounts of R-beta-hydroxybutyrate may be included in the composition.

In some implementations, the amount of R-beta-hydroxybutyrate included in the R-beta-hydroxybutyrate salt blend composition may be selected to obtain a result (e.g., induce ketosis; maintain ketosis; increase ketone levels, mental acuity, strength, etc.) upon administration (e.g., a pharmaceutically effective amount may be administered at a dosage and/or over a predetermined time period). In some implementations, the dosage and/or frequency of dosage may vary over time (e.g., initial vs a lower dosage for maintenance, vary based on time of day, vary based on whether taken with or without a meal, etc.).

The R-beta-hydroxybutyrate in the R-beta-hydroxybutyrate salt blend composition may include any appropriate and/or appropriate number of forms.

The use of non-salt base beta-hydroxybutyrate (e.g., polymers, esters, complexes) with the R-beta-hydroxybutyrate salts in the R-beta-hydroxybutyrate salt blend may increase user satisfaction (e.g., by reducing the cation, such as sodium and/or potassium, load due to ingestion of the composition; by decreasing side effects; etc.), increase the applicability of the administration (e.g., since users sensitive to the cations of the beta-hydroxybutyrate salts may be less sensitive to the non-salt and/or lower salt plus non-salt forms of the composition). The administration of the composition may increase blood ketone levels, induce ketosis, maintain blood ketone levels, maintain ketosis, increase health, increase strength, increase mental acuity, etc. In some implementations, the R-beta-hydroxybutyrate salt may cause a first impact (e.g., induce ketosis, quickly increase mental acuity, quickly increase strength, etc.) and the non-salt beta-hydroxybutyrate in the R-beta-hydroxybutyrate salt blend may be utilized to cause a second impact (e.g., maintain ketosis, maintain mental acuity, maintain increased strength, etc.).

In some implementations, the form(s) of R-beta-hydroxybutyrate included may be selected based on the delivery form.

In various implementations, a R-beta-hydroxybutyrate salt blend composition may be in any appropriate form. The R-beta-hydroxybutyrate salt blend composition may include sodium R-beta-hydroxybutyrate, potassium R-beta-hydroxybutyrate, and other forms of R-beta-hydroxybutyrate (s). The R-beta-hydroxybutyrate salt blend may have a specified ratio of R-beta-hydroxybutyrate provided in the first mixture of sodium and potassium R-beta-hydroxybutyrate to the amount of other R-beta-hydroxybutyrate salt compounds in the R-beta-hydroxybutyrate salt blend. The ratio may be approximately 2 to 5. The ratio may be approximately 2.5 to 5. The R-beta-hydroxybutyrate salt blend composition may include one or more additional compositions. Additional composition(s) may be capable of independently increasing blood ketone levels (e.g., fatty acids or esters, berberine or berberine metabolites such as dihydroberberine, etc.) and/or capable of independently decreasing blood glucose levels (e.g., berberine or berberine metabolites such as dihydroberberine). In some implementations, additional compounds may not be capable of independently increasing blood ketone levels and/or decreasing blood glucose levels (e.g., additives, flavorings, colorings, minerals, vitamins, binders, anti-caking agents, etc.).

In various implementations, the R-beta-hydroxybutyrate salt blend composition may be administered in an effective amount to cause a predetermined health impact (e.g., predetermined level of ketosis, blood ketone level, mental acuity, strength increase, perceived energy, fat loss, weight loss, etc.). The composition may be administered to an individual in a predetermined amount and/or different amounts over an administration schedule. In some implementations, once a first criteria is satisfied (e.g., period of time, number of doses, predetermined health impact), the dosage amount may be altered. For example, first dose(s) of the composition may be administered to cause a predetermined health impact and additional lower dose(s) of the composition may be administered to maintain the predetermined health impact (e.g., caused in part by the first doses).

The R-beta-hydroxybutyrate salt blend composition may be administered in any appropriate delivery form (e.g., tablet; capsule; food products such as powdered products that can be mixed into food, mixed into beverages, and/or consumed directly; beverage product; etc.). The R-beta-hydroxybutyrate salt blend composition may be administered according to any appropriate schedule (e.g., periodic dosages, dosages as user desires, etc.). The R-beta-hydroxybutyrate salt blend administration schedule may inhibit administration that elevates blood ketone levels too high, decreases blood glucose levels too low, and/or causes an individual to consume a dosage that substantially elevates the risk of adverse and/or side effects, in some implementations.

In some implementations, the R-beta-hydroxybutyrate salt blend composition may include a long-acting component and/or be long-acting. For example, since the body digests polymers and/or esters of beta-hydroxybutyrate (e.g., R-beta-hydroxybutyrate), the delivery of R-beta-hydroxybutyrate may be slower than a digestion of a beta-hydroxybutyrate salt (e.g., R-beta-hydroxybutyrate salt). In some implementations, the composition may include a R-beta-hydroxybutyrate and a long-acting R-beta-hydroxybutyrate form (e.g., polymer, ester, coated and/or processed form to provide slow release). In some implementations, a first dose(s) may include at least one non-long-acting form of beta-hydroxybutyrate and a second dose(s) may include at least one long-acting form of beta-hydroxybutyrate. The first dose(s) may be administered to cause a predetermined health impact and the second dose(s) may be administered to maintain the caused predetermined health impact. In some implementations, users may select the appropriate dose based on user preference and/or properties (e.g., a user on a ketogenic diet may chose the second dose since the user may already be in ketosis).

In various implementations, the R-beta-hydroxybutyrate salt blend may include a first mixture of R-beta-hydroxybutyrate and one or more other second R-beta-hydroxybutyrate compounds (e.g., non-sodium R-beta-hydroxybutyrate salt and non-potassium R-beta-hydroxybutyrate salt). In some implementations, the other second R-beta-hydroxybutyrate may include free beta-hydroxybutyrate (e.g., monomer beta-hydroxybutyrate, monomer R-beta-hydroxybutyrate, etc.). The ratio of the weight of the first mixture to the weight of the other R-beta-hydroxybutyrate compounds in the composition may be approximately 2.0 to approximately 5. The ratio of the weight of the first mixture to the weight of the other R-beta-hydroxybutyrate compounds in the composition may be approximately 2.5 to approximately 5.

In some implementations, the R-beta-hydroxybutyrate salt blend may include 0.5 to 12 g of a first mixture of sodium R-beta-hydroxybutyrate and potassium R-beta-hydroxybutyrate. The amount of R-beta-hydroxybutyrate provided by the sodium salt and the potassium salt may be the same or different. The R-beta-hydroxybutyrate salt blend may also include approximately 0.1 to approximately 5 g of other R-beta-hydroxybutyrate salts (e.g., not sodium R-beta-hydroxybutyrate and potassium R-beta-hydroxybutyrate). The R-beta-hydroxybutyrate salt blend may also include approximately 0.1 to approximately 4.8 g of other R-beta-hydroxybutyrate salts (e.g., not sodium R-beta-hydroxybutyrate and potassium R-beta-hydroxybutyrate). The ratio of weight of the first mixture to the weight of the other R-beta-hydroxybutyrate compounds may be approximately 2 to approximately 5.

In various implementations, the R-beta-hydroxybutyrate salt blend may include one or more amino acids (e.g., leucine), caffeine, flavors, vitamins, minerals, herb extracts (e.g., extract of *Uncaria tomentosa*), and/or pharmaceutically acceptable binders (e.g., fluid and/or solid binders). The R-beta-hydroxybutyrate salt blend may include bone broth. In some implementations, the R-beta-hydroxybutyrate may include fatty acids, esters, or triglycerides (e.g., short chain, long chain, and/or medium chain). In some implementations, the R-beta-hydroxybutyrate salt blend may include 0.5 to 2 g of R-beta-hydroxybutyrate compounds (e.g., R-beta-hydroxybutyrate provided via sodium R-beta-hydroxybutyrate, potassium R-beta-hydroxybutyrate, and one or more other R-beta-hydroxybutyrate compounds), caffeine, and/or fatty acids, esters, and/or triglycerides (e.g., medium, short, and/or long chain). In some implementations, the R-beta-hydroxybutyrate salt blend may include 0.5 to 15 g of R-beta-hydroxybutyrate compounds and 4 g of fatty acids, esters, or triglycerides (e.g., medium chain fatty acids, medium chain triglycerides, short chain fatty acids, etc.).

In some implementations, the R-beta-hydroxybutyrate salt blend may include less magnesium R-beta-hydroxybutyrate than other beta-hydroxybutyrate compounds (e.g., sodium R-beta-hydroxybutyrate, potassium R-beta-hydroxybutyrate, calcium R-beta-hydroxybutyrate, etc.). The use of a low magnesium R-beta-hydroxybutyrate salt blend may increase user satisfaction (e.g., by decreasing GI discomfort such as caused by constipation, increasing energy, decreasing sleepiness, etc.).

In various implementations, method of maintaining or increasing weight loss in an individual may include orally administering a composition. The composition may include approximately 0.5 to approximately 12 g of a first mixture of R-beta-hydroxybutyrate salt, wherein the first mixture of R-beta-hydroxybutyrate salt comprises sodium R-beta-hydroxybutyrate and potassium R-beta-hydroxybutyrate; and approximately 0.1 to approximately 4.8 g of at least one second R-beta-hydroxybutyrate salt, wherein the at least one second R-beta-hydroxybutyrate salt is not sodium R-beta-hydroxybutyrate, and wherein the at least one second R-beta-hydroxybutyrate salt is not potassium R-beta-hydroxybutyrate; and wherein a ratio of a weight of the first mixture of R-beta-hydroxybutyrate to a weight of the at least one second R-beta-hydroxybutyrate salt is approximately 2.5 to approximately 5.

Implementations may include one or more of the following features. At least one second R-beta-hydroxybutyrate may include at least one of magnesium R-beta-hydroxybutyrate or calcium R-beta-hydroxybutyrate salt. The administration of the composition increases at least one of mental acuity, metabolism, fat loss, fat oxidation, motor function, or muscle mass. The composition may be administered up to 5 times daily. The composition may include at least one amino acid. The amount of L-beta-hydroxybutyrate in the first mixture of R-beta-hydroxybutyrate salt may include less than approximately 10% L-beta-hydroxybutyrate relative to the amount of the total beta-hydroxy-butyrate in the first mixture of R-beta-hydroxybutyrate salt. The amount of L-beta-hydroxybutyrate in the one or more second R-beta-hydroxybutyrate salt comprises less than approximately 10% L-beta-hydroxybutyrate relative to the amount of the total beta-hydroxy-butyrate in the at least one second R-beta-hydroxybutyrate salt.

In various implementations, a method of maintaining or inducing ketosis in an individual may include orally administering a composition. The composition may include approximately 0.5 to approximately 12 g of a first mixture of R-beta-hydroxybutyrate salt, wherein the first mixture of R-beta-hydroxybutyrate salt comprises sodium R-beta-hydroxybutyrate and potassium R-beta-hydroxybutyrate; and approximately 0.1 to approximately 4.8 g of at least one second R-beta-hydroxybutyrate salt, wherein the at least one second R-beta-hydroxybutyrate salt is not sodium R-beta-hydroxybutyrate, and wherein the at least one second R-beta-hydroxybutyrate salt is not potassium R-beta-hydroxybutyrate; wherein a ratio of a weight of the first mixture of R-beta-hydroxybutyrate to a weight of the at least one second R-beta-hydroxybutyrate salt may be approximately 2.5 to approximately 5.

Implementations may include one or more of the following features. Administration of the composition may increase at least one of mental acuity, metabolism, fat loss, fat oxidation, motor function, or muscle mass. An amount of L-beta-hydroxybutyrate in the first mixture of R-beta-hydroxybutyrate salt may include less than approximately 10% L-beta-hydroxybutyrate relative to the amount of the total beta-hydroxy-butyrate in the first mixture of R-beta-hydroxybutyrate salt. An amount of L-beta-hydroxybutyrate in the one or more second R-beta-hydroxybutyrate salt may include less than approximately 10% L-beta-hydroxybutyrate relative to the amount of the total beta-hydroxy-butyrate in the at least one second R-beta-hydroxybutyrate salt.

In various implementations, an orally administrable composition may include approximately 0.5 to approximately 12 g of a first mixture of R-beta-hydroxybutyrate salt, wherein the first mixture of R-beta-hydroxybutyrate salt comprises sodium R-beta-hydroxybutyrate and potassium R-beta-hydroxybutyrate; and approximately 0.1 to approximately 4.8 g of at least one second R-beta-hydroxybutyrate salt, wherein the at least one second R-beta-hydroxybutyrate salt is not sodium R-beta-hydroxybutyrate, and wherein the at least one second R-beta-hydroxybutyrate salt is not potassium R-beta-hydroxybutyrate. A ratio of a weight of the first mixture of R-beta-hydroxybutyrate to a weight of the at least one second R-beta-hydroxybutyrate salt may be approximately 2.5 to approximately 5. Oral administration of the composition may induce ketosis, maintains ketosis, maintain weight loss, and/or increase weight loss in an individual.

Implementations may include one or more of the following features. The composition may include one or more flavorings, one or more vitamins, one or more minerals, one or more binders, and/or one or more carriers. The composition may include bone broth, water, milk, and/or coconut water. The composition may include a polymer of beta-hydroxybutyrate. The total R-beta-hydroxybutyrate weight of the first mixture of R-beta-hydroxybutyrate and the at least one second R-beta-hydroxybutyrate may be approximately 0.5 to approximately 15 g of R-beta-hydroxybutyrate. At least one second R-beta-hydroxybutyrate may include magnesium R-beta-hydroxybutyrate and/or calcium R-beta-hydroxybutyrate salt. The composition may include approximately 0.5 to approximately 500 mg of caffeine. The composition may include at least one amino acid. The composition may include a short chain fatty acid, an ester of short chain fatty acid, a medium chain fatty acid, an ester of medium chain fatty acid, a long chain fatty acid, and/or an ester of long chain fatty acid. An amount of L-beta-hydroxybutyrate in the first mixture of R-beta-hydroxybutyrate salt may include less than approximately 10% L-beta-hydroxybutyrate relative to the amount of the total beta-hydroxybutyrate in the first mixture of R-beta-hydroxybutyrate salt. An amount of L-beta-hydroxybutyrate in the one or more second R-beta-hydroxybutyrate salt may include less than approximately 10% L-beta-hydroxybutyrate relative to the amount of the total beta-hydroxy-butyrate in the at least one second R-beta-hydroxybutyrate salt.

EXAMPLES

Example 1

Five subjects were subject to three separate glucose challenge tests (75 g glucose) after administration of 500 mg berberine (BB), 250 mg of dihydroberberine (DHBB) or 500 dihydroberberine. Blood was drawn prior to administration and after 30, 60, 90, 120, and 180 minutes. FIG. 1 illustrates the results of the administration protocol. FIG. 1 illustrates the average blood glucose level of the 5 subjects at each of the times.

As illustrated, unexpectedly, administration of the dihydroberberine resulted in less fluctuations in blood glucose level than berberine. In addition, an unexpected result of the administration of dihydroberberine is that administration of dihydroberberine may keep blood glucose levels closer to fasting blood glucose than berberine.

Example 2

As in Example 1, five subjects were subject to three separate glucose challenge tests (75 g glucose) after administration of 500 mg berberine (BB), 250 mg of dihydroberberine (DHBB) or 500 dihydroberberine. FIG. 2 illustrates a ranking which compositions caused the lowest blood glucose levels during a oral glucose challenge. Unexpectedly, 250 mg of DHBB may control blood glucose levels better than even 500 mg of DHBB. For example, in some individuals (e.g., individuals with moderate glucose tolerance) may achieve better blood glucose control when administered a lower dosage of DHBB. As illustrated, dihydroberberine administration resulted in lower blood glucose than administration of berberine in most individuals.

Example 3

Figure 3:
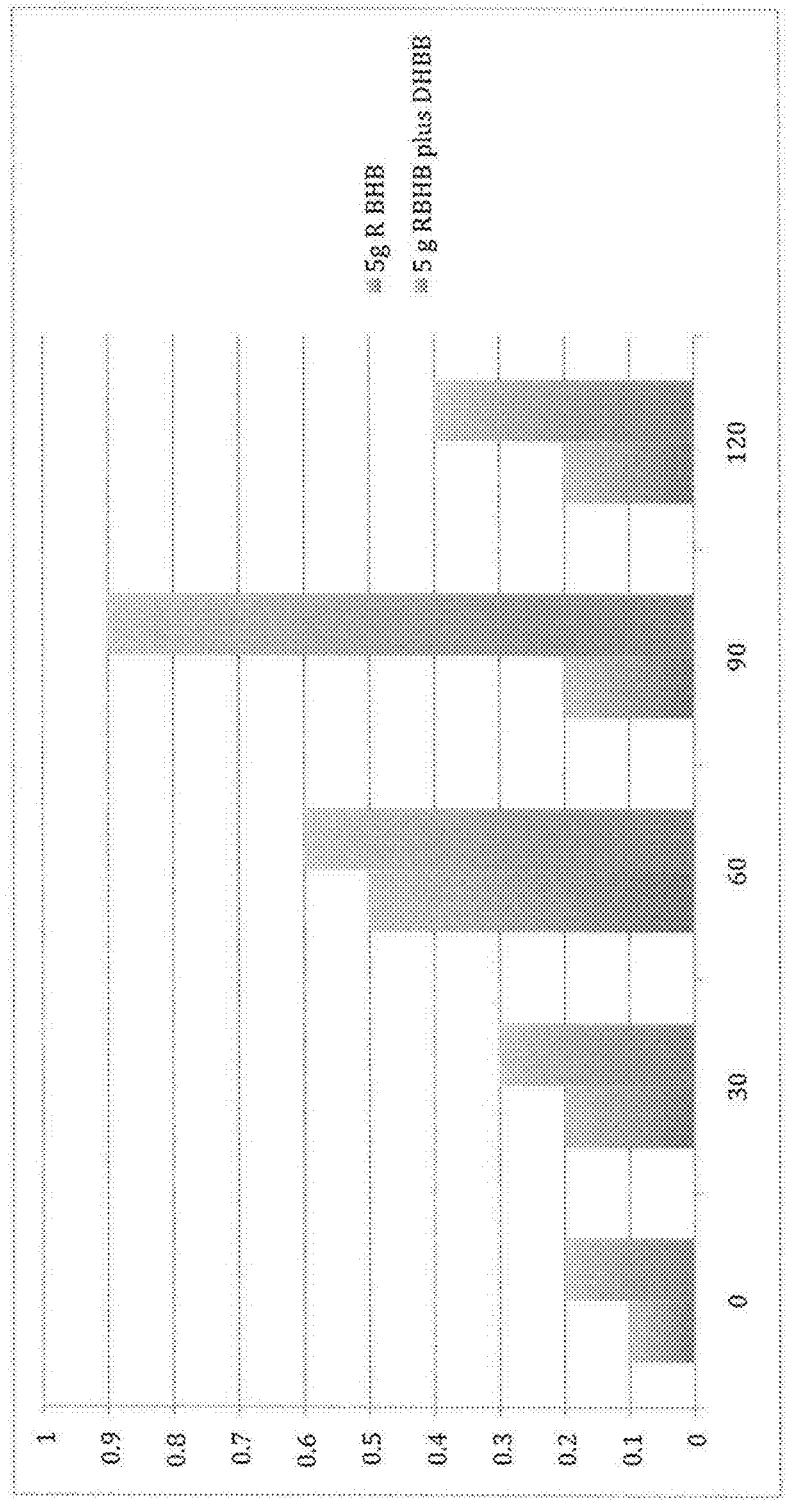
FIG. 3 illustrates a table with blood ketone levels for subjects after administration of an example administration protocol.

A subject was subject to a glucose challenge test (75 g glucose) after administration of 250 mg dihydroberberine (DHBB) and a glucose challenge test after administration of 250 mg dihydroberberine (DHBB) along with 5 mg of beta-hydroxybutyrate (e.g., 5 mg sodium beta-hydroxybutyrate). As illustrated in FIG. 3, blood ketone levels are unexpectedly increased even 120 minutes after the glucose challenge with the administration of an effective amount of dihydroberberine.

Example 4

Figure 4:
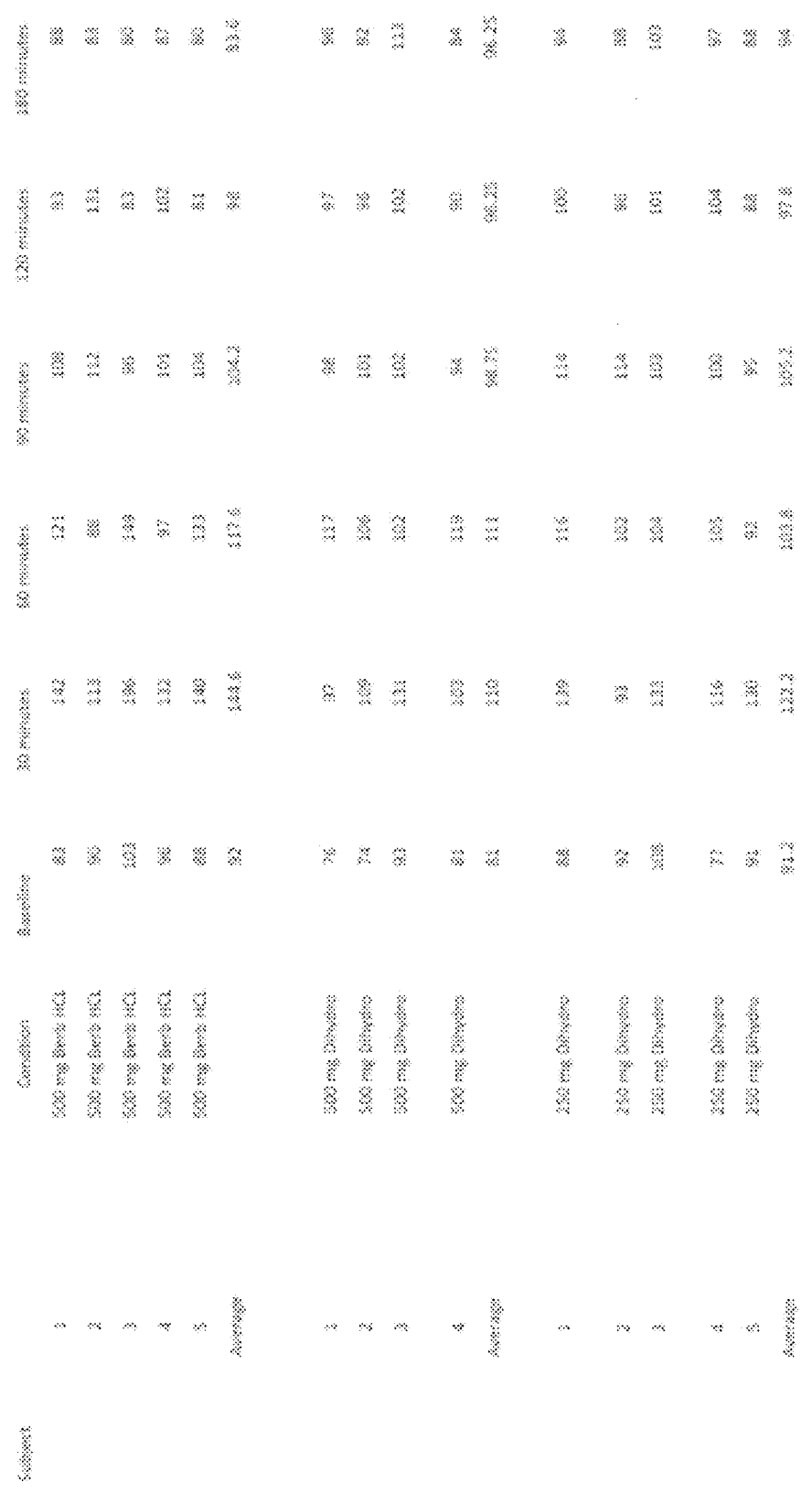

Five subjects were subject to three separate glucose challenge tests (75 g glucose) approximately 25 minutes after administration of 500 mg berberine (BB), 250 mg of dihydroberberine (DHBB) or 500 dihydroberberine. Blood was drawn prior to administration and after 30, 60, 90, 120, and 180 minutes and tested for glucose levels. FIG. 4 illustrates the results of the administration protocol.

As illustrated, administration of dihyroberberine in individuals with moderate baseline glucose levels moderates blood glucose levels better than even double the quantity of berberine.

Example 5

4 subjects were administered 10 mg of sodium D,L-beta-hydroxybutyrate and their blood ketone level in mmol/dL was tested after administration, 30 minutes, 60 minutes, 90 minutes, 120 minutes, and 180 minutes after administration. Each subject was also subsequently studied after administration of 10 g of sodium R-beta-hydroxybutyrate and 5 g of sodium R-beta-hydroxybutyrate. As illustrated in FIG. 5, on average, administration of 5 mg of sodium R-beta-hydroxybutyrate produced approximately the same blood ketone level in a subject after 30 minutes, 60 minutes, 90 minutes, 120 minutes, and 180 minutes as 10 g of D,L-beta-hydroxybutyrate.

Example 6

Figure 6:
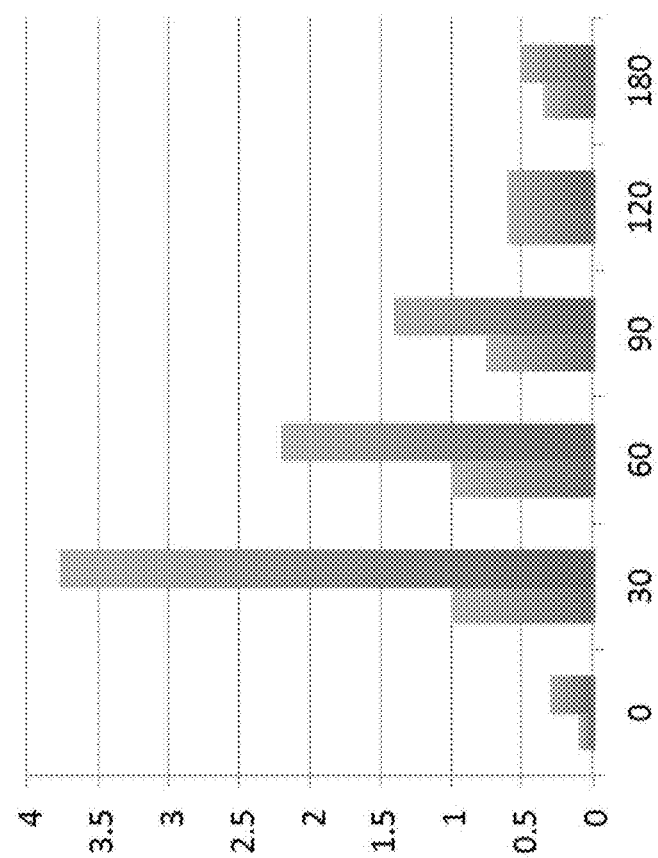
FIG. 6 illustrates a table of blood ketone levels over time for an implementation of an example administration of the microencapsulated butyrate compared to traditional sodium butyrate.

Three subjects were administered 10 grams of medium chain triglycerides and 8 grams of beta-hydroxybutyrate and blood beta-hydroxybutyrate concentration was monitored over time. The same subjects were later administered 10 grams of short chain triglycerides and 8 grams of beta-hydroxybutyrate and blood beta-hydroxybutyrate concentration was monitored. FIG. 6 illustrates an average blood ketone concentration (mmol/L) for the subjects after administration, after 30 minutes, after 60 minutes, after 90 minutes, after 120 minutes, and after 180 minutes. As illustrated in FIG. 6, administration of the beta-hydroxybutyrate with a short chain compound (illustrated in red bars or the second bar in each set), such as short chain triglyceride, caused greater elevation of blood ketone levels than administration of a similar amount of medium chain compound (illustrated in the blue bars or first bar in each set) at least after administration, after 30, 60, 90 minutes, and 180 minutes. Thus, administration of short chain compounds (e.g., fatty acids and/or triglycerides) may unexpectedly allow a smaller weight amount, when compared to medium chain compounds, to be administered to produce the same result (e.g., blood ketone level, weight loss, weight management, etc.) and/or allow greater results (e.g., when compared with similar amount of medium chain compounds).

Example 7

Figure 7:
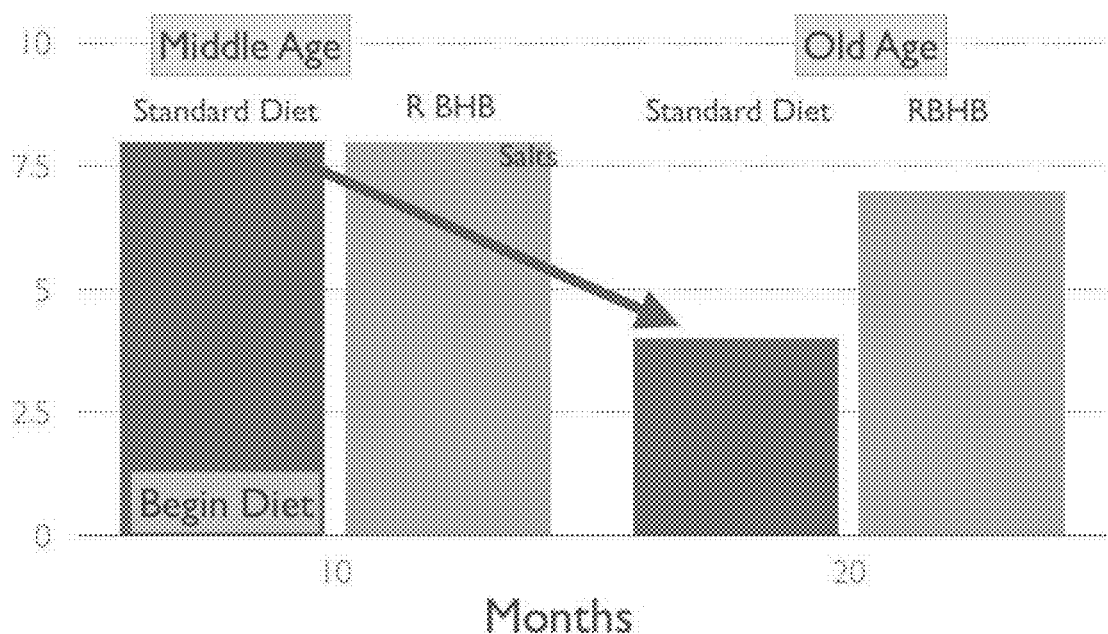
FIG. 7 illustrates a chart including lifespan of rats subject to an implementation of an administration of R-beta-hydroxybutyrate.

Sixteen rats (Fischer 344 rats) were studied for the effect of R-beta-hydroxybutyrate on lifespan. A first grouping of eight rats were fed an equivalent to a low-fat standard American diet and a second grouping of eight rats were fed the same equivalent to a low-fat standard American diet and supplemented with R-beta-hydroxybutyrate salt (e.g., sodium R-beta-hydroxybutyrate). The second grouping of rats were supplemented with the R-beta-hydroxybutyrate salt at middle age. FIG. 7 illustrates the average lifespans of the groupings of rats. As illustrated, at 20 months approximately half of the first grouping of rats died on the standard diet while only 12.5% of the second grouping of rats had died at 20 months. Thus, the supplementation of rats diets with R-beta-hydroxybutyrate increased lifespan for approximately in at least approximately 38.5% of the rats. Since the rat study was performed as an approximation of impact in humans, the addition of R-beta-hydroxybutyrate to a standard American low-fat diet may increase lifespan.

Example 8

An individual with Parkinson's disease was tested for motor function with and without administration of approximately 10 g of R-beta-hydroxybutyrate salt. The testing included a right-eye visual and motor performance apparatus to track motor function through eye movements.

Figure 8:
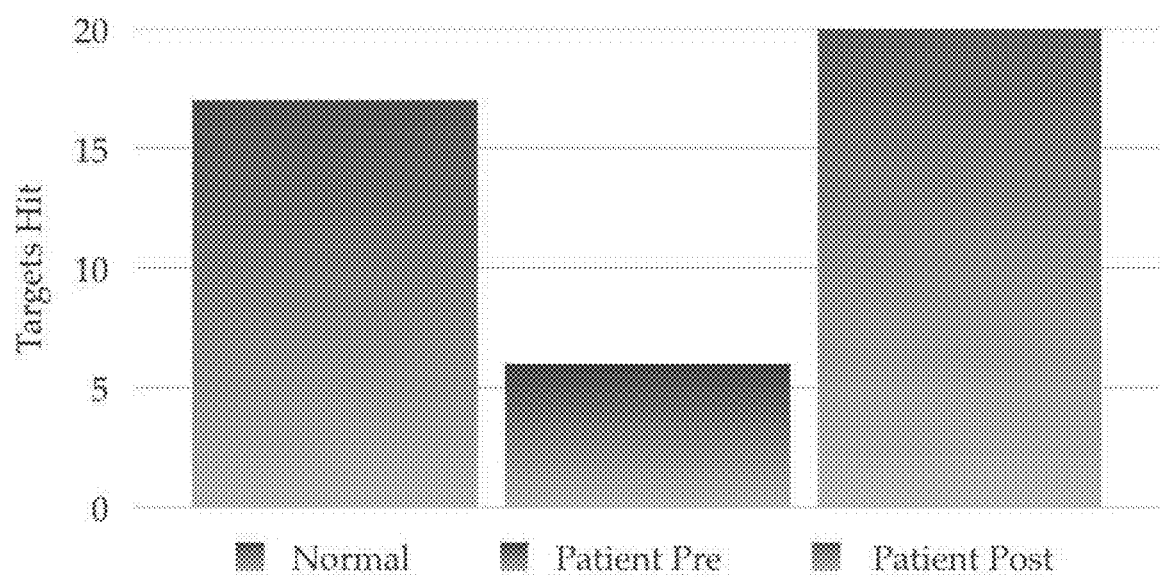
FIG. 8 illustrates a chart illustrating the results of motor skill testing following an implementation of an example administration protocol.

FIG. 8 illustrates chart illustrating the results of the motor skill testing following an example implementation of administration of R-beta-hydroxybutyrate. FIG. 8 illustrates average results for a similar non-Parkinson's population, the patient pre-administration of R-beta-hydroxybutyrate, and the patient post-administration of R-beta-hydroxybutyrate. As illustrated, the administration of R-beta-hydroxybutyrate increased motor function (e.g., approximately 30 minutes after administration of the R-beta-hydroxybutyrate).

Example 9

Figures 9, 10:
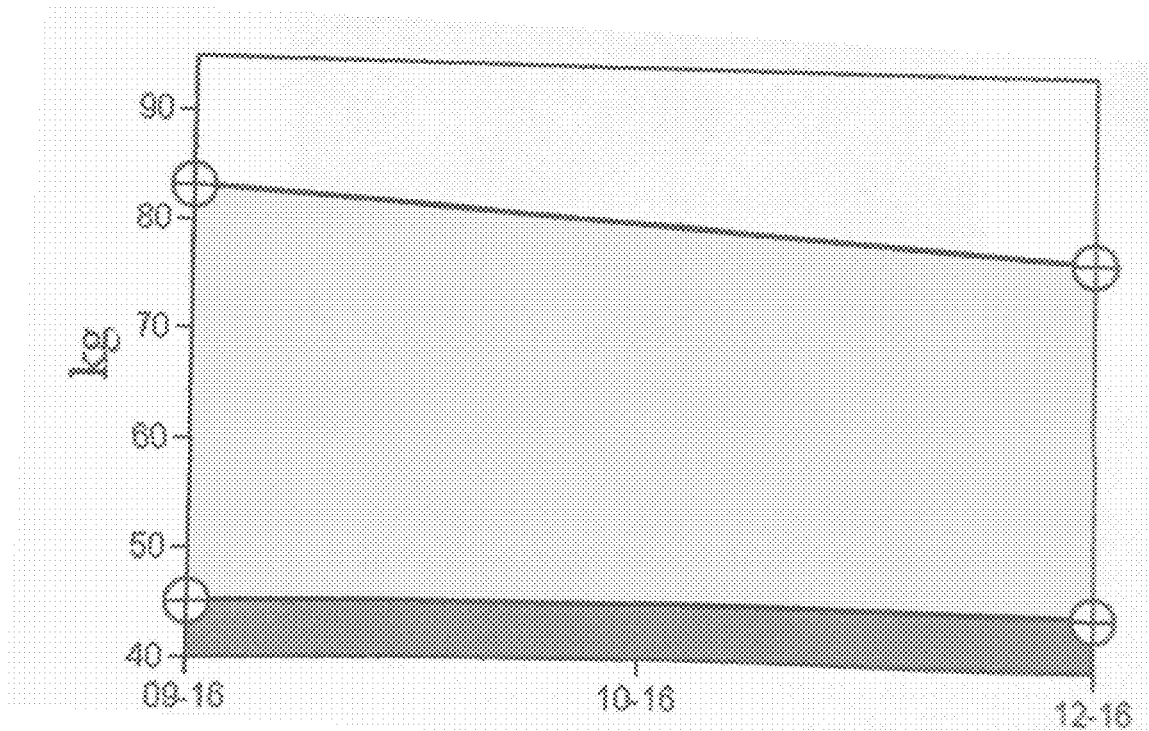
FIG. 9 illustrates a chart illustrating fat loss results following an implementation of an example administration protocol.
FIG. 10 illustrates a chart illustrating fat mass and lean mass results following an implementation of an example administration protocol.

An individual was administered 5 g of R-beta-hydroxybutyrate twice daily for 3 months. Xray absorptiometry was performed to determine the impact of the administration of R-beta-hydroxybutyrate on fat loss. FIG. 9 illustrates a chart that shows the results after 3 months of administration. As illustrated, the individual experienced a greater than approximately 10% decrease in fat mass. FIG. 10 illustrates that the fat loss was sustained while maintaining lean mass. Thus, the R-beta-hydroxybutyrate may cause weight loss through fat loss rather than lean mass (e.g., muscle mass).

Example 10

Figure 11:
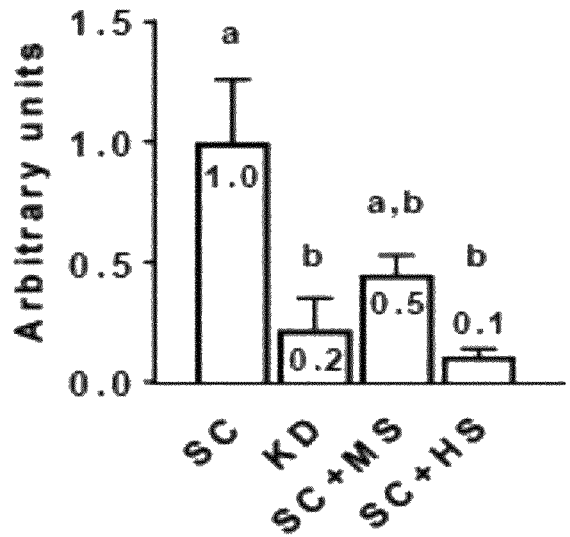
FIG. 11 illustrates a chart illustrating LPL levels in rats following an implementation of an example administration protocol.

A first grouping of 10 rats (labeled SC) were given a standard diet, a second grouping of 10 rats (labeled KD) were given a ketogenic diet, a third grouping of 10 rats (labeled SC+MS) were on the standard diet but given a first dosage of R-beta-hydroxybutyrate salt (e.g., equivalent to 5 g) and a fourth grouping was on the standard iet but given a second dosage of R-beta-hydroxybutyrate salt (e.g., equivalent to 10 g). FIG. 11 illustrates the average Lipoprotien lipase (LPL) in the rats. Since LPL is needed to transport fat into adipose tissue, lowering LPL levels would inhibit fat storage and encourage usage of fat storages. As illustrated, supplementation of a standard diet with even lower dosages of R-beta-hydroxybutyrate decreases LPL levels and thus inhibits fat storage.

Example 11

An individual with high C-reactive protein, which is associated with inflammation, was administered R-beta-hydroxybutyrate. After administration, the C-reactive protein levels were substantially reduced (e.g., 62.5 to 4.4). In addition, fasting glucose was decreased (e.g., 104 to 95).

Example 12

Figure 12:
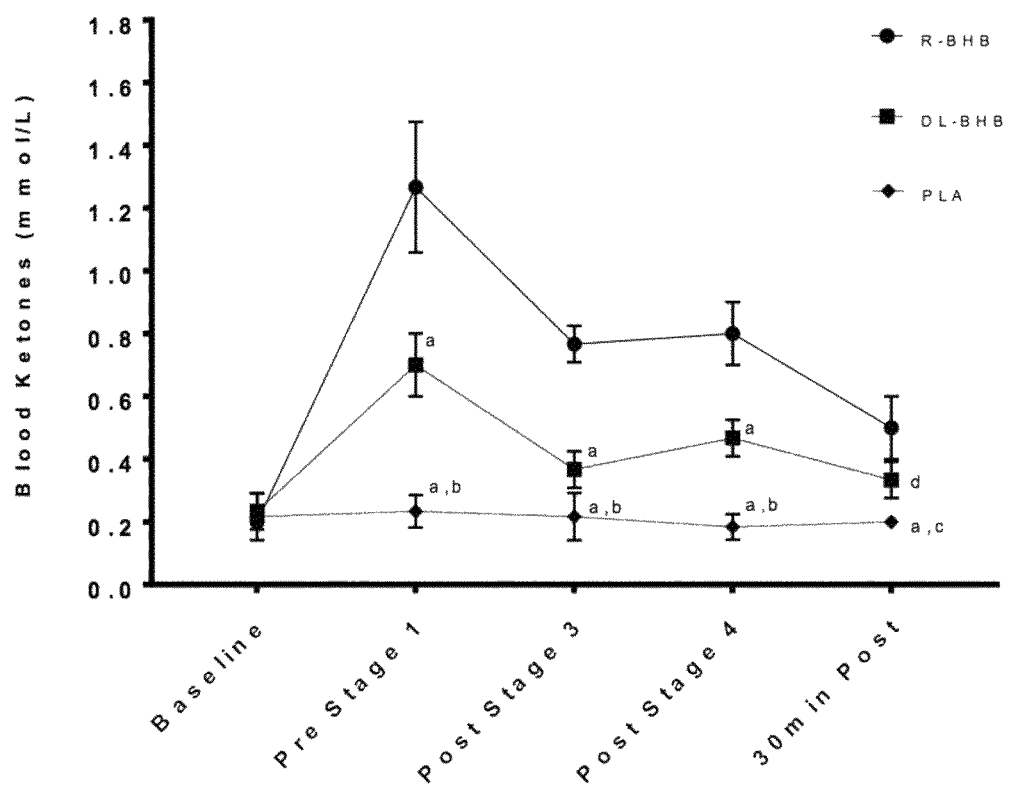
FIG. 12 illustrates a chart illustrating blood ketone levels following an implementation of an example administration protocol.
Figure 13:
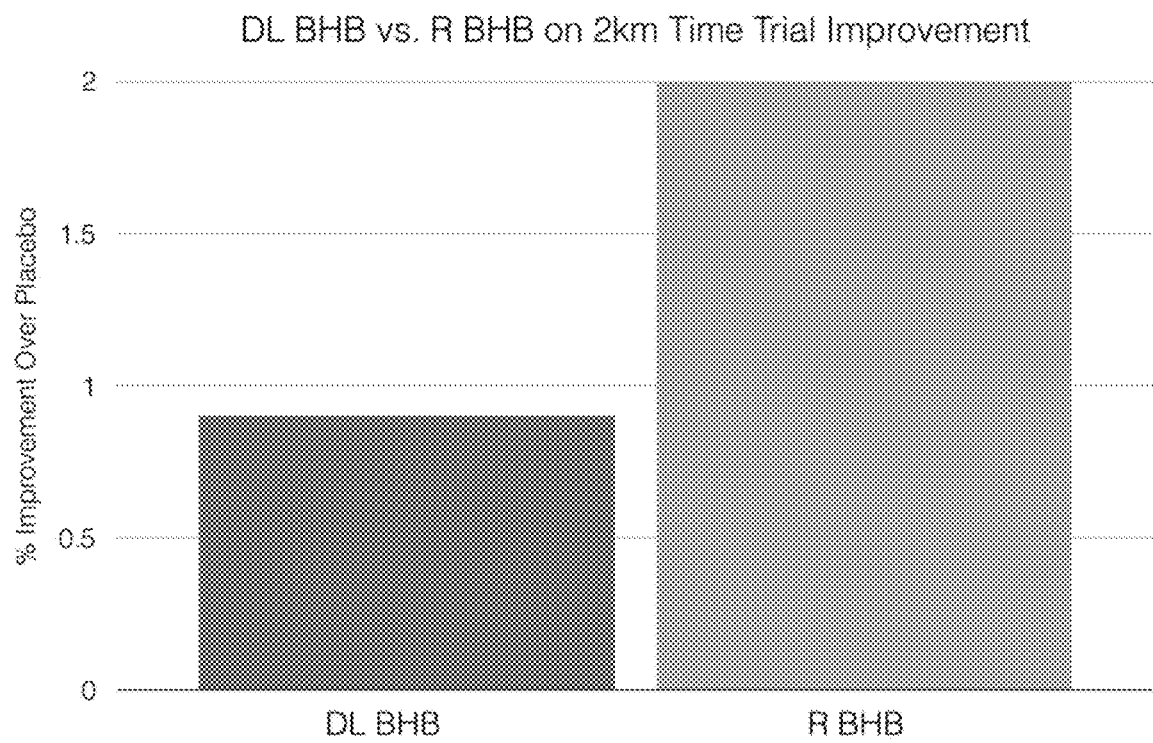
FIG. 13 illustrates a chart illustrating improvement over a placebo following an implementation of an example administration protocol.
Figure 14:
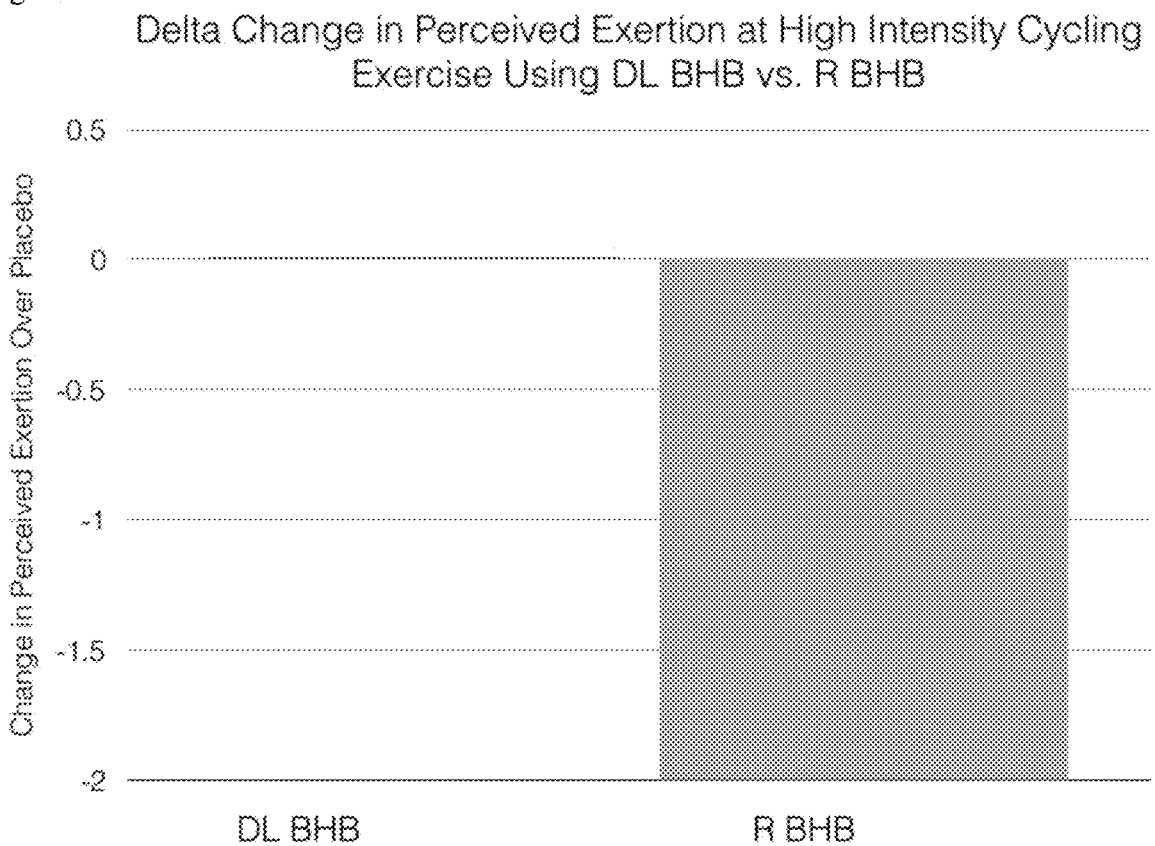
FIG. 14 illustrates a chart illustrating perceived exertion following an implementation of an example administration protocol.

Five healthy individual were given a 2 km time test (e.g., 4 cycles of low to severely intense exercise on a wingate cycle ergometer) 30 minutes after administration of a placebo, 10 g of R-beta-hydroxybutyrate, and 10 g of R-beta-hydroxybutyrate. FIG. 12 illustrates the average blood ketone levels and FIG. 13 illustrates the percentage improvement over the administration of the placebo. As illustrated, blood ketone levels unexpectedly increased more than double during administration of R-beta-hydroxybutyrate when compared with administration of D,L-beta-hydroxybutyrate. In addition, performance (e.g., improvement in time) increased by more than double during administration of R-beta-hydroxybutyrate when compared with D,L-beta-hydroxybutyrate. FIG. 14 illustrates the perceived exertion experienced by the individuals. As illustrated, the individuals did not feel an impact in perceived exertion after administration with D,L-beta-hydroxybutyrate as compared with the perceived exertion improvement experienced after administration of R-beta-hydroxybutyrate. Thus, the R-beta-hydroxybutyrate has an unexpectedly impact on ketone levels and performance.

Example 13

Individuals were given a standard diet or ketogenic diet. Some individuals were administered R-beta-hydroxybutyrate (e.g., 10 g). R-beta-hydroxybutyrate was able to numerically increase superoxide dismutase 2 levels (SOD) in the brain which indicates greater antioxidant capacity in the brain.

Example 14

Figure 15:
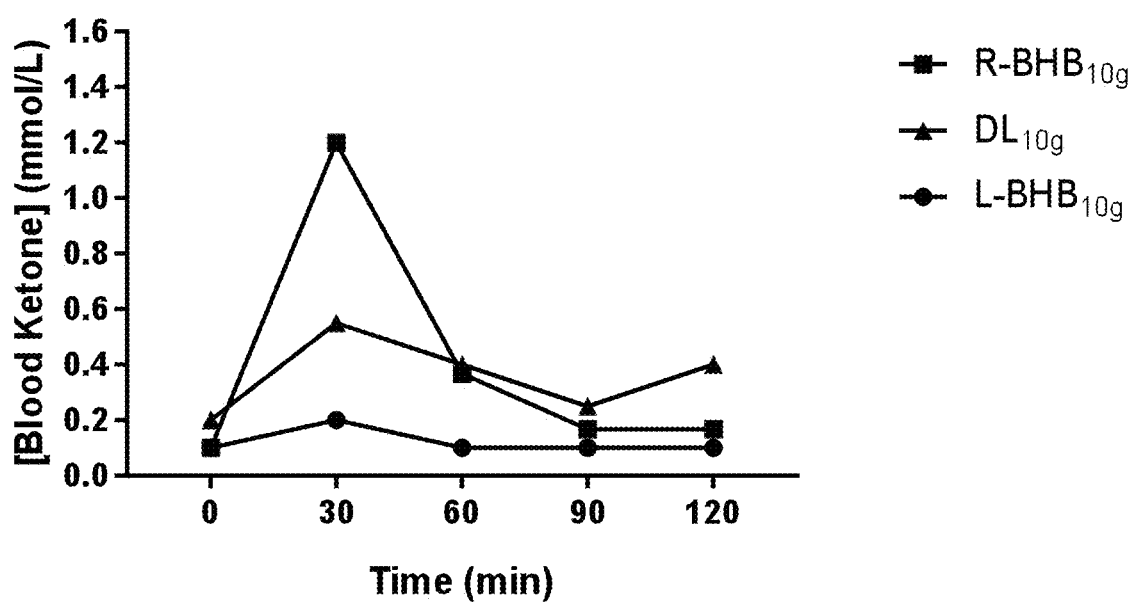
FIG. 15 illustrates a chart illustrating blood ketone levels following an implementation of an example administration protocol.
Figure 16:
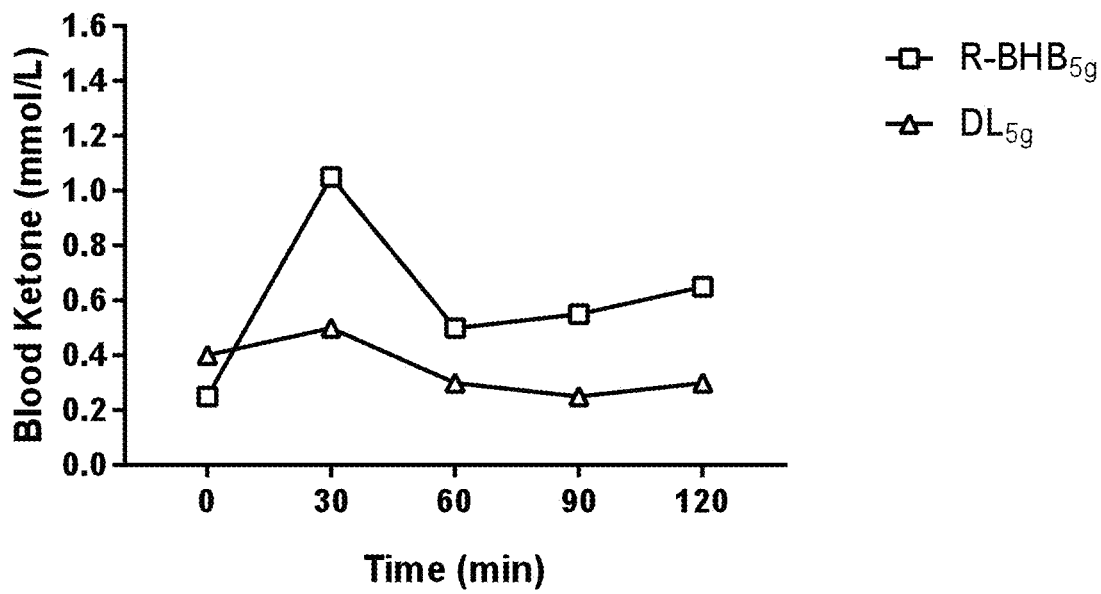
FIG. 16 illustrates a chart illustrating blood ketone levels following an implementation of an example administration protocol.

Individuals were 5 g or 10 mg of R-beta-hydroxybutyrate, L-beta-hydroxybutyrate, or D,L-beta-hydroxybutyrate and blood ketone levels were measured. FIGS. 15 and 16 illustrate the measured blood ketone levels. As illustrated, administration of R-beta-hydroxybutyrate may decrease ketone levels (see e.g., FIGS. 11A and 11B). The reduction of ketone levels occurs even when R-beta-hydroxybutyrate is administered at a dosage of less than 10 g (e.g., approximately 5 g). In addition, unexpectly (e.g., since it was expected that both the D and L forms of R-beta-hydroxybutyrate behaved in a similar manner), administration of L-beta-hydroxybutyrate does not decrease blood ketones. Furthermore, unexpectedly, even D,L-beta-hydroxybutyrate does not lower blood ketone levels to the same extent as R-beta-hydroxybutyrate. This indicates that L-beta-hydroxybutyrate may block some of the impact of R-beta-hydroxybutyrate, which is unexpected.

Example 15

Figure 17A:
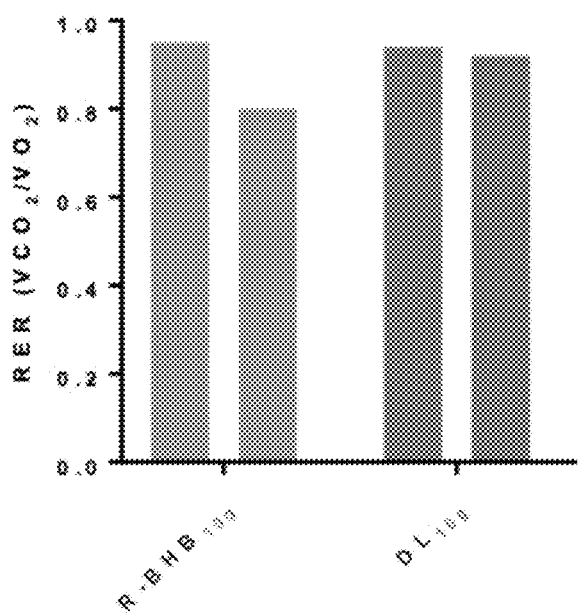
FIG. 17A illustrates a chart illustrating RER levels following an implementation of an example administration protocol.
Figure 17B:
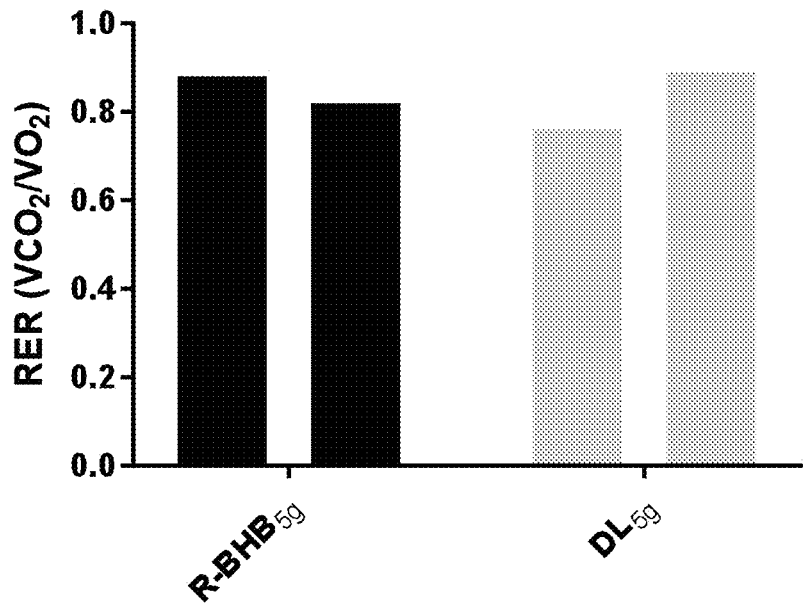
FIG. 17B illustrates a chart illustrating RER levels following an implementation of an example administration protocol.

10 subjects were administered approximately 5 g or 10 g of D,L-beta-hydroxybutyrate or R-beta-hydroxybutyrate, and Respiratory exchange ratio was examined (RER, a ratio of carbon dioxide/oxygen). Generally, a ratio of 1.0 indicates that 100% carbohydrate is used as fuel and at 0.7, 100% fat is used as fuel. As illustrated in FIG. 17A, at 10 g, R-beta-hydroxybutyrate administration reduces RER approximately 3× more than D,L-beta-hydroxybutyrate. As illustrated in FIG. 17B, 5 g of R-beta-hydroxybutyrate is capable of achieving a result that even more D,L-beta-hydroxybutyrate is unable to (e.g., D,L-beta-hydroxybutyrate increases RER by 17% rather than decreasing RER).

Example 16

Figure 18A:
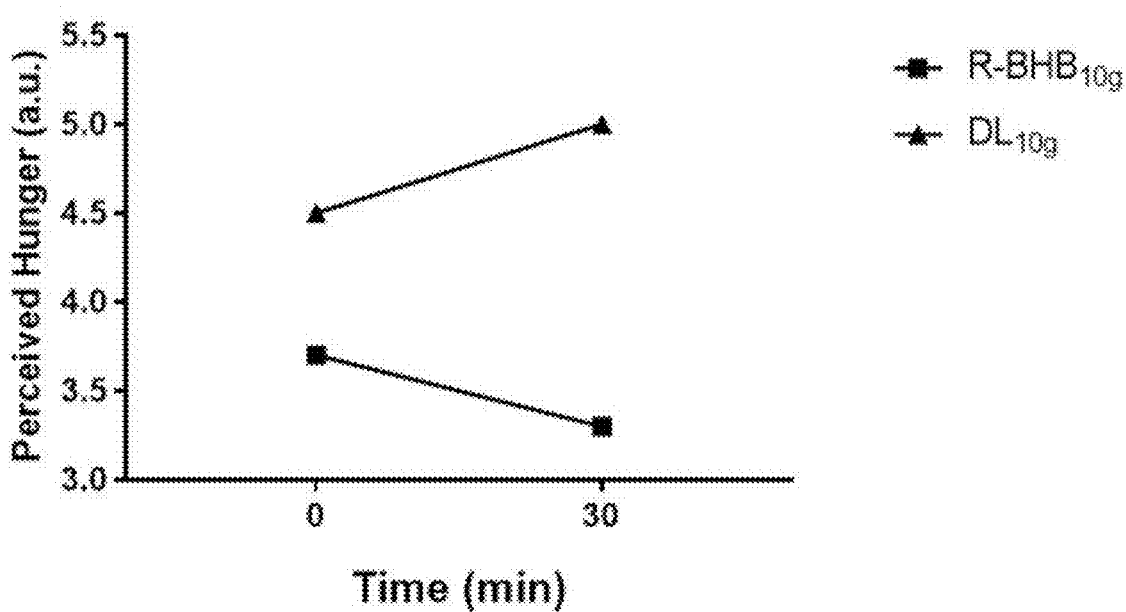
FIG. 18A illustrates a chart illustrating perceived hunger following an implementation of an example administration protocol.
Figure 18B:
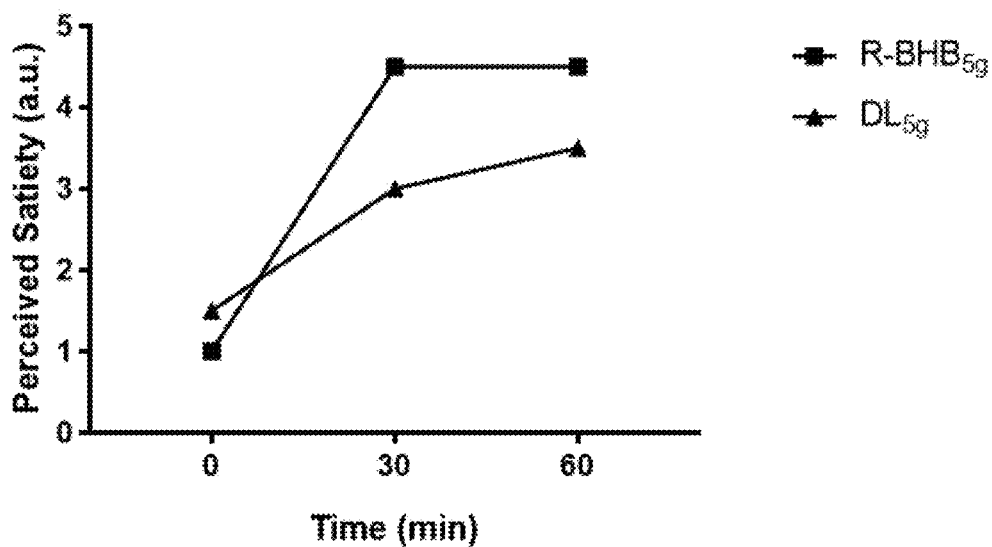
FIG. 18B illustrates a chart illustrating perceived satiety following an implementation of an example administration protocol.
Figure 18C:
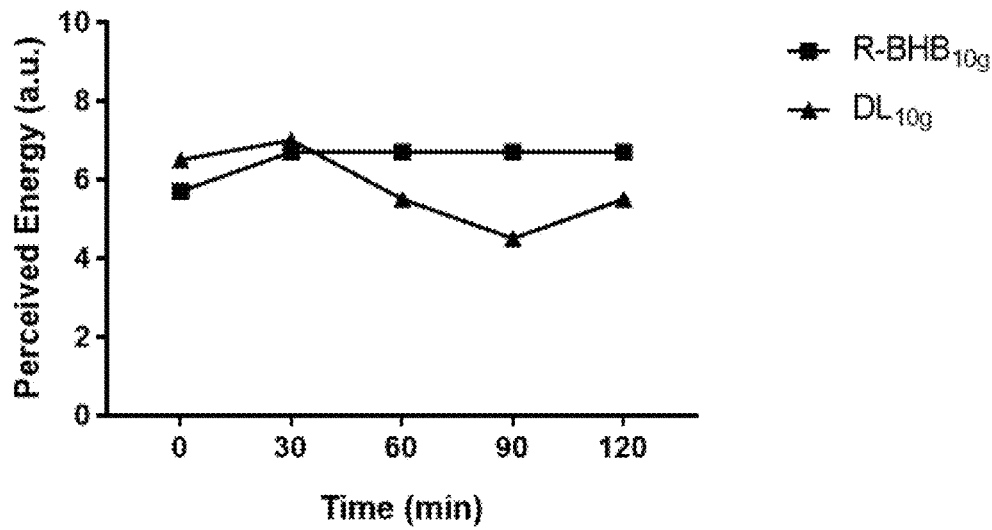
FIG. 18C illustrates a chart illustrating perceived energy following an implementation of an example administration protocol.

Individuals were administered 5 g-10 g of D,L-beta-hydroxybutyrate or R-beta-hydroxybutyrate and tested for perceived hunger, satiety, and perceived energy. FIGS. 18A-18C illustrate the results of the testing. FIG. 18A illustrates perceived hunger, FIG. 18B illustrates perceived satiety, and FIG. 18C illustrates perceived energy. As illustrated in FIG. 18B, at 30 minutes post consumption R-beta-hydroxybutyrate improved satiety levels 2.3× better than DL-beta-hydroxybutyrate relative to baseline levels. As illustrated in FIG. 18C, R-beta-hydroxybutyrate improved perceived energy from 0 to 30 minutes post consumption by double that of D,L-beta-hydroxybutyrate. R-beta-hydroxybutyrate sustained elevated perceived energy levels from 0 minutes at 60, 90, and 120 minutes post consumption, as opposed to D,L-beta-hydroxybutyrate. As illustrated, R-beta-hydroxybutyrate was able to raise perceived energy by 18% and sustain it for 2 hours post ingestion (e.g., more than 2 times greater than the peak value of increase with the DL-beta-hydroxybutyrate)

Example 17

Figure 19A:
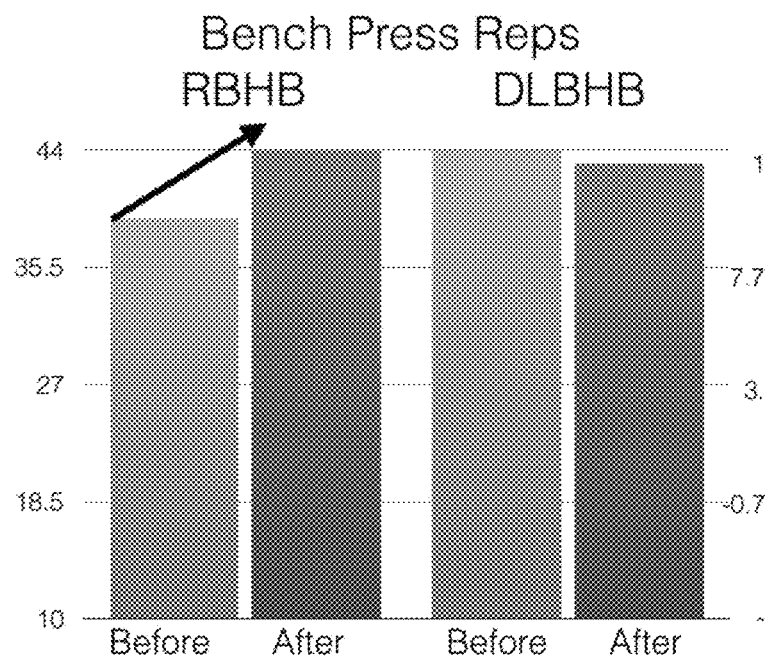
FIG. 19A illustrates a chart illustrating strength test results following an implementation of an example administration protocol.
Figure 19B:
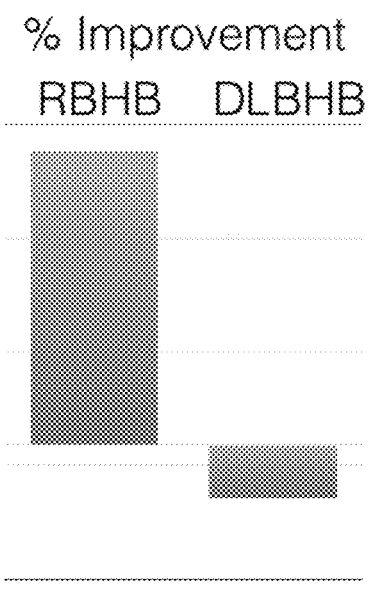
FIG. 19B illustrates a chart illustrating strength test results following an implementation of an example administration protocol.

5 young (20s) resistance trained males lifting 50% of their 1-RM on Bench Presses were tested before and after administration of 5 g of R-beta-hydroxybutyrate or D,L-beta-hydroxybutyrate. FIGS. 19A-19B illustrate the results of the testing. As illustrated, R-beta-hydroxybutyrate administration resulted in an 11% increase, while DL-beta-hydroxybutyrate administration resulted in only a 2% decrease. Thus, R-beta-hydroxybutyrate experienced a greater than expected impact when compared with D,L-beta-hydroxybutyrate.

Figure 19C:
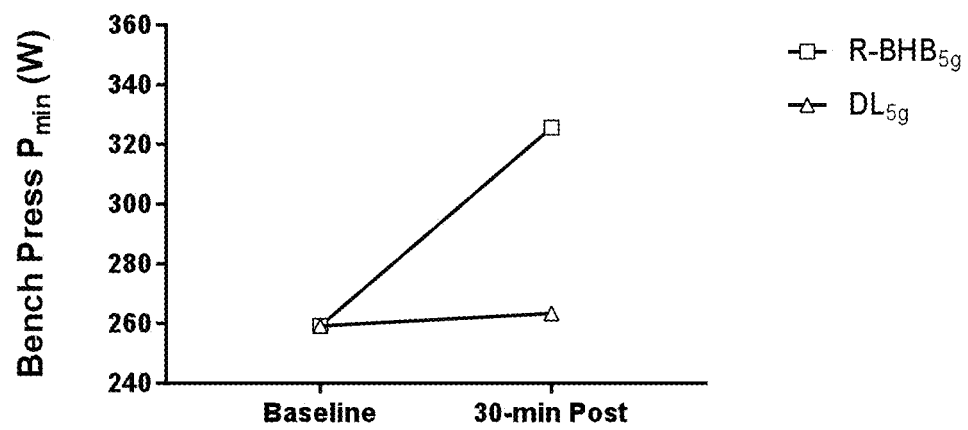
FIG. 19C illustrates a chart illustrating power results following an implementation of an example administration protocol.

The individuals were also tested for power. FIG. 19C illustrates the results of the testing (e.g., averages of power measurements). As illustrated, R-beta-hydroxybutyrate administration increased minimum power by 26%, while the DL-beta-hydroxybutyrate administration raised power by 2%.

Example 18

Individuals were tested for mental acuity before and after administration of 5-10 g of R-beta-hydroxybutyrate or D,L-beta-hydroxybutyrate. Circular Tracking testing (e.g., to assess their cognitive function) was performed and administration of DL-beta-hydroxybutyrate (e.g., 10 g) caused no improvement while the R-beta-hydroxybutyrate (e.g., 10 g) administration caused approximately 3% improvement in tracking accuracy. Vertical Tracking testing (e.g., to assess their cognitive function) was performed and administration of D,L-beta-hydroxybutyrate (e.g., 10 g) improved performance by 4.6%, while the administration of R-beta-hydroxybutyrate (e.g., 10 g) improved performance by 13.8%, which is approximately 3 times greater improvement. Horizontal Saccades testing was performed (e.g., a saccade is one eye movement and known to become significantly slower if cognitive function declines and improve if cognitive function improves). In the horizontal saccades testing, performance improvements were 4 times greater with the administration of R-beta-hydroxybutyrate (e.g., 5 g) than with administration of D,L-beta-hydroxybutyrate (e.g., 13.8% vs. 3.2%). Processing speed testing was performed (e.g, processing speed is considered a true measure of cognitive performance). Administration of R-beta-hydroxybutyrate (e.g., 5 g) improved processing speed by 27.7% and only approximately 18% with administration of the DL-beta-hydroxybutyrate (e.g., 5 g). Response accuracy was also tested. Administration of R-beta-hydroxybutyrate (e.g., 5 g) increased accuracy by 37 percentage points when compared to 12.7% when DL-beta-hydroxybutyrate was administered.

Thus, administration of R-beta-hydroxybutyrate increased mental acuity more than a similar amount of D,L-beta-hydroxybutyrate. In fact, as the testing revealed, the administration of R-beta-hydroxybutyrate increased mental acuity often by than double when compared with a similar amount of D,L-beta-hydroxybutyrate.

Example 19

Figure 20:
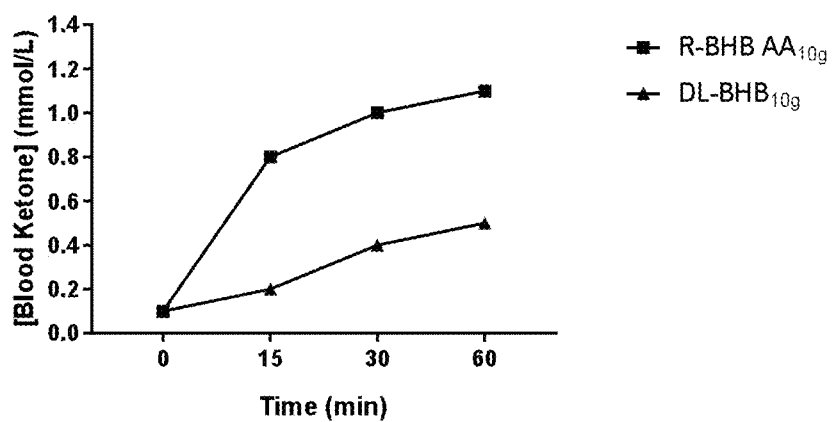
FIG. 20 illustrates a chart illustrating blood ketone levels following an implementation of an example administration protocol.

The compound for administration was prepared to include an R-beta-hydroxybutyrate amino acid complex. An R-beta-hydroxybutyrate Agmatine complex was prepared and an R-beta-hydroxybutyrate Arginine complex was prepared. FIG. 20 illustrates the average blood ketone levels achieved with the R-beta-hydroxybutyrate amino acid complex (e.g., an average of both complexes) when compared with D,L-beta-hydroxybutyrate. As illustrated, blood ketone levels are not only more than double the blood ketone levels achieved with the same quantity of D,L-beta-hydroxybutyrate as R-beta-hydroxybutyrate amino acid complex (e.g., 10 g), but they are more than an additive result of a similar amount of R-beta-hydroxybutyrate and amino acid.

Use of the R-beta-hydroxybutyrate amino acid complex may reduce the amount of cation delivered (e.g. since the complex may deliver the R-beta-hydroxybutyrate rather than a R-beta-hydroxybutyrate salt). The reduction of this cation may decrease side effects (e.g., from increased sodium, potassium, and/or magnesium intake), increase user satisfaction, and/or increase the population that can tolerate the administration of R-beta-hydroxybutyrate (e.g., since some individuals may not be capable of increasing loads of these cations due to underlying diseases and/or disorder). The use of the R-beta-hydroxybutyrate amino acid complex may also allow a higher yield of R-beta-hydroxybutyrate to be administered (90.8% R-beta-hydroxybutyrate, 5% amino acid) when compared with a similar weight of R-beta-hydroxybutyrate salt (e.g., average of 83% yield for BHB sodium).

Example 20

Figure 21:
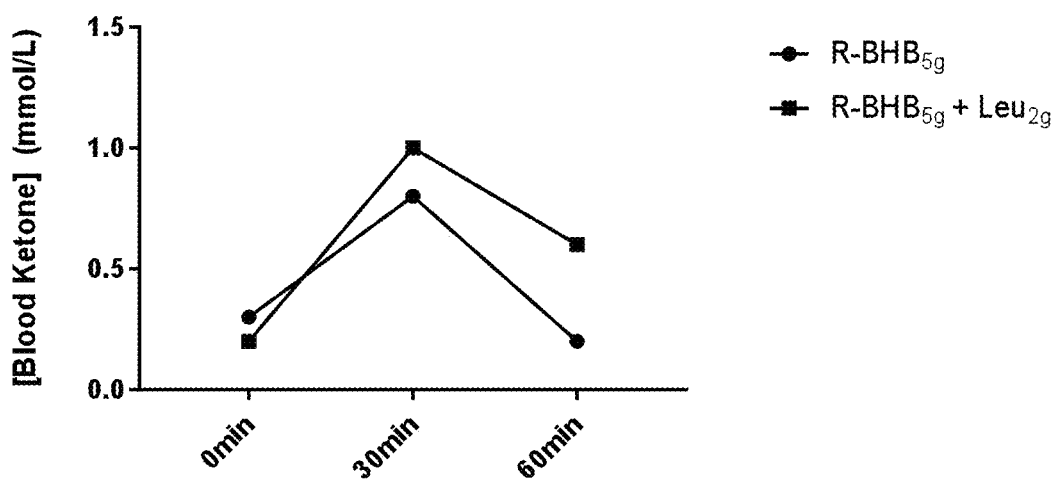
FIG. 21 illustrates a chart illustrating blood ketone levels following an implementation of an example administration protocol.

A composition for administration may include R-beta-hydroxybutyrate and an amino acid, such as Leucine. The R-beta-hydroxybutyrate and leucine maybe complexed and/or mixed together for administration. The R-beta-hydroxybutyrate and leucine may be administered separately but approximately concurrently. FIG. 21 illustrates the blood ketone levels after administration of R-beta-hydroxybutyrate (5 g) and leucine (2 g). As illustrated, the administration of R-beta-hydroxybutyrate and leucine causes greater elevation of blood ketone levels than the administration of R-beta-hydroxybutyrate (5 g). The administration of R-beta-hydroxybutyrate and leucine causes greater elevation of blood ketone levels than merely the additive effect of similar quantities of R-beta-hydroxybutyrate and leucine administered separately.

Example 21

Figures 22A, 22B:
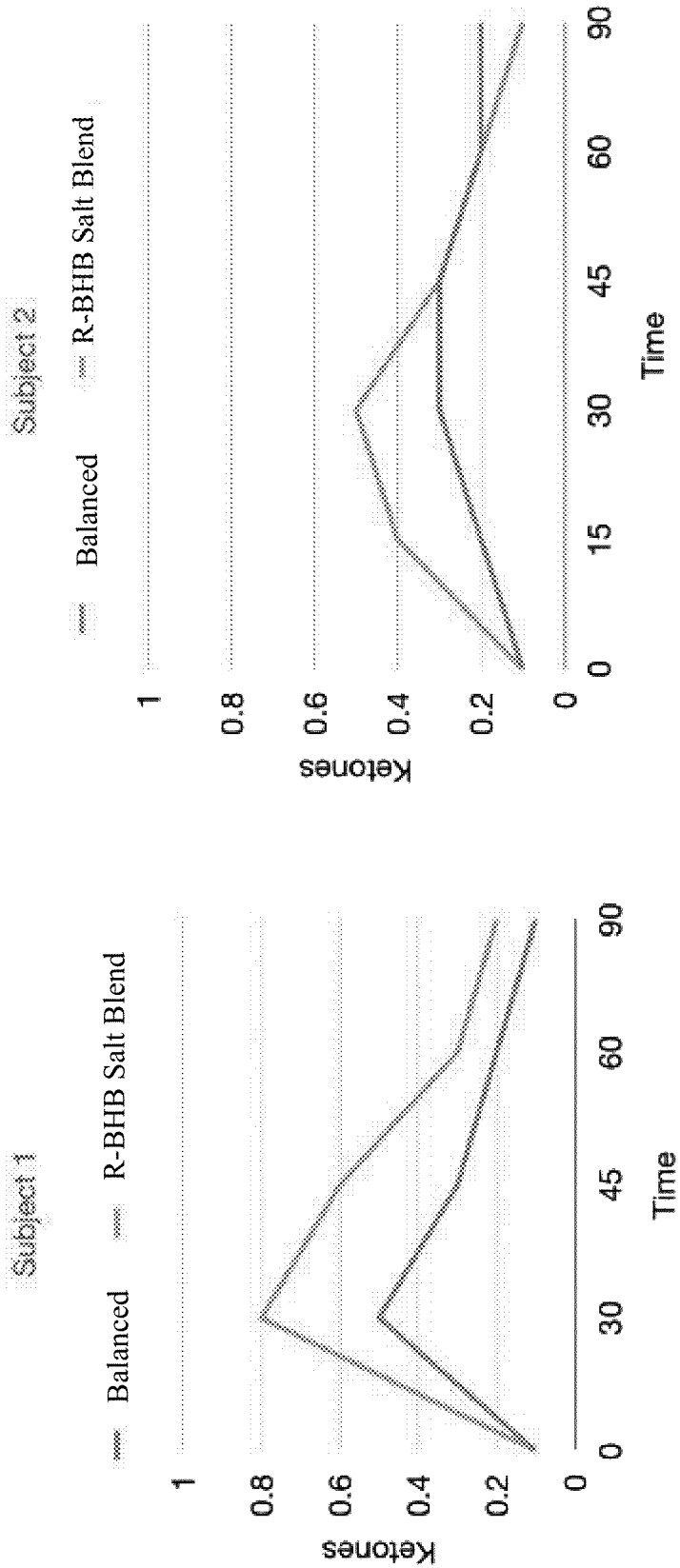
FIG. 22A illustrates a table of blood ketone levels over time for a subject for an implementation of an example administration of a balanced blend of R-beta-hydroxybutyrate and an implementation of the R-beta-hydroxybutyrate salt blend composition.
FIG. 22B illustrates a table of blood ketone levels over time for a subject for an implementation of an example administration of a balanced blend of R-beta-hydroxybutyrate and an implementation of the R-beta-hydroxybutyrate salt blend composition.

Two subjects were administered approximately 6 g of R-beta-hydroxybutyrate as (1) a balanced blend (25% as sodium R-beta-hydroxybutyrate, 25% as potassium R-beta-hydroxybutyrate, 25% as magnesium R-beta-hydroxybutyrate, and 25% as calcium R-beta-hydroxybutyrate) and as (2) an implementation of the described R-beta-hydroxybutyrate salt blend. FIGS. 22A and 22B illustrated the blood ketone levels over time after administration of the balanced blend and the described R-beta-hydroxybutyrate salt blend. As illustrated, blood ketone values were higher and higher for an initially for both subjects when the R-beta-hydroxybutyrate salt blend was administered when compared to the balanced blend. Thus, this specially ratioed R-beta-hydroxybutyrate caused greater blood ketone levels.

This increased blood ketone level may allow less of the R-beta-hydroxybutyrate salt blend composition to be administered when compared with other blends, such as the balanced blend. Reducing the levels of salt may allow the R-beta-hydroxybutyrate salt blend to be more tolerated by individuals.

The increased blood ketone level provided by the R-beta-hydroxybutyrate salt blend may ease maintenance of ketosis in an individual. The increased initial blood ketone levels provided by the administration of the R-beta-hydroxybutyrate salt blend may ease inducing ketosis in individuals.

Example 22

Two subjects were administered approximately 12 g of R-beta-hydroxybutyrate as (1) a balanced blend (25% as sodium R-beta-hydroxybutyrate, 25% as potassium R-beta-hydroxybutyrate, 25% as magnesium R-beta-hydroxybutyrate, and 25% as calcium R-beta-hydroxybutyrate) and as (2) an implementation of the described R-beta-hydroxybutyrate salt blend. FIGS. 23A and 23B illustrated the blood ketone levels over time after administration of the balanced blend and the described R-beta-hydroxybutyrate salt blend. As illustrated, the overall blood ketone values were higher for both subjects when the R-beta-hydroxybutyrate salt blend was administered when compared to the balanced blend. Thus, this specially ratioed R-beta-hydroxybutyrate caused greater blood ketone levels.

This increased blood ketone level may allow less of the R-beta-hydroxybutyrate salt blend composition to be administered when compared with other blends, such as the balanced blend. Reducing the levels of salt may allow the R-beta-hydroxybutyrate salt blend to be more tolerated by individuals.

The increased blood ketone level provided by the R-beta-hydroxybutyrate salt blend may ease maintenance of ketosis in an individual. The increased blood ketone levels provided by the administration of the R-beta-hydroxybutyrate salt blend may ease inducing ketosis in individuals.

END OF EXAMPLES

In some implementations, one or more additives may be included in the R-beta-hydroxybutyrate salt blend composition, such as flavorings (e.g., natural and/or artificial), vitamins, minerals, binders, pharmaceutically acceptable carriers (e.g., liquid and/or other types of carriers) and/or any other appropriate additive. The additives may alter flavor, color, and/or texture. The additives may increase palatability and/or facilitate inclusion in a delivery vehicle (e.g., tablet, food product, beverage product such as a drink mix, etc.). The additive may be any appropriate solid and/or liquid to which the compound is added. For example, an additive may include liquid carriers, such as water, milk(s), bone broth, and/or any other appropriate drinkable liquid. In some implementations, the R-beta-hydroxybutyrate salt blend composition may include a pharmaceutically inert liquid carrier, such as water (e.g., tap water, filtered water, distilled water, etc.). The liquid carrier may include other drinkable liquids such as coconut water, watermelon water, electrolyte water, bone broth, and/or combinations thereof. The liquid carrier may include milks such as dairy milk, non-dairy milk, coconut milk, other milks, and/or combinations thereof. The liquid carrier may include an electrolyte solution, in some implementations. Use of a liquid carrier, such as bone broth may facilitate maintenance of ketosis or cause ketosis while providing satiety.

The described R-beta-hydroxybutyrate salt blend compositions may be administered via any appropriate administration method. For example, the described compositions may be administered enterally and/or parenterally. In some implementations, the described composition may be administered via a tablet and/or capsule. The described composition may be provided in a powdered form that allows the described composition to be sprinkled on food, mixed with a liquid to provide a beverage, and/or directly administered. The described composition may be provided in gel form. The compounds in the composition may be mixed, coupled to each other, and/or provided separately. For example, the composition may include beta-hydroxybutyrate coupled to another compound (e.g., beta-hydroxybutyrate ester and/or amino acid). In some implementations, the first mixture and one or more other compounds may be provided separately (e.g., in pills, packets, etc.). An individual may sequentially and/or concurrently be administered (e.g., swallow pills) the beta-hydroxybutyrate and other compounds.

The described R-beta-hydroxybutyrate salt blend compositions may be administered on an administration protocol to cause weight loss and/or maintain a weight of an individual; elevate and/or maintain blood ketone levels; increase and/or maintain ketosis; and/or improve glucose tolerance (e.g., fasting glucose levels may be reduced and/or glucose metabolism may be improved), in some implementations. For example, the described compositions may be administered once a day, via an extended-release preparation, and/or multiple times a day (e.g., 1 to 5 times a day, 2 to 5 times a day, 3 to 5 times a day, etc.). The described composition may replace other pharmaceuticals or dietary supplements taken to promote weight loss, maintain a weight, promote ketosis, elevate blood ketone levels and/or be utilized in combination with one or more other pharmaceuticals or dietary supplements, as appropriate. The described composition may replace other pharmaceuticals or dietary supplements taken for improving glucose tolerance, such as metaformin, and/or be utilized in combination with one or more other pharmaceuticals or dietary supplements, as appropriate, in some implementations.

In various implementations, the described R-beta-hydroxybutyrate salt blend composition(s) may include one or more of the described components, equivalent(s) of the described component(s), derivatives of the described component(s), complex(es) of the described component(s), salt(s) of the described component(s), and/or combinations thereof.

In various implementations, a pharmaceutically effective amount of one or more of the described R-beta-hydroxybutyrate salt blend composition(s) may be administered. Administration of the pharmaceutically effective amount may induce and/or maintaining ketosis; maintaining and/or promoting weight loss; increase mental processes (e.g., acuity including cognitive functioning, mood, energy, alertness, focus, performance, effects of aging, etc.); improve and/or maintain body composition; function as a therapeutic for one or more of the described conditions or disorders (e.g., treat neurological disorders); and/or combinations thereof. In some implementations, a pharmaceutically effective amount of one or more of the described R-beta-hydroxybutyrate salt blend composition(s) may be administered as a treatment for seizures and/or Alzheimer's or symptoms thereof.

Although various types of increases in mental acuity have been described, other features of mental acuity such as memory, focus, concentration, and/or understanding (e.g., speed of processing, accuracy of processing) may be increased by administration of an effective amount of the R-beta-hydroxybutyrate salt blend composition.

Although a subject and/or an individual have been described as a human, a subject and/or individual may be a person or a group of people.

In various implementations, R-beta-hydroxybutyrate salt blend composition may be administered simultaneously and/or sequentially with one or more other compounds (e.g., short chain, medium chain, and/or long chain fatty acids). For example, R-beta-hydroxybutyrate salt blend composition and one or more other compounds may be delivered mixed in a powdered, liquid, gel, and/or other appropriate form. In some implementations, the R-beta-hydroxybutyrate salt blend composition and one or more other compounds may be administered via pills, tablets, capsules, other oral administration forms, intravenously, nasal sprays, sublingual tabs/strips, or topical delivery, rectal, other appropriate administration forms, and/or combinations thereof.

Although the term beta-hydroxybutyrate is the terminology used in the described implementations, beta-hydroxybutyrate is also referred to as beta-hydroxybutyrate, (R)-3-Hydroxybutyric acid, (R)-3-Hydroxybutanoic acid, (3R)-3-hydroxybutanoic acid, (R)-3-Hydroxybutanoate, (R)-(−)-3-Hydroxybutyric acid, (R)-(−)-beta-Hydroxybutyric acid, 3-D-hydroxybutyrate, BHIB, BHB, 3-delta-hydroxybutyrate, delta-3-hydroxybutyrate, 3-D-hydroxybutyric acid, D-3-hydroxybutyric acid, 3R-hydroxy-butanoic acid, delta-beta-hydroxybutyrate, D-3-hydroxybutyrate, D-(−)-3-hydroxybutyrate, delta-3-hydroxybutyric acid, (−)-3-Hydroxybutyric acid, D-beta-hydroxybutyrate, (R)-(−)-b-Hydroxybutyrate, (R)-beta-Hydroxybutyric acid, delta-(−)-3-hydroxybutyrate, (R)-3-hydroxybutyrate, (R)-beta-Hydroxybutanoic acid, (R)-(−)-beta-hydroxybutyrate, (−)-3-Hydroxy-n-butyric acid, (R)-(−)-b-Hydroxybutyric acid, Butanoic acid, 3-hydroxy-, (R)-Butyric acid, 3-hydroxy-, D-(−)-(R)-3-82578-46-9, beta-D-Hydroxybutyric acid, D-beta-Hydroxybutyric acid, (3R)-3-delta-hydroxybutyric acid, 3-(R)-Hydroxybutyric acid, and/or (−)-beta-Hydroxybutyrate.

In various implementations, R-beta-hydroxybutyrate is described as included in a composition; administered in an amount, form, and/or schedule; and/or being in a particular form (e.g., complexed and/or coupled). Beta-hydroxybutyrate may be utilized in the various described implementations of beta-hydroxybutyrate in the same or higher amounts as the described R-beta-hydroxybutyrate, as appropriate.

In various implementations, a pharmaceutically effective amount of butyrate, beta-hydroxybutyrate, related compounds, and/or one or more other compounds may be administered to an individual. For example, the pharmaceutically effective amount of the beta-hydroxybutyrate, related compounds, and/or one or more other compounds may be administered to cause weight loss, weight maintenance, elevate blood ketone levels, maintain blood ketone levels, reduce blood glucose levels, maintain blood glucose levels, improve focus, energy, cognitive function, traumatic brain injury, diabetes, neurological disorders, cancer, inflammatory conditions, suppressing appetite, anti-aging, anti-glycation, epilepsy, depression, performance, strength, muscle mass, fat loss, body composition, and/or use as a medicament etc. The pharmaceutically effective amount of butyrate, beta-hydroxybutyrate, related compounds, and/or combinations thereof may be administered to healthy individuals and/or not healthy individuals (e.g., with diseases and/or disorders).

Implementations may include one or more of the following features. The beta-hydroxybutyrate may include the racemic mixture and/or the individual isomers of beta-hydroxybutyrate, such as R-beta-hydroxybutyrate (also known as D-beta-hydroxybutyrate). The beta-hydroxybutyrate may include related compounds. The beta-hydroxybutyrate may be coupled to a compound such as an amino acid. The beta-hydroxybutyrate may include beta-hydroxybutyrate salt and beta-hydroxybutyrate esters, in some implementations. Other compounds may include short chain fatty acids, short chain triglycerides, medium chain fatty acids, medium chain triglycerides, long chain fatty acids, long chain triglycerides, berberine, berberine metabolites, dihydroberberine, tetrahydroberberine and/or combinations thereof. One or more of the other compounds may be unencapsulated and/or encapsulated.

In various implementations, a composition may be administered to induce and/or maintain ketosis. The composition may include approximately 0.5 g to approximately 10 g of R-beta-hydroxybutyrate.

Implementations may include one or more of the following features. The amount of the composition administered may include approximately 0.5 to approximately 3 g of R-beta-hydroxybutyrate. The composition may include additional composition, such as compositions that are capable of independently increasing ketone levels, inducing ketosis, and/or maintaining ketosis. In some implementations, the composition may include additional compositions to provide other health benefits (e.g., increase mental acuity, strength, etc.). For example, the composition may include fatty acids and/or esters of fatty acids. For example, the composition may include a short chain fatty acid, an ester of short chain fatty acid, a medium chain fatty acid, an ester of medium chain fatty acid, a long chain fatty acid, or an ester of long chain fatty acid. The composition may include flavoring(s), vitamin(s), mineral(s), and/or binder(s). The composition may be administered up to 5 times daily. The administration of the composition may increase strength, mental acuity, metabolism, fat loss, fat oxidation, motor function, muscle mass, and/or combinations thereof. In some implementations, the 0.5 to 10 g of R-beta-hydroxybutyrate administered includes R-beta-hydroxybutyrate and at least one of a polymer of R-beta-hydroxybutyrate or R-beta-hydroxybutyrate-complex.

In various implementations, a composition may include approximately 0.5 g to approximately 10 g of R-beta-hydroxybutyrate and one or more additional compounds capable of maintaining ketosis independently. Administration of the composition may induce and/or maintains ketosis in an individual.

Implementations may include one or more of the following features. The R-beta-hydroxybutyrate may include R-beta-hydroxybutyrate salt, R-beta-hydroxybutyrate-amino acid complex, and/or R-beta-hydroxybutyrate polymer. The additional compounds may include fatty acids and/or esters of fatty acids. The fatty acids and/or esters may include natural (e.g., cream, coconut oil, macadamia oil, etc.) and/or artificial fatty acids and/or esters of fatty acids. For example, the composition may include a short chain fatty acid, an ester of short chain fatty acid, a medium chain fatty acid, an ester of medium chain fatty acid, a long chain fatty acid, or an ester of long chain fatty acid. In some implementations, additional compound(s) may include polymer(s) of beta-hydroxybutyrate, D,L-beta-hydroxybutyrate, butyrate, butyric acid, and/or triglyceride tributyrin. The additional compound(s) may include berberine, dihydroberberine, and/or tetrahydroberberine.

In various implementations, pharmaceutically effective amounts of R-beta-hydroxybutyrate and amino acid may be administered for inducing and/or maintaining ketosis.

Implementations may include one or more of the following features. The amount of R-beta-hydroxybutyrate to induce and/or maintain ketosis in an individual may be less than or equal to half of the amount of D,L-beta-hydroxybutyrate to induce and/or maintain the same level of ketosis (e.g., as measured by blood ketone levels). In some implementations, the amount of R-beta-hydroxybutyrate to induce and/or maintain ketosis in an individual may be less than the amount of D,L-beta-hydroxybutyrate or L-beta-hydroxybutyrate to induce and/or maintain the same level of ketosis. The composition may include approximately 1 g to approximately 5 grams of R-beta-hydroxybutyrate and approximately 0.5 to 2 g of amino acid. The amino acid may include Leucine. The composition may include a mixture and/or complex of the R-beta-hydroxybutyrate and amino acid. At least a portion of the R-beta-hydroxybutyrate may be complexed with the amino acid, in some implementations. For example, a portion of the R-beta-hydroxybutyrate may be administered in the composition as a salt and/or polymer and another portion of the R-beta-hydroxybutyrate may be administered as a complex with an amino acid (e.g., leucine). In some implementations, the composition may include at least one R-beta-hydroxybutyrate salt (e.g., in additional to the pharmaceutically effective amounts of R-beta-hydroxybutyrate in the composition and/or as the pharmaceutically effective amounts of R-beta-hydroxybutyrate).

In various implementations, beta-hydroxybutyrate may administered simultaneously and/or sequentially with one or more other compounds (e.g., short chain, medium chain, and/or long chain fatty acids). For example, beta-hydroxybutyrate and/or one or more other compounds may be delivered mixed in a powdered, liquid, gel, and/or other appropriate form. In some implementations, the beta-hydroxybutyrate and/or one or more other compounds may be administered via pills, tablets, capsules, other oral administration forms, intravenously, nasal sprays, sublingual tabs/strips, or topical delivery, rectal, other appropriate administration forms, and/or combinations thereof.

The described compositions may be administered via any appropriate administration method. For example, the described compositions may be administered enterally and/or parenterally. In some implementations, the described composition may be administered via a tablet and/or capsule. In some implementations, the described composition may be administered via tablet, capsule, powdered supplement; ready-to-drink formulation; topical product including transdermals; cosmeceutical product; foods such bars, cookies, gum, candy, functional foods; toothpaste, sublingual product; injection; intravenous fluids; beverages such as shots or energy shots; inhalers; sublinguals; and/or combinations thereof. The described composition may be provided in a powdered form that allows the described composition to be sprinkled on food, mixed with a liquid to provide a beverage, directly administered.

The described compositions may be administered on an administration protocol to improve glucose tolerance (e.g., fasting glucose levels may be reduced and/or glucose metabolism may be improved), in some implementations. The described compositions may be administered on an administration protocol to increase ketone levels (e.g., blood and/or urine ketone concentrations). For example, the described compositions may be administered once a day, via a time released or extended release preparation, and/or multiple times a day. The described composition may replace other pharmaceuticals taken for improving glucose tolerance, such as metformin, and/or be utilized in combination with one or more other pharmaceuticals, as appropriate.

In some implementations, an administration schedule may include administration of different berberine metabolite compositions at different periods. For example, berberine metabolite compositions may include at least a first composition and a second composition. The first composition may include dihydroberberine. The second composition may include dihydroberberine and a first additional compound that is capable of independently increasing blood ketone levels. The first composition may be administered to an individual for a first period of time and the second composition may be administered to the same individual for a second period of time. In some implementations, a third composition comprising dihydroberberine and a second additional compound that is different from the first additional compound may be administered. The first and other compositions (e.g., second and/or third composition) may be administered alternatively, sequentially, and/or in conjunction with each other (e.g., with a second and/or third composition). The compound formulations (e.g., dihydroberberine and/or which additional compounds are included) may be selected based on user preference (e.g., taste, diseases, sensitivities), desired results (e.g., fast induction of ketosis and/or maintenance), etc.

In various implementations, although a berberine metabolite such as dihydroberberine and/or tetrahydroberberine may be described, other forms of dihydroberberine and/or tetrahydroberberine may be administered such as salts, complexes, and/or derivatives thereof.

Although various described systems and processes have been described as a being administered in humans, the described systems and processes may be administered to other mammals, such as rats, dogs, etc.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a beta-hydroxybutyrate" includes a combination of two or more beta-hydroxybutyrates and reference to "an additive" includes different types and/or combinations of additives.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method of administering ketone bodies to an individual in order to manage glucose tolerance, improve weight loss, maintain ketosis, or manage ketosis in the individual, the method comprising:
   orally administering, to the individual, a pharmaceutically effective amount of beta-hydroxybutyrate, wherein the pharmaceutically effective amount of beta-hydroxybutyrate comprises:
   approximately 0.5 g to approximately 15 g of R-beta-hydroxybutyrate; and
   less than approximately 10% of L-beta-hydroxybutyrate relative to the amount of total beta-hydroxy-butyrate in the composition.

2. The method of claim 1, wherein administering ketone bodies to the individual manages glucose tolerance in the individual.

3. The method of claim 2, wherein administering the pharmaceutically effective amount of the beta-hydroxybutyrate increases mental acuity.

4. The method of claim 1, wherein administering ketone bodies to the individual maintains or improves weight loss in the individual.

5. The method of claim 1, wherein the beta-hydroxybutyrate comprises beta-hydroxybutyrate complexed and/or coupled to at least one of an amino acid or berberine.

6. The method of claim 1, wherein the beta-hydroxybutyrate is bound to or complexed with an amino acid selected from the group consisting of leucine, lysine, arginine, histidine, ornithine, creatine, agmatine, citrulline, and combinations thereof.

7. The method of claim 1, further comprises administering at least one additional compound selected from the group consisting of:
   a short chain fatty acid;
   an ester of short chain fatty acid;
   a medium chain fatty acid;
   an ester of medium chain fatty acid;
   a long chain fatty acid; and
   an ester of long chain fatty acid.

8. The method of claim 1, wherein administering the pharmaceutically effective amount of the beta-hydroxybutyrate comprises administering the beta-hydroxybutyrate with at least one of a flavoring, a vitamin, a mineral, or a binder.

9. The method of claim 4, wherein administering the pharmaceutically effective amount of the beta-hydroxybutyrate increases strength.

10. The method of claim 1, wherein the R-beta-hydroxybutyrate comprises at least one R-beta-hydroxybutyrate salt.

11. The method of claim 1, wherein administering ketone bodies to the individual maintains ketosis in the individual.

12. The method of claim 11, wherein the beta-hydroxybutyrate is administered up to 5 times daily.

13. The method of claim 11, wherein administering the pharmaceutically effective amount of the beta-hydroxybutyrate increases strength.

14. The method of claim 11 wherein administering the pharmaceutically effective amount of the beta-hydroxybutyrate increases mental acuity.

15. The method of claim 11, wherein administering the pharmaceutically effective amount of the beta-hydroxybutyrate increases at least one of metabolism, fat loss, fat oxidation, motor function, or muscle mass.

16. The method of claim 1, further comprising administering a pharmaceutically effective amount of at least one amino acid concurrently with the beta-hydroxybutyrate.

17. The method of claim 1, wherein administering ketone bodies to the individual manages ketosis in the individual.

18. The method of claim 17, wherein the pharmaceutically effective amount of the beta-hydroxybutyrate comprises less than approximately 2 g of the R-beta-hydroxybutyrate.

* * * * *